United States Patent
Porter et al.

(10) Patent No.: US 12,027,867 B2
(45) Date of Patent: *Jul. 2, 2024

(54) COORDINATED CONVERTER REACTIVELY ALTERING DISABLING PHOTOVOLTAIC ELECTRICAL ENERGY POWER SYSTEM

(71) Applicant: AMPT, LLC, Fort Collins, CO (US)

(72) Inventors: Robert Porter, Fort Collins, CO (US); Anatoli Ledenev, Fort Collins, CO (US)

(73) Assignee: AMPT, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,116

(22) Filed: Nov. 29, 2021

(65) Prior Publication Data

US 2022/0094169 A1    Mar. 24, 2022

Related U.S. Application Data

(63) Continuation of application No. 16/439,430, filed on Jun. 12, 2019, now Pat. No. 11,228,182, which is a
(Continued)

(51) Int. Cl.
*H02J 3/38* (2006.01)
*H02J 3/00* (2006.01)
(Continued)

(52) U.S. Cl.
CPC .......... *H02J 3/381* (2013.01); *H02J 3/00* (2013.01); *H02J 3/38* (2013.01); *H02J 3/388* (2020.01);
(Continued)

(58) Field of Classification Search
CPC ...... Y10S 136/293; Y04S 10/123; H02J 3/00; H02J 3/388
See application file for complete search history.

(56) References Cited

U.S. PATENT DOCUMENTS 3,900,946 A    8/1975  Sirtl et al.
4,127,797 A    11/1978 Perper
(Continued)

FOREIGN PATENT DOCUMENTS

AL    02/073785 A1    9/2002
CA    2702392          9/2015
(Continued)

OTHER PUBLICATIONS

International Application Publication No. 2008/125915A3, published Oct. 23, 2008. Applicant: SolarEdge Technologies. Abstract and Search Report. 4 pages.
(Continued)

*Primary Examiner* — Daniel Cavallari
(74) *Attorney, Agent, or Firm* — Santangelo Law Offices, P.C.

(57) ABSTRACT

Renewable electrical energy is provided with aspects and circuitry that can harvest maximum power from an alternative electrical energy source (1) such as a string of solar panels (11) for a power grid (10). Aspects include: i) controlling electrical power creation from photovoltaic DC-AC inverter (5), ii) operating photovoltaic DC-AC inverter (5) at maximal efficiency even when MPP would not be, iii) protecting DC-AC inverter (5) so input can vary over a range of insolation and temperature, and iv) providing dynamically reactive capability to react and assure operation, to permit differing components, to achieve code compliant dynamically reactive photovoltaic power control circuitry (41). With previously explained converters, inverter control circuitry (38) or photovoltaic power converter functionality control circuitry (8) configured as inverter sweet spot converter control circuitry (46) can achieve extraordinary efficiencies with substantially power isomorphic photovoltaic
(Continued)

capability at 99.2% efficiency or even only wire transmission losses.

16 Claims, 10 Drawing Sheets

Related U.S. Application Data continuation of application No. 15/793,704, filed on Oct. 25, 2017, now Pat. No. 10,326,283, which is a continuation of application No. 15/094,803, filed on Apr. 8, 2016, now abandoned, which is a continuation of application No. 13/346,532, filed on Jan. 9, 2012, now abandoned, which is a continuation of application No. 12/682,882, filed as application No. PCT/US2008/060345 on Apr. 15, 2008, now Pat. No. 8,093,756, which is a continuation of application No. PCT/US2008/057105, filed on Mar. 14, 2008.

(60) Provisional application No. 60/986,979, filed on Nov. 9, 2007, provisional application No. 60/982,053, filed on Oct. 23, 2007, provisional application No. 60/980,157, filed on Oct. 15, 2007.

(51) Int. Cl.
*H02J 13/00* (2006.01)
*H02M 1/00* (2006.01)

(52) U.S. Cl.
CPC .......... *H02J 13/00* (2013.01); *H02J 2300/26* (2020.01); *H02M 1/0077* (2021.05); *Y02E 10/56* (2013.01); *Y02E 40/70* (2013.01); *Y02P 80/20* (2015.11); *Y04S 10/123* (2013.01); *Y10S 136/293* (2013.01)

(56) References Cited

U.S. PATENT DOCUMENTS

| | | |
|---|---|---|
| 4,168,124 A | 9/1979 | Pizzi |
| 4,218,139 A | 8/1980 | Sheffield |
| 4,222,665 A | 9/1980 | Tachizawa |
| 4,249,958 A | 2/1981 | Baudin |
| 4,274,044 A | 6/1981 | Barre |
| 4,341,607 A | 7/1982 | Tison |
| 4,375,662 A | 3/1983 | Baker |
| 4,390,940 A | 6/1983 | Corbefin et al. |
| 4,395,675 A | 7/1983 | Toumani |
| 4,404,472 A | 9/1983 | Steigerwald |
| 4,409,537 A | 10/1983 | Harris |
| 4,445,030 A | 4/1984 | Carlson |
| 4,445,049 A | 4/1984 | Steigerwald |
| 4,513,167 A | 4/1985 | Brandstetter |
| 4,528,503 A | 7/1985 | Cole |
| 4,580,090 A | 4/1986 | Bailey et al. |
| 4,581,716 A | 4/1986 | Kamiya |
| 4,619,863 A | 10/1986 | Taylor |
| 4,626,983 A | 12/1986 | Harada et al. |
| 4,634,943 A | 1/1987 | Reick |
| 4,649,334 A | 3/1987 | Nakajima |
| 4,652,770 A | 3/1987 | Kumano |
| 4,725,740 A | 2/1988 | Nakata |
| 4,749,982 A | 6/1988 | Rikuna et al. |
| 4,794,909 A | 1/1989 | Elden |
| 4,873,480 A | 10/1989 | Lafferty |
| 4,896,034 A | 1/1990 | Kiriseko |
| 4,899,269 A | 2/1990 | Rouzies |
| 4,922,396 A | 5/1990 | Niggemeyer |
| 5,027,051 A | 6/1991 | Lafferty |
| 5,028,861 A | 7/1991 | Pace et al. |
| 5,144,222 A | 9/1992 | Herbert |
| 5,179,508 A | 1/1993 | Lange et al. |
| 5,270,636 A | 12/1993 | Lafferty |
| 5,401,561 A | 3/1995 | Fisun et al. |
| 5,402,060 A | 3/1995 | Erisman |
| 5,493,155 A | 2/1996 | Okamoto et al. |
| 5,493,204 A | 2/1996 | Caldwell |
| 5,503,260 A | 4/1996 | Riley |
| 5,646,502 A | 7/1997 | Johnson |
| 5,648,731 A | 7/1997 | Decker et al. |
| 5,659,465 A | 8/1997 | Flack et al. |
| 5,669,987 A | 9/1997 | Takehara et al. |
| 5,689,242 A | 11/1997 | Sims et al. |
| 5,734,258 A | 3/1998 | Esser |
| 5,741,370 A | 4/1998 | Hanoka |
| 5,747,967 A | 5/1998 | Muljadi et al. |
| 5,782,994 A | 7/1998 | Mori et al. |
| 5,801,519 A | 9/1998 | Midya et al. |
| 5,896,281 A | 4/1999 | Bingley |
| 5,898,585 A | 4/1999 | Sirichote et al. |
| 5,923,100 A | 7/1999 | Lukens et al. |
| 5,932,994 A | 8/1999 | Jo et al. |
| 6,046,401 A | 4/2000 | McCabe |
| 6,081,104 A | 6/2000 | Kern |
| 6,124,769 A | 9/2000 | Igarashi et al. |
| 6,162,986 A | 12/2000 | Shiotsuka |
| 6,166,527 A | 12/2000 | Dwelley et al. |
| 6,180,868 B1 | 1/2001 | Yoshino et al. |
| 6,181,590 B1 | 1/2001 | Yamane et al. |
| 6,191,501 B1 | 2/2001 | Bos |
| 6,218,605 B1 | 4/2001 | Daily et al. |
| 6,218,820 B1 | 4/2001 | D'Arrigo et al. |
| 6,219,623 B1 | 4/2001 | Wills |
| 6,262,558 B1 | 7/2001 | Weinberg |
| 6,275,016 B1 | 8/2001 | Ivanov |
| 6,278,052 B1 | 8/2001 | Takehara et al. |
| 6,281,485 B1 | 8/2001 | Siri |
| 6,282,104 B1 | 8/2001 | Kern |
| 6,314,007 B2 | 11/2001 | Johnson, Jr. et al. |
| 6,331,670 B2 | 12/2001 | Takehara et al. |
| 6,348,781 B1 | 2/2002 | Midya et al. |
| 6,351,400 B1 | 2/2002 | Lumsden |
| 6,369,462 B1 | 4/2002 | Siri |
| 6,433,522 B1 | 8/2002 | Siri |
| 6,433,992 B2 | 8/2002 | Nakagawa et al. |
| 6,441,896 B1 | 8/2002 | Field |
| 6,448,489 B2 | 9/2002 | Kimura et al. |
| 6,493,246 B2 | 12/2002 | Suzui et al. |
| 6,515,215 B1 | 2/2003 | Mimura |
| 6,545,211 B1 | 4/2003 | Mimura |
| 6,545,868 B1 | 4/2003 | Kledzik et al. |
| 6,593,521 B2 | 7/2003 | Kobayashi |
| 6,600,668 B1 | 7/2003 | Patel |
| 6,624,350 B2 | 9/2003 | Nixon et al. |
| 6,636,431 B2 | 10/2003 | Seki et al. |
| 6,670,721 B2 | 12/2003 | Lof et al. |
| 6,686,533 B2 | 2/2004 | Raum et al. |
| 6,686,727 B2 | 2/2004 | Ledenev et al. |
| 6,696,823 B2 | 2/2004 | Ledenev et al. |
| 6,703,555 B2 | 3/2004 | Takabayashi et al. |
| 6,750,391 B2 | 6/2004 | Bower et al. |
| 6,788,033 B2 | 9/2004 | Vinciarelli |
| 6,791,024 B2 | 9/2004 | Toyomura |
| 6,798,177 B1 | 9/2004 | Liu et al. |
| 6,804,127 B2 | 10/2004 | Zhou |
| 6,889,122 B2 | 5/2005 | Perez |
| 6,914,418 B2 | 7/2005 | Sung |
| 6,914,420 B2 | 7/2005 | Crocker |
| 6,920,055 B1 | 7/2005 | Zeng et al. |
| 6,952,355 B2 | 10/2005 | Rissio et al. |
| 6,958,922 B2 | 10/2005 | Kazem |
| 6,984,965 B2 | 1/2006 | Vinciarelli |
| 6,984,970 B2 | 1/2006 | Capel |
| 7,019,988 B2 | 3/2006 | Fung et al. |
| 7,046,531 B2 | 5/2006 | Zocchi et al. |
| 7,068,017 B2 | 6/2006 | Willner et al. |
| 7,072,194 B2 | 7/2006 | Nayar et al. |
| 7,088,595 B2 | 8/2006 | Nino |
| 7,091,707 B2 | 8/2006 | Cutler |
| 7,092,265 B2 | 8/2006 | Kernahan |
| 7,158,395 B2 | 1/2007 | Deng et al. |
| 7,193,872 B2 | 3/2007 | Siri |

(56) References Cited

U.S. PATENT DOCUMENTS

| | | |
|---|---|---|
| 7,227,278 B2 | 6/2007 | Realmuto et al. |
| 7,248,946 B2 | 7/2007 | Bashaw et al. |
| 7,274,975 B2 | 9/2007 | Miller |
| 7,333,916 B2 | 2/2008 | Warfield et al. |
| 7,339,287 B2 | 3/2008 | Jepsen et al. |
| 7,365,661 B2 | 4/2008 | Thomas |
| 7,411,371 B2 | 8/2008 | Hobbs |
| 7,471,073 B2 | 12/2008 | Rettenwort et al. |
| 7,479,774 B2 | 1/2009 | Wai |
| 7,514,900 B2 | 4/2009 | Sander et al. |
| 7,596,008 B2 | 9/2009 | Iwata et al. |
| D602,432 S | 10/2009 | Moussa |
| 7,602,080 B1 | 10/2009 | Hadar et al. |
| 7,605,498 B2 | 10/2009 | Ledenev et al. |
| 7,619,200 B1 | 11/2009 | Seymour et al. |
| 7,619,323 B2 | 11/2009 | Tan et al. |
| 7,663,342 B2 | 2/2010 | Kimball et al. |
| 7,719,140 B2 | 5/2010 | Ledenev et al. |
| 7,768,155 B2 | 8/2010 | Fornage |
| 7,786,716 B2 | 8/2010 | Simburger et al. |
| 7,807,919 B2 | 10/2010 | Powell |
| 7,834,580 B2 | 11/2010 | Haines |
| 7,843,085 B2 | 11/2010 | Ledenev et al. |
| 7,919,953 B2 | 4/2011 | Porter et al. |
| 7,948,221 B2 | 5/2011 | Watanabe et al. |
| 7,962,249 B1 | 6/2011 | Zhang et al. |
| 8,004,116 B2 | 8/2011 | Ledenev et al. |
| 8,013,472 B2 | 9/2011 | Adest et al. |
| 8,018,748 B2 | 9/2011 | Leonard |
| 8,058,747 B2 | 11/2011 | Avrutsky et al. |
| 8,063,606 B2 | 11/2011 | Veselic |
| 8,093,756 B2 | 1/2012 | Porter et al. |
| 8,106,765 B1 | 1/2012 | Ackerson et al. |
| 8,242,634 B2 | 8/2012 | Schatz et al. |
| 8,264,195 B2 | 9/2012 | Takehara et al. |
| 8,273,979 B2 | 9/2012 | Weir |
| 8,304,932 B2 | 11/2012 | Ledenev et al. |
| 8,314,375 B2 | 11/2012 | Arditi et al. |
| 8,461,811 B2 | 6/2013 | Porter et al. |
| 8,473,250 B2 | 6/2013 | Adest |
| 8,482,153 B2 | 7/2013 | Ledenev et al. |
| 8,531,055 B2 | 9/2013 | Adest et al. |
| 8,593,103 B2 | 11/2013 | Takehara et al. |
| 8,618,692 B2 | 12/2013 | Adest et al. |
| 8,773,092 B2 | 7/2014 | Fishelov |
| 8,816,535 B2 | 8/2014 | Adest et al. |
| 8,854,193 B2 | 10/2014 | Makhota et al. |
| 8,860,241 B2 | 10/2014 | Hadar et al. |
| 8,929,112 B2 | 1/2015 | Schill |
| 9,042,145 B2 | 5/2015 | Schill |
| 9,088,178 B2 | 7/2015 | Adest |
| 9,099,759 B2 | 8/2015 | Caldwell |
| 9,112,379 B2 | 8/2015 | Sella et al. |
| 9,366,714 B2 | 6/2016 | Ledenev et al. |
| 9,368,964 B2 | 6/2016 | Adest et al. |
| 9,397,497 B2 | 7/2016 | Ledenev |
| 9,438,037 B2 | 9/2016 | Ledenev et al. |
| 9,442,504 B2 | 9/2016 | Porter et al. |
| 9,466,737 B2 | 10/2016 | Ledenev |
| 9,673,630 B2 | 6/2017 | Ledenev et al. |
| 9,673,732 B2 | 6/2017 | Deboy |
| 9,853,490 B2 | 12/2017 | Adest et al. |
| 10,032,939 B2 | 7/2018 | Ledenev et al. |
| 10,116,140 B2 | 10/2018 | Ledenev et al. |
| 10,326,282 B2 | 6/2019 | Porter et al. |
| 10,326,283 B2 | 6/2019 | Porter et al. |
| 10,608,437 B2 | 3/2020 | Ledenev et al. |
| 10,714,637 B2 | 7/2020 | Ledenev et al. |
| 10,886,746 B1 | 1/2021 | Ledenev et al. |
| 10,938,219 B2 | 3/2021 | Porter et al. |
| 10,992,238 B2 | 4/2021 | Yoscovich |
| 11,121,556 B2 | 9/2021 | Ledenev |
| 11,228,182 B2 | 1/2022 | Porter et al. |
| 11,289,917 B1 | 3/2022 | Ledenev et al. |
| 11,309,708 B2 | 4/2022 | Ley et al. |
| 11,411,126 B2 | 8/2022 | Ledenev et al. |
| 11,967,653 B2 | 4/2024 | Ledenev |
| 2001/0007522 A1 | 7/2001 | Nakagawa et al. |
| 2001/0032664 A1 | 10/2001 | Takehara et al. |
| 2002/0038200 A1 | 3/2002 | Shimizu et al. |
| 2002/0186020 A1 | 12/2002 | Kondo |
| 2002/0195136 A1 | 12/2002 | Takabayashi et al. |
| 2003/0035308 A1 | 2/2003 | Lynch |
| 2003/0036806 A1 | 2/2003 | Schienbein |
| 2003/0062078 A1 | 4/2003 | Mimura |
| 2003/0075211 A1 | 4/2003 | Makita et al. |
| 2003/0117822 A1 | 6/2003 | Stamenic et al. |
| 2003/0218449 A1 | 11/2003 | Ledenev et al. |
| 2004/0027112 A1 | 2/2004 | Kondo et al. |
| 2004/0051387 A1 | 3/2004 | Lasseter |
| 2004/0085048 A1 | 5/2004 | Tateishi |
| 2004/0095020 A1 | 5/2004 | Kernahan et al. |
| 2004/0100149 A1 | 5/2004 | Lai |
| 2004/0135560 A1 | 7/2004 | Kernahan |
| 2004/0159102 A1 | 8/2004 | Toyomura et al. |
| 2004/0164557 A1 | 8/2004 | West |
| 2004/0175598 A1 | 9/2004 | Bliven |
| 2004/0207366 A1 | 10/2004 | Sung |
| 2004/0211456 A1 | 10/2004 | Brown |
| 2005/0002214 A1 | 1/2005 | Deng et al. |
| 2005/0068012 A1 | 3/2005 | Cutler |
| 2005/0077879 A1 | 4/2005 | Near |
| 2005/0093526 A1 | 5/2005 | Notman |
| 2005/0105224 A1 | 5/2005 | Nishi |
| 2005/0109386 A1 | 5/2005 | Marshall |
| 2005/0116475 A1 | 6/2005 | Hibi et al. |
| 2005/0121067 A1 | 6/2005 | Toyomura |
| 2005/0162018 A1 | 7/2005 | Realmuto et al. |
| 2005/0169018 A1 | 8/2005 | Hatai et al. |
| 2005/0218876 A1 | 10/2005 | Nino |
| 2005/0254191 A1 | 11/2005 | Bashaw et al. |
| 2006/0017327 A1 | 1/2006 | Siri et al. |
| 2006/0103360 A9 | 5/2006 | Cutler |
| 2006/0162772 A1 | 7/2006 | Preser et al. |
| 2006/0171182 A1 | 8/2006 | Siri et al. |
| 2006/0174939 A1 | 8/2006 | Matan |
| 2007/0024257 A1 | 2/2007 | Boldo |
| 2007/0035975 A1 | 2/2007 | Dickerson et al. |
| 2007/0038534 A1 | 2/2007 | Canter |
| 2007/0044837 A1 | 3/2007 | Simburger et al. |
| 2007/0069520 A1 | 3/2007 | Schetters |
| 2007/0111103 A1 | 5/2007 | Konishiike et al. |
| 2007/0119718 A1 | 5/2007 | Gibson et al. |
| 2007/0133241 A1 | 6/2007 | Mumtaz et al. |
| 2007/0159866 A1 | 7/2007 | Siri |
| 2007/0165347 A1 | 7/2007 | Wendt et al. |
| 2007/0171680 A1 | 7/2007 | Perreault et al. |
| 2007/0236187 A1 | 10/2007 | Wai et al. |
| 2008/0036440 A1 | 2/2008 | Garmer |
| 2008/0062724 A1 | 3/2008 | Feng et al. |
| 2008/0097655 A1 | 4/2008 | Hadar et al. |
| 2008/0101101 A1 | 5/2008 | Iwata et al. |
| 2008/0111517 A1 | 5/2008 | Pfeifer et al. |
| 2008/0123375 A1 | 5/2008 | Beardsley |
| 2008/0136367 A1 | 6/2008 | Adest et al. |
| 2008/0143188 A1 | 6/2008 | Adest et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0186004 A1 | 8/2008 | Williams |
| 2008/0236648 A1 | 10/2008 | Klein et al. |
| 2008/0238195 A1 | 10/2008 | Shaver |
| 2008/0247201 A1 | 10/2008 | Perol |
| 2008/0257397 A1 | 10/2008 | Glaser et al. |
| 2009/0020151 A1 | 1/2009 | Fornage |
| 2009/0039852 A1 | 2/2009 | Fishelov et al. |
| 2009/0078300 A1 | 3/2009 | Ang et al. |
| 2009/0114263 A1 | 5/2009 | Powell et al. |
| 2009/0120485 A1 | 5/2009 | Kikinis |
| 2009/0133736 A1 | 5/2009 | Powell et al. |
| 2009/0097655 A1 | 6/2009 | Hadar et al. |
| 2009/0140715 A1 | 6/2009 | Adest et al. |
| 2009/0141522 A1 | 6/2009 | Adest et al. |

(56) References Cited

U.S. PATENT DOCUMENTS

| | | |
|---|---|---|
| 2009/0145480 A1 | 6/2009 | Adest et al. |
| 2009/0146505 A1 | 6/2009 | Powell et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0150005 A1 | 6/2009 | Hadar et al. |
| 2009/0160258 A1 | 6/2009 | Allen et al. |
| 2009/0160259 A1 | 6/2009 | Naiknaware et al. |
| 2009/0206666 A1 | 8/2009 | Sella |
| 2009/0207543 A1 | 8/2009 | Boniface et al. |
| 2009/0218887 A1 | 9/2009 | Ledenev et al. |
| 2009/0234692 A1 | 9/2009 | Powell et al. |
| 2009/0237042 A1 | 9/2009 | Glovinksi |
| 2009/0237043 A1 | 9/2009 | Glovinksi |
| 2009/0273241 A1 | 11/2009 | Gazit et al. |
| 2009/0283128 A1 | 11/2009 | Zhang et al. |
| 2009/0283129 A1 | 11/2009 | Foss |
| 2009/0284078 A1 | 11/2009 | Zhang et al. |
| 2009/0284232 A1 | 11/2009 | Zhang et al. |
| 2009/0284240 A1 | 11/2009 | Zhang et al. |
| 2009/0284998 A1 | 11/2009 | Zhang et al. |
| 2010/0001587 A1 | 1/2010 | Casey et al. |
| 2010/0026097 A1 | 2/2010 | Avrutsky et al. |
| 2010/0027297 A1 | 2/2010 | Avrutsky et al. |
| 2010/0038968 A1 | 2/2010 | Ledenev et al. |
| 2010/0078057 A1 | 4/2010 | Karg et al. |
| 2010/0085670 A1 | 4/2010 | Palaniswami et al. |
| 2010/0089431 A1 | 4/2010 | Weir |
| 2010/0117858 A1 | 5/2010 | Rozenboim |
| 2010/0118985 A1 | 5/2010 | Rozenboim |
| 2010/0127570 A1 | 6/2010 | Tadar et al. |
| 2010/0127571 A1 | 6/2010 | Hadar et al. |
| 2010/0132758 A1 | 6/2010 | Gilmore |
| 2010/0139732 A1 | 6/2010 | Hadar et al. |
| 2010/0139734 A1 | 6/2010 | Hadar et al. |
| 2010/0139743 A1 | 6/2010 | Hadar et al. |
| 2010/0195361 A1 | 8/2010 | Stem |
| 2010/0229915 A1 | 9/2010 | Ledenev et al. |
| 2010/0246230 A1 | 9/2010 | Porter et al. |
| 2010/0253150 A1 | 10/2010 | Porter et al. |
| 2010/0308662 A1 | 12/2010 | Schatz et al. |
| 2010/0327659 A1 | 12/2010 | Lisi |
| 2011/0005567 A1 | 1/2011 | Vandersluis et al. |
| 2011/0067745 A1 | 3/2011 | Ledenev et al. |
| 2011/0084553 A1 | 4/2011 | Adest et al. |
| 2011/0095613 A1 | 4/2011 | Huang et al. |
| 2011/0115300 A1 | 5/2011 | Chiang et al. |
| 2011/0127841 A1 | 6/2011 | Chiang et al. |
| 2011/0160930 A1 | 6/2011 | Batten et al. |
| 2011/0175454 A1 | 7/2011 | Williams et al. |
| 2011/0181251 A1 | 7/2011 | Porter et al. |
| 2011/0193515 A1 | 8/2011 | Wu et al. |
| 2011/0210611 A1 | 9/2011 | Ledenev et al. |
| 2011/0316346 A1 | 12/2011 | Porter et al. |
| 2012/0003251 A1 | 1/2012 | Ledenev et al. |
| 2012/0043818 A1 | 2/2012 | Stratakos et al. |
| 2012/0104864 A1 | 5/2012 | Porter et al. |
| 2012/0175963 A1 | 7/2012 | Adest et al. |
| 2012/0212066 A1 | 8/2012 | Adest et al. |
| 2012/0223584 A1 | 9/2012 | Ledenev et al. |
| 2013/0187473 A1 | 7/2013 | Deboy et al. |
| 2013/0271096 A1 | 10/2013 | Inagaki |
| 2014/0045325 A1 | 1/2014 | Ledenev et al. |
| 2014/0152240 A1 | 6/2014 | Adest et al. |
| 2014/0319918 A1 | 10/2014 | Siri |
| 2015/0008748 A1 | 1/2015 | Deboy et al. |
| 2015/0100257 A1 | 4/2015 | Adest et al. |
| 2015/0130284 A1 | 5/2015 | Ledenev et al. |
| 2016/0156384 A1 | 6/2016 | Fabre et al. |
| 2016/0226257 A1 | 8/2016 | Porter et al. |
| 2016/0241079 A1 | 8/2016 | Adest et al. |
| 2016/0268809 A1 | 9/2016 | Ledenev et al. |
| 2016/0329720 A1 | 11/2016 | Ledenev et al. |
| 2016/0336899 A1 | 11/2016 | Ledenev et al. |
| 2016/0365734 A1 | 12/2016 | Ledenev |
| 2016/0380436 A1 | 12/2016 | Porter et al. |
| 2017/0271879 A1 | 9/2017 | Ledenev et al. |
| 2017/0317523 A1 | 11/2017 | Adest et al. |
| 2017/0373503 A1 | 12/2017 | Ledenev |
| 2018/0048161 A1 | 2/2018 | Porter et al. |
| 2018/0374965 A1 | 12/2018 | Ledenev et al. |
| 2019/0131794 A1 | 5/2019 | Ledenev |
| 2019/0296555 A1 | 9/2019 | Porter et al. |
| 2019/0296556 A1 | 9/2019 | Porter et al. |
| 2020/0227920 A1 | 7/2020 | Ledenev et al. |
| 2020/0321780 A1 | 10/2020 | Adest et al. |
| 2020/0343388 A1 | 10/2020 | Ledenev et al. |
| 2021/0066918 A1 | 3/2021 | Ledenev et al. |
| 2021/0276455 A1 | 9/2021 | Ledenev |
| 2022/0077689 A1 | 3/2022 | Ledenev |
| 2022/0094169 A1 | 3/2022 | Porter et al. |
| 2022/0224122 A1 | 7/2022 | Ledenev et al. |
| 2022/0352394 A1 | 11/2022 | Ledenev et al. |
| 2022/0360075 A1 | 11/2022 | Adest et al. |
| 2023/0093410 A1 | 3/2023 | Ledenev et al. |
| 2023/0411538 A1 | 12/2023 | Ledenev |
| 2023/0411539 A1 | 12/2023 | Ledenev |

FOREIGN PATENT DOCUMENTS

| | | |
|---|---|---|
| CA | 2737134 | 10/2017 |
| CA | 2942616 A1 | 11/2019 |
| CN | 1470098 A | 1/2004 |
| CN | 101257221 | 9/2008 |
| CN | 101904015 A | 12/2010 |
| CN | 102013853 A | 4/2011 |
| DE | 4032569 A1 | 4/1992 |
| DE | 10207560 A1 | 9/2003 |
| DE | 102004025923 A1 | 12/2005 |
| DE | 102008050402 A1 | 4/2010 |
| DE | 102013005070 A1 | 9/2014 |
| DE | 102010006124 B4 | 4/2015 |
| EP | 0178446 B1 | 1/1989 |
| EP | 0383971 A1 | 8/1990 |
| EP | 677749 A2 | 10/1995 |
| EP | 824273 A2 | 2/1998 |
| EP | 964415 A1 | 12/1999 |
| EP | 964457 A2 | 12/1999 |
| EP | 780750 B1 | 3/2002 |
| EP | 1291997 A2 | 3/2003 |
| EP | 1388927 A2 | 2/2004 |
| EP | 2017948 A2 | 1/2009 |
| EP | 2515424 A2 | 10/2012 |
| EP | 3176933 A1 | 6/2017 |
| EP | 3324505 A1 | 5/2018 |
| EP | 3176933 | 8/2020 |
| EP | 2212983 | 4/2021 |
| EP | 2973982 | 5/2021 |
| EP | 3324505 B1 | 6/2023 |
| GB | 310362 | 9/1929 |
| GB | 612859 | 11/1948 |
| GB | 1231961 | 5/1971 |
| GB | 424556.9 | 11/2005 |
| GB | 2415841 A | 1/2006 |
| GB | 2419968 A | 5/2006 |
| GB | 2421847 A | 7/2006 |
| GB | 2434490 A | 7/2007 |
| IN | 280874 | 2/2017 |
| IN | 530348 | 3/2024 |
| JP | 62-256156 | 7/1987 |
| JP | 07-302130 | 11/1995 |
| JP | 8046231 A | 2/1996 |
| JP | 2000-174307 | 6/2000 |
| JP | 2006020390 A | 6/2004 |
| JP | 2007058845 A | 8/2007 |
| JP | 2007-325371 A | 12/2007 |
| JP | 2011-193548 A | 9/2011 |
| KR | 1020070036528 A | 3/2007 |
| TW | 201037958 A | 10/2010 |
| WO | 90/03680 | 4/1990 |
| WO | 9003680 A1 | 4/1990 |
| WO | 02/17469 A1 | 2/2002 |
| WO | 03/036688 A2 | 5/2003 |
| WO | 03098703 A2 | 11/2003 |

(56) References Cited

FOREIGN PATENT DOCUMENTS

| | | |
|---|---|---|
| WO | 2004100344 A2 | 11/2004 |
| WO | 2004100348 A1 | 11/2004 |
| WO | 2004107543 A2 | 12/2004 |
| WO | 2005027300 A1 | 3/2005 |
| WO | 2005036725 A1 | 4/2005 |
| WO | 2005076445 A1 | 8/2005 |
| WO | 2006005125 A1 | 1/2006 |
| WO | 2006013600 A2 | 2/2006 |
| WO | 2006048688 A1 | 5/2006 |
| WO | 2006048689 A2 | 5/2006 |
| WO | 2006071436 A2 | 7/2006 |
| WO | 2006078685 A2 | 7/2006 |
| WO | 2006117551 A2 | 11/2006 |
| WO | 2006137948 A2 | 12/2006 |
| WO | 2007007360 A2 | 1/2007 |
| WO | 2007048421 A2 | 5/2007 |
| WO | 2007080429 A2 | 7/2007 |
| WO | 2007142693 A2 | 12/2007 |
| WO | 2008069926 A3 | 6/2008 |
| WO | 2008125915 A2 | 10/2008 |
| WO | 2008132553 A2 | 11/2008 |
| WO | 2008142480 A2 | 11/2008 |
| WO | 2008142480 A4 | 11/2008 |
| WO | 2009003680 A1 | 1/2009 |
| WO | 2009007782 A2 | 1/2009 |
| WO | 2009007782 A3 | 1/2009 |
| WO | 2009051853 A1 | 4/2009 |
| WO | 2009051854 A1 | 4/2009 |
| WO | 2009051870 A1 | 4/2009 |
| WO | 2009055474 A1 | 4/2009 |
| WO | 2009059028 A2 | 5/2009 |
| WO | 2009064683 A2 | 5/2009 |
| WO | 2009072075 A2 | 6/2009 |
| WO | 2009072075 A9 | 6/2009 |
| WO | 2009072076 A2 | 6/2009 |
| WO | 2009072076 A3 | 6/2009 |
| WO | 2009072077 A1 | 6/2009 |
| WO | 2009073867 A1 | 6/2009 |
| WO | 2009073868 A1 | 6/2009 |
| WO | 2009075985 A2 | 6/2009 |
| WO | 2009114341 A2 | 9/2009 |
| WO | 2009118682 A2 | 10/2009 |
| WO | 2009118682 A3 | 10/2009 |
| WO | 2009118682 A4 | 10/2009 |
| WO | 2009118683 A2 | 10/2009 |
| WO | 2009118683 A3 | 10/2009 |
| WO | 2009118683 A4 | 10/2009 |
| WO | 2009136358 A1 | 11/2009 |
| WO | 2009136358 A4 | 11/2009 |
| WO | 2009140536 A2 | 11/2009 |
| WO | 2009140539 A2 | 11/2009 |
| WO | 2009140539 A3 | 11/2009 |
| WO | 2009140543 A2 | 11/2009 |
| WO | 2009140551 A2 | 11/2009 |
| WO | 2010014116 A1 | 2/2010 |
| WO | 2010062662 A2 | 6/2010 |
| WO | 2010065043 A1 | 6/2010 |
| WO | 2010262410 A1 | 6/2010 |
| WO | 2010002960 A1 | 7/2010 |
| WO | 2010120315 A1 | 10/2010 |
| WO | 2011049985 A1 | 4/2011 |
| WO | 2011110933 A8 | 9/2011 |
| WO | 2012/024538 A3 | 2/2012 |
| WO | 2012024540 A3 | 2/2012 |
| WO | 2012-60714 A | 3/2012 |
| WO | 2012100263 A2 | 7/2012 |
| WO | 2014143021 A1 | 9/2014 |

OTHER PUBLICATIONS

International Application Publication No. 2008/132551A3, published Nov. 6, 2008. Applicant: SolarEdge Technologies. Abstract and Search Report. 7 pages.

International Application Publication No. 2008/142480A3, published Nov. 27, 2008. Applicant: SolarEdge Technologies. Abstract and Search Report. 5 pages.

U.S. Appl. No. 62/385,032, filed Sep. 8, 2016. First Named Inventor: Anatoli Ledenev.

U.S. Appl. No. 15/262,916, filed Sep. 12, 2016. First Named Inventor: Robert M. Porter.

U.S. Appl. No. 14/550,574, filed Nov. 21, 2014. First Named Inventor: Anatoli Ledenev.

International Application No. PCT/US13/032410, filed Mar. 15, 2013. First Named Inventor: Anatoli Ledenev.

U.S. Appl. No. 15/213,193, filed Jul. 18, 2016. First Named Inventor: Anatoli Ledenev.

Japanese Patent Application No. 2016-500068, international filing date: Mar. 15, 2013, Office Action dated Sep. 30, 2016, dated Oct. 4, 2016. 8 pages.

U.S. Appl. No. 15/219,149, filed Jul. 25, 2016. First named Inventor: Anatoli Ledenev.

U.S. Appl. No. 15/219,149, filed Jul. 25, 2016. First Named Inventor: Ledenev. Office Action dated Mar. 3, 2017. 14 pages.

Canadian Patent Application No. 2737134, filed Mar. 14, 2008. First Named Inventor: Ledenev. Notice of Allowance dated Feb. 13, 2017. 1 page.

U.S. Appl. No. 15/469,087, filed Mar. 24, 2017. First Named Inventor: Ledenev.

European Patent Application No. 13877614; Extended European Search Report dated Nov. 7, 2016. 8 pages.

U.S. Appl. No. 15/219,149, filed Jul. 25, 2016. Applicant Initiated Interview Summary. Interview dated Apr. 4, 2017. 1 page.

Japanese Patent Application No. 2016-500068, international filing date: Mar. 15, 2013, Office Action dated Mar. 13, 2017 dated Mar. 15, 2016. English Translation of the Official Action. 8 pages.

U.S. Appl. No. 15/612,892, filed Jun. 2, 2017. First Named Inventor: Ledenev.

U.S. Appl. No. 15/679,745, filed Aug. 17, 2017. First Named Inventor: Ledenev.

Chinese Patent Application No. 201310162669.6, 5th Notification of Office Action dated Mar. 20, 2017. 6 pages.

Chinese Patent Application No. 201310162669.6, Decision of Rejection dated Sep. 7, 2017. 8 pages.

Chinese Patent Application No. 201310162669.6, First Office Action dated Nov. 25, 2014. 6 pages.

Chinese Patent Application No. 201310162669.6, Search Report dated Nov. 25, 2014. 2 pages.

Chinese Patent Application No. 201310162669.6, Second Notification of Office Action dated Jul. 17, 2015. 8 pages.

Chinese Patent Application No. 201310162669.6, Third Notification of Office Action dated Jan. 14, 2016. 7 pages.

Chinese Patent Application No. 201310162669.6, Fourth Notification of Office Action dated Aug. 17, 2016. 7 pages.

Canadian Patent Application No. 2702392, Office Action dated Jul. 31, 2014. 2 pages.

Canadian Patent Application No. 2702392, Office Action dated Sep. 26, 2013. 2 pages.

German Patent No. DE4032569A1, published Apr. 16, 1992. Translated from GooglePatent. 7 pages.

Chinese Application No. 201380076592.9, Second Notification of Office Action dated Jul. 28, 2017. 9 pages.

Chinese Application No. 201380076592.9 filed Mar. 15, 2013. First Notification of Office Action and Search Report dated Nov. 28, 2016. 11 pages.

U.S. Appl. No. 15/219,149, filed Jul. 25, 2016. First Named Inventor: Ledenev. Notice of Allowance and Applicant Initiated Interview Summary dated Apr. 26, 2017. 14 pages.

U.S. Appl. No. 15/181,174 filed Jun. 13, 2016. First Named Inventor: Ledenev: Office Action dated Oct. 10, 2017. 12 pages.

European Application No. 17150670.2. Extended European Search Report dated Apr. 7, 2017. 13 pages.

U.S. Appl. No. 15/469,087, filed Mar. 24, 2017. First Named Inventor: Ledenev. Applicant-Initiated Interview Summary dated Oct. 20, 2017. 4 pages.

Japanese Patent Application No. 2016-500068. Final rejection dated Sep. 29, 2017. English Translation. 7 pages.

(56) References Cited

OTHER PUBLICATIONS

Japanese Patent Application No. 2016-160797. Rejection dated Sep. 29, 2017. 10 pages.
U.S. Appl. No. 15/793,704, filed Oct. 25, 2017. First Named Inventor: Porter.
Japanese Laid-Open Publication No. 2007-325371. Abstract only. 1 page.
U.S. Appl. No. 15/164,806, filed May 25, 2016. First Named Inventor: Anatoli Ledenev. Ex Parte Quayle Action dated Dec. 12, 2017. 8 pages.
U.S. Appl. No. 15/213,193, filed Jul. 18, 2016. First Named Inventor: Ledenev. Office Action dated Jan. 19, 2018. 15 pages.
Vazquez, et al., The Tapped-Inductor Boost Converter. © 2007 IEEE. 6 pages.
European Patent Application No. 17150670.2. Office Action dated Jan. 29, 2018. 9 pages.
Chinese Patent Application No. 201380076592.9. English Translation of the 3rd Notification of Office Action, dated Feb. 7, 2018. 13 pages.
U.S. Appl. No. 15/164,806, filed May 25, 2016. Notice of Allowance dated Mar. 9, 2018. 8 pages.
U.S. Appl. No. 15/164,806, filed May 25, 2016. Corrected filing receipt mailed Mar. 14, 2018. 3 pages.
Japanese Patent Application No. 2016-160797. Rejection dated Mar. 27, 2018. 13 pages.
European Application No. 17209600, Extended European Search Report dated Apr. 10, 2018. 6 pages.
U.S. Appl. No. 15/164,806, filed May 25, 2016. Corrected Notice of Allowance dated May 10, 2018. 4 pages.
Power Article, Aerospace Systems Lab, Washington University, St. Louis, MO; estimated at Sep. 2007; 3 pages.
U.S. Appl. No. 11/333,005, filed Jan. 17, 2006, First Named Inventor Gordon E. Presher, Jr.
Quan, Li; Wolfs, P; "An Analysis of the ZVS Two-inductor Boost Converter Under Variable Frequency Operation," IEEE Transactions on Power Electronics, Central Queensland University, Rockhamton, Qld, AU; vol. 22, No. 1, Jan. 2007; pp. 120-131. Abstract only, 1 page.
Rajan, Anita; "Maximum Power Point Tracker Optimized for Solar Powered Cars;" Society of Automotive Engineers, Transactions, v 99, n Sect 6, 1990, Abstract only, 1 page.
Reimann, T, Szeponik, S; Berger, G; Petzoldt, J; "A Novel Control Principle of Bi-directional DC-DC Power Conversion," 28th Annual IEEE Power Electroncis Specialists Conference, St. Louis, MO Jun. 22-27, 1997; vol. 2, Abstract only, 1 page.
Rodriguez, C; "Analytic Solution to the Photovoltaic Maximum Power Point Problem;" IEEE Transactions of Power Electronics, vol. 54, No. 9, Sep. 2007, 7 pages.
Roman, E et al; "Intelligent PV Module for Grid-Connected PV Systems;" IEEE Transactions of Power Electronics, vol. 53, No. 4, Aug. 2006, 8 pages.
Russell, M.C. et al; "The Massachusetts Electric Solar Project: A Pilot Project to Commercialize Residential PC Systems," Photovoltaic Specialists Conference 2000; Conference Record of the 28th IEEE; Abstract Only, 1 page.
SatCon Power Systems, PowerGate Photovoltaic 50kW Power Converter System; Spec Sheet; Jun. 2004, 2 pages.
Schekulin, Dirk et al; "Module-integratable Inverters in the Power-Range of 100-400 Watts," 13th European Photovoltaic Solar Energy Conference, Oct. 23-27, 1995; Nice, France; p. 1893-1896.
Shimizu, et al; "Generation Control Circuit for Photovoltaic Modules," IEEE Transactions on Power Electronics; vol. 16, No. 3, May 2001. 8 pages.
Siri, K; "Study of System Instability in Current-mode Converter Power Systems Operating in Solar Array Voltage Regulation Mode," Dept. of Electrical and Electronic Systems, Aerospace Corp., El Segundo, CA; Feb. 6-10, 2000 in New Orleans, LA, 15th Annual IEEE Applied Power Electronics Conference and Exposition, Abstract only, 1 page.

solar-electric.com; Northern Arizona Wind & Sun, All About MPPT Solar Charge Controllers; Nov. 5, 2007, 4 pages.
Takahashi, I. et al; "Development of a Long-life Three-phase Flywheel UPS Using an Electrolytic Capacitorless Converter-inverter," 1999 Scripta Technica, Electr. Eng. Jpn, 127(3); 6 pages.
United States Provisional Application filed Dec. 6, 2006, U.S. Appl. No. 60/868,851, first named Inventor: Adest.
United States Provisional Application filed Dec. 6, 2006, U.S. Appl. No. 60/868,893; First Named Inventor: Adest.
United States Provisional Application filed Dec. 7, 2006, U.S. Appl. No. 60/868,962; First Named Inventor: Adest.
United States Provisional Application filed Mar. 26, 2007, U.S. Appl. No. 60/908,095; First Named Inventor: Adest.
United States Provisional Application filed May 9, 2007, U.S. Appl. No. 60/916,815; First Named Inventor: Adest.
United States Provisional Application filed Nov. 15, 2007, U.S. Appl. No. 60/986,979; First Named Inventor: Ledenev.
United States Provisional Application filed Oct. 15, 2007, U.S. Appl. No. 60/980,157; First Named Inventor: Ledenev.
United States Provisional Application filed Oct. 23, 2007, U.S. Appl. No. 60/982,053; First Named Inventor: Porter.
Walker, G.R. et al; "Cascaded DC-DC Converter Connection of Photovoltaic Modules," IEEE Transactions of Power Electronics, vol. 19, No. 4, Jul. 2004, 10 pages.
Walker, G.R. et al; "PV String Per-Module Power Point Enabling Converters," School of Information Technology and Electrical Engineering; The University of Queensland, presented at the Australasian Universities Power Engineering Conference, Sep. 28-Oct. 1, 2003 in Christchurch; AUPEC2003; 6 pages.
Wang, Ucilia; Greentechmedia; "National semi casts solarmagic;" www.greentechmedia.com; Jul. 2, 2008; 3 pages.
Xue, John, "PV Module Series String Balancing Converters," Supervised by Geoffrey Walker, Nov. 6, 2002; University of Queensland, School of Information Technology and Electrical Engineering; 108 pages.
Yuvarajan, S; Dachuan, Yu; Shanguang, Xu; "A Novel Power Converter for Photovoltaic Applications," Journal of Power Sources, Sep. 3, 2004; vol. 135, No. 1-2, pp. 327-331.
Feuermann, D. et al., Reversible low solar heat gain windows for energy savings. Solar Energy vol. 62, No. 3, pp. 169-175, 1998.
Román, E., et al. Experimental results of controlled PV module for building integrated PV systems; Science Direct; Solar Energy, vol. 82, Issue 5, May 2008, pp. 471-480.
Linares, L., et al. Improved Energy Capture in Series String Photovoltaics via Smart Distributed Power Electronics; Proceedings APEC 2009: 24th Annual IEEE Applied Power Electronics Conference. Washington, D.C., Feb. 2009; 7 pages.
Chen, J., et al. Buck-Boost PWM Converters Having Two Independently Controlled Switches, IEEE Power Electronics Specialists Conference, Jun. 2001, vol. 2, 6 pages.
Chen, J., et al. A New Low-Stress Buck-Boost Converter for Universal-Input PFC Applications, IEEE Applied Power Electronics Conference, Feb. 2001; 7 pages.
Walker, G. et al. PhotoVoltaic DC-DC Module Integrated Converter for Novel Cascaded and Bypass Grid Connection Topologies—Design and Optimisation, 37th IEEE Power Electronics Specialists Conference / Jun. 18-22, 2006, Jeju, Korea; 7 pages.
Esram, T., Chapman, P.L., "Comparison of Photovoltaic Array Maximum Power Point Tracking Techniques," Energy Conversion, IEEE Transactions, Vo. 22, No. 2, pp. 439-449, Jun. 2007.
Knaupp, W. et al., Operation of A 10 Kw PV facade with 100 W AC photovoltaic modules, 25th PVSC; May 13-17, 1996; Washington, D.C.; 4 pages.
Schoen.T. J. N., BIPV overview & getting PV into the marketplace in the Netherlands, The 2nd World Solar Electric Buildings Conference: Sydney Mar. 8-10, 2000; 15 pages.
Stern M., et al. Development of a Low-Cost Integrated 20-KW-AC Solar Tracking Subarray for Grid-Connected PV Power System Applications—Final Report, National Renewable Energy Laboratory, Jun. 1998; 41 pages.
Verhoeve, C.W.G., et al., Recent Test Results of AC-Module inverters, Netherlands Energy Research Foundation ECN, 1997; 3 pages.

(56) References Cited

OTHER PUBLICATIONS

International Application No. PCT/US08/57105, International Preliminary Report on Patentability, dated Mar. 12, 2010; 44 pages.
International Application No. PCT/US08/70506 corrected International Preliminary Report on Patentability, dated Jun. 25, 2010; 12 pages.
International App. No. PCT/US09/41044, Search Report dated Jun. 5, 2009; 3 pages.
International App. No. PCT/US09/41044, Written Opinion dated Jun. 5, 2009; 13 pages.
International App. No. PCT/US08/79605, Search Report dated Feb. 3, 2009; 3 pages.
International App. No. PCT/US08/79605, Written Opinion dated Feb. 3, 2009; 6 pages.
International App. No. PCT/US08/80794, Search Report dated Feb. 23, 2009; 3 pages.
International App. No. PCT/US08/80794, Written Opinion dated Feb. 23, 2009; 7 pages.
National Semiconductor News Release—National semiconductor's SolarMagic Chipset Makes Solar Panels "Smarter" May 2009; 3 pages.
SM3320 Power Optimizer Specifications; SolarMagic Power Optimizer, Apr. 2009; 2 pages.
Patent Interference No. 106,054(JTM), declared Jun. 1, 2016. Senior Party: Meir Adest; Junior Party: Anatoli Ledenev; Sep. 8, 2016 Hearing Transcript with Changes. 18 pages.
Patent Interference No. 106,054(JTM), declared Jun. 1, 2016. Senior Party: Meir Adest; Junior Party: Anatoli Ledenev Exhibit 2014—Adest et al., U.S. Appl. No. 13/430,388, Amendment submitted Jan. 14, 2016.
Patent Interference No. 106,054(JTM), declared Jun. 1, 2016. Senior Party: Meir Adest; Junior Party: Anatoli Ledenev; Exhibit 2027—Deposition Transcript of Marc E. Herniter, dated Oct. 14, 2016. 246 pages.
Patent Interference No. 106,054(JTM), declared Jun. 1, 2016. Senior Party: Meir Adest; Junior Party: Anatoli Ledenev; Third Declaration of Eric A. Seymour, executed Nov. 14, 2016. 27 pages.
Maranda, et al. Optimiazation of the Master-Slave Inverter System for Grid-Connected Photovoltaic Plants, Energy Convers. Mgmt, vol. 39, No. 12, pp. 1239-1246, 1998.
Patent Interference No. 106,054(JTM), declared Jun. 1, 2016. Senior Party: Meir Adest; Junior Party: Anatoli Ledenev; Exhibit 2033—Deposition Transcript of Marc E. Herniter, dated Dec. 14, 2016. 109 pages.
Patent Interference No. 106,054(JTM), declared Jun. 1, 2016. Senior Party: Meir Adest; Junior Party: Anatoli Ledenev; Exhibit 1009—U.S. Appl. No. 12/329,525: EFS Acknowledgement Receipt, Drawings, Abstract, Claims, Specification, Declaration, Application Data Sheet, and Transmittal as filed Dec. 12, 2005; Petition and Application Data Sheet dated Apr. 12, 2013; and Filing Receipt and Petition Decision dated Apr. 19, 2013. 59 pages.
Patent Interference No. 106,054(JTM), declared Jun. 1, 2016. Senior Party: Meir Adest; Junior Party: Anatoli Ledenev; Exhibit 1014: Claim chart—Comparing Count 1 to U.S. Appl. No. 60/908,095. 2 pages.
Patent Interference No. 106,054(JTM), declared Jun. 1, 2016. Senior Party: Meir Adest; Junior Party: Anatoli Ledenev; Exhibit 1015: Declaration of Marc E. Herniter dated Nov. 14, 2016. 22 pages.
Patent Interference No. 106,054(JTM), declared Jun. 1, 2016. Senior Party: Meir Adest; Junior Party: Anatoli Ledenev; Exhibit 1016: Declaration of Marc E. Herniter dated Nov. 21, 2016. 25 pages.
Patent Interference No. 106,054(JTM), declared Jun. 1, 2016. Senior Party: Meir Adest; Junior Party: Anatoli Ledenev; Exhibit 1018: Datasheet, SW 280-290 Mono Black Sunmodule Plus, retrieved Nov. 21, 2016 from http://www.solar-world-usa.com/~/media/www/files/datasheets/series/sunmodule-plus-mono-black-5-busbar-datasheet.pdf?la=en. 2 pages.
Patent Interference No. 106,054(JTM), declared Jun. 1, 2016. Senior Party: Meir Adest; Junior Party: Anatoli Ledenev; Ledenev Notice of Filing of Continuation Applications dated Aug. 23, 2017. 3 pages.
Patent Interference No. 106,054(JTM), declared Jun. 1, 2016. Senior Party: Meir Adest; Junior Party: Anatoli Ledenev; Second Supplemental Order Authorizing Ledenev Motion 7 dated Sep. 13, 2016. 5 pages.
Patent Interference No. 106,054(JTM), declared Jun. 1, 2016. Senior Party: Meir Adest; Junior Party: Anatoli Ledenev; Supplemental Order Authorizing Motions dated Aug. 5, 2016. 6 pages.
Patent Interference No. 106,054(JTM), declared Jun. 1, 2016. Senior Party: Meir Adest; Junior Party: Anatoli Ledenev; Ledenev First Supplemntal Notice of Related Proceedings dated Aug. 12, 2017. 3 pages.
Patent Interference No. 106,054(JTM), declared Jun. 1, 2016. Senior Party: Meir Adest; Junior Party: Anatoli Ledenev; Ledenev Notice of Filing of Reissue Application dated Apr. 4, 2017. 3 pages.
U.S. Appl. No. 16/925,236, filed Jul. 9, 2020. First Named Inventor: Ledenev. Filing Receipt dated Jul. 23, 2020. 4 pages.
U.S. Appl. No. 17/036,630, filed Sep. 29, 2020. First Named Inventor: Ledenev. Filing Receipt dated Oct. 20, 2020. 4 pages.
U.S. Appl. No. 16/440,843, filed Jun. 13, 2019. First Named Inventor: Porter. Notice of Allowance dated Oct. 8, 2020. 9 pages.
U.S. Appl. No. 16/834,639, filed Mar. 30, 2020. First Named Inventor: Ledenev. Ex Parte Quayle Action dated Oct. 14, 2020. 7 pages.
U.S. Appl. No. 16/172,524, filed Oct. 26, 2018. First Named Inventor: Ledenev. Office Action dated Sep. 2, 2020. 8 pages.
European Patent Application No. 13877614.1. Dated Sep. 25, 2020 Communication Under Rule 71(3) EPC. 6 pages.
U.S. Appl. No. 17/036,630, filed Sep. 29, 2020. First Named Inventor: Ledenev. Notice of Allowance dated Nov. 18, 2020. 9 pages.
U.S. Appl. No. 17/036,630, filed Sep. 29, 2020. First Named Inventor: Ledenev. Updated Filing Receipt dated Nov. 3, 2020. 4 pages.
U.S. Appl. No. 16/439,430, filed Jun. 12, 2019. Office Action dated Dec. 7, 2020. 41 pages.
U.S. Appl. No. 17/036,630, filed Sep. 29, 2020. First Named Inventor: Ledenev.
U.S. Appl. No. 17/063,669, filed Oct. 5, 2020. First Named Inventor: Ledenev.
U.S. Appl. No. 17/063,669, filed Oct. 5, 2020. First Named Inventor: Ledenev. Filing Receipt dated Nov. 25, 2020 4 pages.
U.S. Appl. No. 16/834,639, filed Mar. 30, 2020. First Named Inventor: Ledenev.
U.S. Appl. No. 16/172,524, filed Oct. 26, 2018. First Named Inventor: Ledenev. Notice of Allowance dated Jan. 11, 2021. 8 pages.
European Patent Application No. 08732274.9 dated Oct. 15, 2020. Communication under Rule 91(3) EPC. 52 pages.
U.S. Appl. No. 16/834,639, filed Mar. 30, 2020. First Named Inventor: Ledenev. Notice of Allowance dated Feb. 2, 2021. 10 pages.
U.S. Appl. No. 17/063,669, filed Oct. 5, 2020. Filing Receipt mailed Jan. 13, 2021. 4 pages.
U.S. Appl. No. 17/036,630. Issue Notification dated Dec. 16, 2020. 1 pages.
U.S. Appl. No. 17/063,669, filed Oct. 5, 2020. First Named Inventor: Ledenev. Ex Parte Quayle Action dated Feb. 10, 2021. 6 pages.
U.S. Appl. No. 16/834,639, filed Mar. 30, 2020. Updated Notice of Allowance and Interview Summary dated Feb. 24, 2021. 3 pages.
U.S. Appl. No. 16/440,843, filed Jun. 13, 2019. First Named Inventor: Porter. Issue Notification dated Feb. 10, 2021. 1 page.
U.S. Appl. No. 16/834,639, filed Mar. 30, 2020. Notice of Allowance dated Mar. 12, 2021. 17 pages.
European Patent Application No. 08732274.9, Decision to Grant a European Patent Pursuant to Article 97(1) EPC dated Mar. 12, 2021. 2 pages.
U.S. Appl. No. 16/439,430, filed Jun. 12, 2019. Office Action dated Apr. 7, 2021. 52 pages.

(56) References Cited

OTHER PUBLICATIONS

SolarEdge System Design and the National Electrical Code, Revisoin 1.Apr. 4, 2011. John Berdner. (c) 2011. 10 pages.
U.S. Appl. No. 16/172,524, filed Oct. 26, 2018. First Named Inventor: Ledenev. Corrected Notice of Allowability dated Mar. 18, 2021. 7 pages.
U.S. Appl. No. 17/011,931, filed Nov. 18, 2020. Filing Receipt dated Apr. 16, 2021. 4 pages.
European Patent Application No. 13877614.1. Decision to Grant a European Patent dated Apr. 9, 2021. 2 pages.
U.S. Appl. No. 16/172,524, filed Oct. 26, 2018. First Named Inventor: Ledenev. Corrected Notice of Allowability dated Apr. 21, 2021. 2 pages.
U.S. Appl. No. 16/172,524, filed Oct. 26, 2018. First Named Inventor: Ledenev. Issue Notification dated Apr. 28, 2021. 2 pages.
U.S. Appl. No. 16/172,524, filed Oct. 26, 2018. First Named Inventor: Ledenev. Notice of Allowance dated Jun. 28, 2021. 8 pages.
U.S. Appl. No. 16/834,639, filed Mar. 30, 2020. First Named Inventor: Ledenev. Corrected Notice of Allowability dated Jun. 28, 2021. 2 pages.
U.S. Appl. No. 16/834,639, filed Mar. 30, 2020. First Named Inventor: Ledenev. Issue Notification dated Jun. 30, 2021. 1 page.
U.S. Appl. No. 17/063,669, filed Oct. 5, 2020. First Named Inventor: Ledenev. Corrected Notice of Allowability dated Jun. 28, 2021. 2 pages.
European Patent No. 3176933. Communication regarding the expiry for the time limit within which notice of opposition may be filed dated Jun. 30, 2021. 1 page.
U.S. Appl. No. 17/379,516, filed Jul. 19, 2021. Filing Receipt dated Aug. 2, 2021. 4 pages.
U.S. Appl. No. 16/439,430, filed Jun. 12, 2019. Notice of Allowance dated Aug. 26, 2021. 43 pages.
U.S. Appl. No. 16/172,254, filed Oct. 26, 2018. Issue Notification dated Aug. 25, 2021. 1 page.
U.S. Appl. No. 17/321,329, filed May 14, 2021. First Named Inventor: Ledenev. Notice of Publication of Application dated Sep. 2, 2021. 1 page.
U.S. Appl. No. 16/295,236, filed Jul. 9, 2020. First Named Inventor: Anatoli Ledenev. Office Action dated Sep. 24, 2021. 10 pages.
European Patent Application No. 17209600.0, Communication pursuant to Article 94(3) EPC, dated Sep. 14, 2021. 4 pages.
U.S. Appl. No. 16/028,188, filed Jul. 5, 2018. First Named Inventor: Ledenev.
U.S. Appl. No. 15/164,806, filed May 25, 2016. First Named Inventor: Ledenev. Corrected Notice of Allowability dated Jun. 25, 2018. 2 pages.
U.S. Appl. No. 15/213,193, filed Jul. 18, 2016. First Named Inventor: Ledenev. Notice of Allowance dated Jul. 6, 2018. 12 pages.
U.S. Appl. No. 15/262,916, filed Sep. 12, 2016. First Named Inventor: Porter. Office Action dated Jul. 27, 2018. 8 pages.
Chinese Patent Application No. 201380076592.9. English Translation of the 4th Notification of Office Action, dated Jul. 18, 2018. 2 pages.
U.S. Appl. No. 16/028,188, filed Jul. 5, 2018. First Named Inventor: Ledenev. Filing Receipt dated Aug. 8, 2012. 3 pages.
U.S. Appl. No. 15/793,704, filed Oct. 25, 2017. First Named Inventor: Porter. Office Action dated Sep. 17, 2018. 10 pages.
U.S. Appl. No. 15/094,803, filed Apr. 8, 2016. First Named Inventor: Porter. Restriction Requirement dated Sep. 10, 2018. 6 pages.
U.S. Appl. No. 16/028,188, filed Jul. 5, 2018. First Named Inventor: Ledenev. Updated Filing Receipt mailed Sep. 21, 2018. 3 pages.
European Patent Application No. 17150670.2. Office Action dated Sep. 10, 2018. 7 pages.
U.S. Appl. No. 15/213,193, filed Jul. 18, 2016. Corrected Notice of Allowability dated Oct. 5, 2018. 2 pages.
Canadian Patent Application No. 2942616, First Named Inventor: Ledenev. Requisition by the Examiner dated Sep. 21, 2018. 5 pages.
European Patent Application No. 08732274.9. Communcation/Office Action dated Nov. 13, 2018. 4 pages.
Japanese Patent Application No. 2016-160797. Penultimate office action dated Oct. 31, 2018. 3 pages.
Indian Patent Application No. 3419/KOLNP/2015, filed Oct. 14, 2015. Examination Report dated Dec. 28, 2018. 9 pages.
Chinese Patent Application No. 201380076592.9. Notice of Decision of Granting Patent Right for Invention dated Jan. 10, 2019.
U.S. Appl. No. 15/612,892, filed Jun. 2, 2017. First Named Inventor: Ledenev. Office Action dated Dec. 4, 2018. 17 pages.
U.S. Appl. No. 15/262,916, filed Sep. 12, 2016. Notice of Allowance dated Feb. 1, 2019. 8 pages.
U.S. Appl. No. 15/793,704, filed Oct. 25, 2017. First Named Inventor: Porter. Notice of Allowance dated Feb. 27, 2019.
U.S. Appl. No. 15/094,803, filed Apr. 8, 2016, first named inventor: Porter. Office Action dated May 2, 2019. 9 pages.
U.S. Appl. No. 15/679,745, filed Aug. 17, 2017. First Named Inventor: Ledenev. Office Action dated May 8, 2019. 23 pages.
Canadian Patent Application No. 2942616, First Named Inventor: Ledenev. Notice of Allowance dated Apr. 8, 2019. 1 page.
U.S. Appl. No. 15/262,916, filed Sep. 12, 2016. Corrected Notice of Allowability dated May 21, 2019. 2 pages.
European Patent Application No. 08796302.1, Office Action dated May 13, 2019. 3 pages.
European Patent Application No. 08732274.9. Communcation/Office Action dated May 22, 2019. 3 pages.
European Patent Application No. 17150670.2. Summons to Attend Oral Proceedings and Preliminary Opinion dated Apr. 8, 2019. 13 pages.
U.S. Appl. No. 16/439,430, filed Jun. 12, 2019. First Named Inventor: Porter.
U.S. Appl. No. 16/440,843, filed Jun. 13, 2019. First Named Inventor: Porter.
All pleadings, orders, exhibits, and any and all other documents in Interference No. 106,112, declared May 31, 2019.
European Patent Application No. 13877614, Communication/Office Action dated Nov. 7, 2019. 4 pages.
U.S. Appl. No. 16/439,430, filed Jun. 12, 2019. First Named Inventor: Porter. Filing Receipt dated Jun. 19, 2019. 4 pages.
U.S. Appl. No. 16/439,430, filed Jun. 12, 2019. First Named Inventor: Porter. Office Action dated Oct. 30, 2019. 39 Pages.
U.S. Appl. No. 16/440,843, filed Jun. 13, 2019. First Named Inventor: Porter. Filing Receipt dated Jun. 21, 2019. 4 pages.
Indian Patent Application No. 1568/NOLNP/2010. Official Communication from the Office dated Oct. 16, 2019. 4 pages.
European Patent Application No. 17150670.2, Communcation/Office Action dated Nov. 8, 2019. 4 pages.
European Patent Application No. 17150670.2, Communication re: Intention to Grant dated Dec. 5, 2019. 38 pages.
European Patent Application No. 08796302.1, Communication pursuant to Article 94(3) EPC, dated Dec. 4, 2019. 4 pages.
European Patent Application No. 13877614, Communication/Office Action dated Oct. 31, 2019. 3 pages.
Interference No. 106,054, declared Jun. 1, 2016. Judgment—Bd. R. 127(a) entered Dec. 31, 2019. 4 pages.
Interference No. 106,054, declared Jun. 1, 2016. Decision on Motions entered Dec. 31, 2019. 37 pages.
U.S. Appl. No. 15/679,745, filed Aug. 17, 2017, first named Inventor: Ledenev. Notice of Allowance dated Feb. 12, 2020.
European Patent Application No. 17209600.0, Communication pursuant to Article 94(3) EPC, dated Feb. 7, 2020. 5 pages.
U.S. Appl. No. 15/679,745, filed Aug. 17, 2017, first named Inventor: Ledenev. Issue Notification dated Feb. 12, 2020. 1 page.
U.S. Appl. No. 16/028,188, filed Jul. 5, 2018, first named inventor: Ledenev. Ex Parte Quayle Action dated Mar. 13, 2020. 6 pages.
Interference No. 106,112, declared May 31, 2019. Decision on Motions entered Mar. 25, 2020. 37 pages.
Interference No. 106,112, declared May 31, 2019. Judgment entered Mar. 25, 2020. 4 pages.
U.S. Appl. No. 16/439,430, filed Jun. 12, 2019. First Named Inventor: Porter. Office Action dated May 14, 2020.

(56) References Cited

OTHER PUBLICATIONS

U.S. Appl. No. 16/028,188, filed Jul. 5, 2018. First Named Inventor: Ledenev. Corrected Notice of Allowability dated Jun. 10, 2020. 2 pages.
U.S. Appl. No. 16/028,188, filed Jul. 5, 2018. First Named Inventor: Ledenev. Issue Notification dated Jun. 24, 2020. 1 page.
European Patent Application No. 17150670.2, Intent to Grant dated Jul. 30, 2020. 2 pages.
Patent Interference No. 106,054(JTM), declared Jun. 1, 2016. Senior: Meir Adest; Junior Party: Anatoli Ledenev.; 13 pages.
Linear Technology Specification Sheet, LTC3440, Micropower Synchronous Buck-Boost DC/DC Converter © Linear Technology Corporation 2001. 20 pages.
Linear Technology Specification Sheet, LTC3443, High Current Micropower 600kHz Synchronous Buck-Boost DC/DC Converter © Linear Technology Corporation 2004. 16 pages.
Linear Technology Specification Sheet, LTC3780, High Efficiency Synchronous, 4-Switch Buck-Boost Controller © Linear Technology Corporation 2005. 30 pages.
Andersen, G., et al. Current Programmed Control of a Single Phase Two-Switched Buck-Boost Power Factor Correction Circuit. Aalbord University of Energy Technology, Denmark. © 2001 IEEE. 7 pages.
Andersen, G., et al. Utilizing the free running Current Programmed Control as a Power Factor Correction Technique for the two switch Buck-Boost converter. Aalborg University, Institute of Energy Technology. © 2004 IEEE. 7 pages.
Caricchi, F., et al. 20 KW Water-Cooled Prototype of a Buck-Boost Bidreictional DC-DC Converter Topology for Electrical Vehicle Motor Drives. University of Rome, "La Sapienza". © 1995 IEEE. 6 pages.
Caricchi, F., et al. Prototype of Innovative Wheel Direct Drive with Water-Cooled Axial-Flux PM Motor for Electric Vehicle Applications. University of Rome, "La Sapienza". © 1996 IEEE. 7 pages.
Caricchi, F., et al. Study of Bi-Directional Buck-Boost Converter Topologies for Application in Electrical Vehicle Motor Drives. University of Rome, "La Sapienza". © 1998 IEEE. 7 pages.
Chomsuwan, K., et al. Photovoltaic Grid-Connected Inverter Using Two-Switch Buck-Boost Converter. Ncational Science and Technology Development Agency, Thailand. © 2002 IEEE. 4 pages.
Zhou, P. & Phillips, T., Linear Technology Advertisement, Design Notes. Industry's First 4-Switch Buck-Boost Controller Achieves Highest Efficiency Using a Single Inducutor. © 2005 Linear Technology Corporation. 2 pages.
Enslin, J. H. R., Maximum Power Point Tracking: A Cost Saving Necessity In Solar Energy Systems. Department of Electrical Engineering. University of Pretoria, South Africa. © 1990 IEEE. 5 pages.
Gaboriault, M., et al., A High Efficiency, Non-Inverting, Buck-Boost DC-DC Converter. Allegro Microsystems. © 2004 IEEE. 5 pages.
Hua, et al. Comparative Study of Peak Power Tracking Techniques for Solar Storage System. Department of Electrical Engineering, National Yunlin University of Science and Technology. © 1998 IEEE. 7 pages.
Kjaer, et al. A Review of Single-Phase Grid-Connected Inverters for Photovoltaic Modules. IEEE Transactions on Industry Applications, vol. 41, No. 5, Sep./Oct. 2005. 15 pages.
Micrel, MIC2182 High Efficiency Synchronous Buck Controller. Apr. 22, 2004. 28 pages.
Midya, P., et al. Buck or Boost Tracking Power Converter. IEEE Power Electronics Letteres, vol. 2, No. 4, Dec. 2004. 4 pages.
Decker, D.K. Methods for Utilizing Maximum Power From a Solar Array. JPL Quarterly Technical Review. vol. 2, No. 1, Apr. 1972. 12 pages.
Roy, et al. Battery Charger using Bicycle. EE318 Electronic Design Lab Project, EE Dept, IIT Bombay, Apr. 2006. 14 pages.
Sullivan, C. et al. A High-Efficiency Maximum Power Point Tracker for Photovoltaic Arrays in a Solar-Powered Race Vehicle. University of California, Berkeley. © 1993 IEEE. 7 pages.

Viswanathan, K., et al. Dual-Mode Control of Cascade Buck-Boost PFC Converter. 2004 35th Annual IEEE Power Electronics Specialists Conference. 7 pages.
Walker, Geoffrey R. (2000) Evaluating MPPT converter topologies using a MATLAB PV model. In Krivda, Anrej (Ed.) AUPEC 2000: Innovation for Secure Power, Queensland University of Technology, Brisbane, Australia, pp. 138-143.
Zhang, P., et al. Hardware Design Experiences in ZebraNet. Department of Electrical Engineering, Princeton University. © 2004. 12 pages.
Mohan, Ned. Excerpt from Power electronics : converters, applications, and design. © 1989, 1995. 2 pages.
Bower, et al. "Certification of Photovoltaic Inverters: The Initial Step Toward PV System Certification" © 2002 IEEE. 4 pages.
NFPA Article 690 Solar Photovoltaic Systems, 70 National Electrical Code 70-545—90-566 (2005); 16 pages.
Patent Interference No. 106,054(JTM), declared Jun. 1, 2016. Senior: Meir Adest; Junior Party: Anatoli Ledenev; Second Declaration of Eric A. Seymour dated Sep. 23, 2016; 108 pages.
Patent Interference No. 106,054(JTM), declared Jun. 1, 2016. Senior: Meir Adest; Junior Party: Anatoli Ledenev; Declaration of Eric A. Seymour dated Sep. 9, 2016; 32 pages.
Patent Interference No. 106,054(JTM), declared Jun. 1, 2016. Senior: Meir Adest; Junior Party: Anatoli Ledenev; Declaration of Marc E. Herniter in Support of Motion 1, dated Sep. 9, 2016. 38 pages.
Patent Interference No. 106,054(JTM), declared Jun. 1, 2016. Senior: Meir Adest; Junior Party: Anatoli Ledenev; Declaration of Marc E. Herniter in Support of Motion 2, dated Sep. 9, 2016. 24 pages.
Patent Interference No. 106,054(JTM), declared Jun. 1, 2016. Senior: Meir Adest; Junior Party: Anatoli Ledenev; Declaration Redeclaration entered Jun. 30, 2016. 6 pages.
Patent Interference No. 106,054(JTM), declared Jun. 1, 2016. Senior: Meir Adest; Junior Party: Anatoli Ledenev; Adest List of Proposed Motions dated Jul. 20, 2016. 5 pages.
Patent Interference No. 106,054(JTM), declared Jun. 1, 2016. Senior: Meir Adest; Junior Party: Anatoli Ledenev; Ledenev List of Proposed Motions dated Jul. 20, 2016. 16 pages.
Patent Interference No. 106,054(JTM), declared Jun. 1, 2016. Senior: Meir Adest; Junior Party: Anatoli Ledenev; Ledenev Motion 4 dated Sep. 9, 2016. 29 pages.
Patent Interference No. 106,054(JTM), declared Jun. 1, 2016. Senior: Meir Adest; Junior Party: Anatoli Ledenev; Ledenev Motion 7 dated Sep. 23, 2016. 32 pages.
Patent Interference No. 106,054(JTM), declared Jun. 1, 2016. Senior: Meir Adest; Junior Party: Anatoli Ledenev; Ledenev Motion 8 dated Sep. 26, 2016. 4 pages.
Patent Interference No. 106,054(JTM), declared Jun. 1, 2016. Senior: Meir Adest; Junior Party: Anatoli Ledenev; Adest Motion 1 dated Sep. 9, 2016. 37 pages.
Patent Interference No. 106,054(JTM), declared Jun. 1, 2016. Senior: Meir Adest; Junior Party: Anatoli Ledenev; Adest Motion 2 dated Sep. 9, 2016. 33 pages.
Patent Interference No. 106,054(JTM), declared Jun. 1, 2016. Senior: Meir Adest; Junior Party: Anatoli Ledenev; Adest Opposition 8 dated Oct. 3, 2016. 10 pages.
U.S. Appl. No. 13/430,388, filed Mar. 26, 2012. First Named Inventor: Adest.
U.S. Appl. No. 11/950,271, filed Dec. 4, 2007. First Named Inventor: Adest.
Linear Technology, LTC3780, High Efficiency, Synchronous, 4-Switch Buck-Boost Controller. (c) Linear Technology 2005. 28 pages.
Patent Interference No. 106,054(JTM), declared Jun. 1, 2016. Senior Party: Meir Adest; Junior Party: Anatoli Ledenev; Ledenev Opposition 1, filed Nov. 14, 2016. 36 pages.
Patent Interference No. 106,054(JTM), declared Jun. 1, 2016. Senior Party: Meir Adest; Junior Party: Anatoli Ledenev; Adest Opposition 4, filed Nov. 14, 2016. 36 pages.
Patent Interference No. 106,054(JTM), declared Jun. 1, 2016. Senior Party: Meir Adest; Junior Party: Anatoli Ledenev; Adest Opposition 7, filed Nov. 14, 2016. 39 pages.

(56) References Cited

OTHER PUBLICATIONS

Patent Interference No. 106,054(JTM), declared Jun. 1, 2016. Senior Party: Meir Adest; Junior Party: Anatoli Ledenev; Order Denying Request to Waive Board 122 and SO 122.6, entered Dec. 20, 2016. 6 pages.
Patent Interference No. 106,054(JTM), declared Jun. 1, 2016. Senior Party: Meir Adest; Junior Party: Anatoli Ledenev; Order Granting Ledenev Miscellaneous Motion 8, entered Dec. 20, 2016. 4 pages.
Patent Interference No. 106,054(JTM), declared Jun. 1, 2016. Senior Party: Meir Adest; Junior Party: Anatoli Ledenev; Adest Reply 1, filed Dec. 23, 2016. 25 pages.
Patent Interference No. 106,054(JTM), declared Jun. 1, 2016. Senior Party: Meir Adest; Junior Party: Anatoli Ledenev; Ledenev Reply 4, filed Dec. 23, 2016. 29 pages.
Patent Interference No. 106,054(JTM), declared Jun. 1, 2016. Senior Party: Meir Adest; Junior Party: Anatoli Ledenev; Ledenev Reply 7, filed Dec. 23, 2016. 28 pages.
TwentyNinety.com/en/about-us/, printed Aug. 17, 2010; 2 pages.
International Patent Application No. PCT/US08/60345. International Prelimianry Report on Patentability dated Aug. 30, 2010; 24 pages.
U.S. Appl. No. 61/252,998, filed Oct. 19, 2009, entitled Solar Module Circuit with Staggered Diode Arrangement; First Named Inventor: Ledenev; 55 pages.
U.S. Appl. No. 12/682,882; Nonfinal Office Action dated Sep. 27, 2010; First Named Inventor: Porter; 18 pages.
U.S. Appl. No. 12/682,882; Examiner's Interview Summary dated Oct. 20, 2010; dated Oct. 26, 2010; 4 pages.
U.S. Appl. No. 12/738,068; Examiner's Interview Summary dated Oct. 20, 2010; 2 pages.
U.S. Appl. No. 12/738,068; Nonfinal Office Action dated Nov. 24, 2010; 8 pages.
U.S. Appl. No. 12/682,559; Nonfinal Office Action dated Dec. 10, 2010; 12 pages.
European Patent Application No. 07 873 361.5 Office Communication dated Jul. 12, 2010 and applicant's response dated Nov. 22, 2010; 24 pages.
International Patent Application No. PCT/US2008/079605. International Preliminary Report on Patentability dated Jan. 21, 2011; 7 pages.
Parallel U.S. Appl. No. 12/738,068; Examiner's Interview Summary dated Feb. 3, 2011; 2 pages.
Parallel U.S. Appl. No. 12/682,882; Examiner's Interview Summary dated Feb. 9, 2011; 4 pages.
Parallel U.S. Appl. No. 12/682,559; Examiner's Interview Summary dated Feb. 10, 2011; 3 pages.
International Patent Application No. PCT/US2010/053253. International Search Report and International Written Opinion of the International Searching Authority dated Feb. 22, 2011; 13 pages.
Parallel U.S. Appl. No. 12/682,559; Final Office Action dated Mar. 3, 2011; 13 pages.
U.S. Appl. No. 12/738,068; Notice of Allowance dated Feb. 24, 2011; 25 pages.
U.S. Appl. No. 12/955,704; Nonfinal Office Action dated Mar. 8, 2011; 7 pages.
U.S. Appl. No. 12/682,882; Final Office Action dated May 13, 2011; 17 pages.
U.S. Appl. No. 12/995,704; Notice of allowance dated Jul. 19, 2011; 5 pages.
International Application No. PCT/US09/41044; International Preliminary Report on Patentability dated Jul. 6, 2011; 14 pages.
U.S. Appl. No. 12/682,882; Notice of allowance dated Sep. 9, 2011; 9 pages.
U.S. Appl. No. 12/682,559; Nonfinal office action dated Sep. 23, 2011; 10 pages.
U.S. Appl. No. 13/275,147; Nonfinal office action dated Dec. 29, 2011; 10 pages.
U.S. Appl. No. 13/059,955; Nonfinal office action dated Jan. 23, 2012; 9 pages.
International Application No. PCT/US10/53253; International Preliminary Report on Patentability dated Jan. 25, 2012; 37 pages.
U.S. Appl. No. 12/682,559; Notice of allowance dated Apr. 17, 2012; 9 pages.
International Application No. PCT/US08/80794; International Preliminary Report on Patentability dated May 8, 2012; 7 pages.
U.S. Appl. No. 13/078,492; Nonfinal office action dated May 16, 2012, 10 pages.
U.S. Appl. No. 13/192,329; Final office action dated Jun. 13, 2012; 13 pages.
CN Patent Application No. 200880121101.7; office action dated Sep. 26, 2011; 6 pages.
CN Patent Application No. 200880121101.7; office action dated Jun. 11, 2012; 3 pages.
U.S. Appl. No. 13/192,329; Notice of Allowance dated Jul. 30, 2012; 5 pages.
International Application No. PCT/2012/022266, International Search Report dated Jul. 24, 2012; 5 pages.
International Application No. PCT/2012/022266, Written Opinion of the International Searching Authority dated Jul. 24, 2012; 16 pages.
Related U.S. Appl. No. 13/275,147; Final office action dated Aug. 24, 2012; 16 pages.
Related Chinese Patent Application No. 200880121009.0, Office Action dated Aug. 31, 2012; 12 pages.
Related U.S. Appl. No. 13/059,955; Final office action dated Sep. 27, 2012; 11 pages.
Parallel SG Patent Application No. 201107477-0; written opinion dated Nov. 27, 2012; 12 pages.
Parallel JP Patent Application No. 2010-529991; office action dated Dec. 14, 2012, 7 pages.
Parallel JP Patent Application No. 2010-529986; office action dated Mar. 5, 2013, 3 pages.
Related U.S. Appl. No. 13/078,492; Notice of Allowance dated Apr. 24, 2013, 10 pages.
Related U.S. Appl. No. 13/275,147; Notice of Allowance dated Jun. 3, 2013, 17 pages.
Related CN Patent Application No. 200880121101.7; Notice of Allowance dated Feb. 17, 2013, 3 pages.
Related Chinese Patent Application No. 200880121009.0, Office Action dated May 31, 2013, 7 pages.
Parallel JP Patent Application No. 2010-529991; office action dated Sep. 5, 2013, 6 pages.
U.S. Appl. No. 13/308,517, filed Nov. 3, 2011, First Named Inventor: Meir Adest.
U.S. Appl. No. 14/550,574, filed Nov. 21, 2014. First Named Inventor: Ledenev. Notice of Allowance dated Jun. 6, 2016; 12 pages.
Miwa, et al. High Efficiency Power Factor Correction Using Interleaving Techniques. (c) 1992 Laboratory for Electromagnetic and Electronic Systems, Massachusetts Institute of Technology. 12 pages.
Solar Sentry Corp., Protecting Solar Investment "Solar Sentry's Competitive Advantage", 4 pages estimated as Oct. 2008.
Anon Source; International Symposium on Signals, Circuits and Systems, Jul. 12-13, 2007; Iasi, Romania; Publisher: Institute of Electrical and Electroncis Engineers Computer Society; Abstract. 1 page.
Bascope, G.V.T.; Barbi, I; "Generation of a Family of Non-isolated DC-DC PWM Converters Using New Three-state Switching Cells;" 2000 IEEE 31st Annual Power Electronics Specialists Conference in Galway, Ireland; vol. 2, Abstract. 1 page.
Bower, et al. "Innovative PV Micro-Inverter Topology Eliminates Electrolytic Capacitors for Longer Lifetime," 1-4244-0016-3-06 IEEE p. 2038 (2006); 4 pages.
Cambridge Consultants, Interface Issue 43, Autumn 2007; 21 pages.
Case, M.J.; "Minimum Component Photovoltaic Array Maximum Power Point Tracker," Vector (Electrical Engineering), Jun. 1999; Abstract. 1 page.
Tse, K.K.et al. "A Novel Maximum Power Point Tracking Technique for PV Panels;" Dept. of Electronic Engineering, City Uni-

(56) References Cited

OTHER PUBLICATIONS versity of Hong Kong; Source: PESC Record—IEEE Annual Power Electronics Specialists Conference, v 4, 2001, p. 1970-1975, Jun. 17-21, 2001; Abstract. 1 page.

Cuadras, A; Ben Amor, N; Kanoun, O; "Smart Interfaces for Low Power Energy Harvesting Systems," 2008 IEEE Instrumentation and Measurement Technology Conference May 12-15, 2008 in Victoria, BC Canada; Abstract. 1 page.

Dallas Semiconductor; Battery I.D. chip from Dallas Semiconductor monitors and reports battery pack temperature, Bnet World Network, Jul. 10, 1995; 1 page.

De Doncker, R. W.; "Power Converter for PV-Systems," Institute for Power Electrical Drives, RWTH Aachen Univ. Feb. 6, 2006; 18 pages.

De Haan, S.W.H., et al; Test results of a 130W AC module, a modular solar AC power station, Photovoltaic Energy Conversion, 1994; Conference Record of the 24th IEEE Photovoltaic Specialists Conference Dec. 5-9, 1994; 1994 IEEE First World Conference. Abstract, 1 page.

Dehbonei, Hooman; Corp author(s): Curtin University of Technology, School of Electrical and Computer Engineering; 2003; Description: xxi, 284 leaves; ill.; 31 cm. Dissertation: Thesis. Abstract; 1 page.

Jung, D; Soft Switching Boost Converter for Photovoltaic Power Generation System, 2008 13th International Power Electronics and Motion Control Conference (EPE-PEMC 2008); 5 pages.

Duan, Rouo-Yong; Chang, Chao-Tsung; "A Novel High-efficiency Inverter for StAMPT-alone and Grid-connected Systems," 2008 3rd IEEE Conference on Industrial Electronics and Applications in Singapore, Jun. 3-5, 2008; Article No. 4582577. Abstract. 3 pages.

Duncan, Joseph, A Global Maximum Power Point Tracking DC-DC Converter, Massachussetts Institute of Technology, Dept. of Electrical Engineering and Computer Science Dissertation; Jan. 20, 2005; 80 pages.

Edelmoser, K. H. et al.; High Efficiency DC-to-AC Power Inverter with Special DC Interface; Professional Paper, ISSN 0005-1144, Automatika 46 (2005) 3-4, 143-148 6 pages.

Enrique, J.M.; Duran, E; Sidrach-de-Cadona, M; Andujar, JM; "Theoretical Assessment of the Maximum Power Point Tracking Efficiency of Photovoltaic Facilities with Different Converter Topologies;" Source: Solar Energy 81, No. 1 (2007); 31 (8 pages).

Enslin, J.H.R.; "Integrated Photovoltaic Maximum Power Point Tracking Converter;" Industrial Electronics, IEEE Transactions on vol. 44, Issue 6, Dec. 1997, pp. 769-773.

Ertl, H; Kolar, J.W.; Zach, F.C.; "A Novel Multicell DC-AC Converter for Applications in Renewable Energy Systems;" IEEE Transactions on Industrial Electronics, Oct. 2002; vol. 49, Issue 5, Abstract. 1 page.

Esmaili, Gholamreza; Application of Advanced Power Electronics in Renewable Energy Sources and Hygrid Generating Systems, Ohio State University, Graduate Program in Electrical and Computer Engineering, 2006, Dissertation. 169 pages.

Gomez, M; "Consulting in the solar power age," IEEE-CNSV: Consultants' Network of Silicon Valley, Nov. 13, 2007; 30 pages.

Guo, G.Z.; "Design of a 400W, 1 Omega, Buck-boost Inverter for PV Applications," 32nd Annual Canadian Solar Energy Conference, Jun. 10, 2007; 18 pages.

Hashimoto et al; "A Novel High Performance Utility Interactive Photovoltaic Inverter System," Department of Electrical Engineering, Tokyo Metropolitan University, 1-1 Miinami-Osawa, Hachioji, Tokyo, 192-0397, Japan; pp. 2255-2260, © 2000.

Ho, Billy M.T.; "An Integrated Inverter with Maximum Power Tracking for Grid-Connected PV Systems;" Department of Electronic Engineering, City University of Hong Kong; Conference Proceedings, 19th Annual IEEE Applied Power Electronics Conference and Exposition, Feb. 22-26, 2004; p. 1559-1565.

http://www.solarsentry.com; Protecting Your Solar Investment, 2005, Solar Sentry Corp. 1 page.

Hua, C et al; "Control of DC-DC Converters for Solar energy System with Maximum Power Tracking," Department of Electrical Engineering; National Yumin University of Science & Technology, Taiwan; vol. 2, Nov. 9-14, 1997; pp. 827-832.

International Application filed Apr. 15, 2008, Serial No. PCT/US08/60345; First Named Inventor: Porter. 87 pages.

International Application filed Jul. 18, 2008, Serial No. PCT/US08/70506; First Named Inventor: Schatz. 137 pages.

International Application filed Mar. 14, 2008, Serial No. PCT/US08/57105; 90 pages.

International Application filed Oct. 10, 2008, Serial No. PCT/US08/79605; 46 pages.

International Application No. PCT/US08/57105, International Search Report dated Jun. 25, 2008; 5 pages.

International Application No. PCT/US08/57105, Written Opinion dated Jun. 25, 2008; 42 pages.

International Application No. PCT/US08/60345, International Search Report dated Aug. 18, 2008; 1 page.

International Application No. PCT/US08/60345, Written Opinion dated Aug. 18, 2008; 10 pages.

International Application No. PCT/US08/70506, International Search Report dated Sep. 26, 2008; 4 pages.

International Application No. PCT/US08/70506, Written Opinion dated Sep. 26, 2008; 7 pages.

Joo, Hyuk Lee; "Soft Switching Multi-Phase Boost Converter for Photovoltaic System," Power Electronics and Motion Control Conference, 2008. EPE-PEMC 2008. 13th Sep. 1, 2008. Abstract only. 1 page.

Kaiwei, Yao, Mao, Ye; Ming, Xu; Lee, F.C.; "Tapped-inductor Buck Converter for High-step-down DC-DC Conversion," IEEE Transactions on Power Electronics, vol. 20, Issue 4, Jul. 2005; Abstract. 1 page.

Kang, F et al; Photovoltaic Power Interface Circuit Incorporated with a Buck-boost Converter and a Full-bridge Inverter; doi: 10.1016-j.apenergy.2004.10.009 2 pages.

Kern, G; "SunSine (TM)300: Manufacture of an AC Photovoltaic Module," Final Report, Phases I & II, Jul. 25, 1995-Jun. 30, 1998; National Renewable Energy Laboratory, Mar. 1999; NREL-SR-520-26085; 33 pages.

Kretschmar, K et al; "An AC Converter with a Small DC Link Capacitor for a 15kW Permanent Magnet Synchronous Integral Motor,Power Electronics and Variable Speed Drive," 1998;7th International Conference; Conf. Publ. No. 456; Sep. 21-23, 1998; 4 pages.

Kroposki, H. Thomas and Witt, B & C; "Progress in Photovoltaic Components and Systems," National Renewable Energy Laboratory, May 1, 2000; NREL-CP-520-27460; 7 pages.

Kuo, J.-L.; "Duty-based Control of Maximum Power Point Regulation for Power Converter in Solar Fan System with Battery Storage," Proceedings of the Third IASTED Asian Conference, Apr. 2, 2007, Phuket, Thialand. pp 163-168.

Lim, Y.H. et al; "Simple Maximum Power Point Tracker for Photovoltaic Arrays," Electronics Letters May 25, 2000; vol. 36, No. 11. 2 pages.

Linear Technology Specification Sheet, LTM4607, estimated as Nov. 14, 2007; 24 pages.

Matsuo, H et al; "Novel Solar Cell Power Supply System using the Multiple-input DC-DC Converter;" Telecommunications Energy Conference, 1998; Intelec, 20th International, pp. 797-802.

Mutoh, Nobuyoshi, "A Controlling Method for Charging Photovoltaic Generation Power Obtained by a MPPT Control Method to Series Connected Ultra-electric Double Layer Capacitors;" Intelligent Systems Department, Faculty of Engineering, Graduate School of Tokyo; 39th IAS Annual Meeting (IEEE Industry Applications Society); v 4, 2004, Abstract. 1 page.

Mutoh, Nobuyoshi; A Photovoltaic Generation System Acquiring Efficiently the Electrical Energy Generated with Solar Rays,; Graduate School of Tokyo, Metropolitan Institute of Technology; Source: Series on Energy and Power Systems, Proceedings of the Fourth IASTED International Conference on Power and Energy Systems, Jun. 28-30, 2004; Abstract. 1 page.

Nishida, Yasuyuki, "A Novel Type of Utility-interactive Inverter for Photovoltaic System," Conference Proceedings, IPEMC 2004; 4th International Power and Electronics Conference, Aug. 14-16, 2004; Xian Jiaotong University Press, Xian, China, Abstract. 1 page.

(56) References Cited

OTHER PUBLICATIONS

Oldenkamp, H. et al; AC Modules: Past, Present and Future, Workshop Installing the Solar Solution; Jan. 22-23, 1998; Hatfield, UK; 6 pages.

Jung, et al. DC-Link Ripple Reduction of Series-connected Module Integrated Converter for Photovoltaic Systems. International Conference of Power Electronics—ECCE Asia May 30-Jun. 2, 2011. 4 pages.

U.S. Appl. No. 13/503,011, filed Apr. 19, 2012. First Named Inventor: Anatoli Ledenev. Notice of Allowance dated Jun. 29, 2016; 15 pages.

U.S. Appl. No. 13/934,102, filed Jul. 2, 2013. First Named Inventor: Anatoli Ledenev. Notice of Allowance dated Jun. 30, 2016.; 11 pages.

U.S. Appl. No. 13/254,666, filed Sep. 2, 2011. First Named Inventor: Robert M. Porter. Notice of Allowance dated Jul. 14, 2016; 11 pages.

U.S. Appl. No. 15/181,174, filed Jun. 13, 2016. First Named Inventor: Anatoli Ledenev.

U.S. Appl. No. 15/094,803, filed Apr. 8, 2016. First Named Inventor: Robert M. Porter.

U.S. Appl. No. 15/164,806, filed May 25, 2016. First Named Inventor: Anatoli Ledenev.

Japanese Application No. 2004-046358, published Sep. 2, 2005. Filed Feb. 23, 2004. First Named Inventor: Yoshitake Akira. Abstract only. 1 page.

Japanese Application No. 06-318447, filed Dec. 21, 1994. First Named Inventor: Tanaka Kunio. Abstract only. 1 page.

European Application No. 0677749A3, filed Apr. 13, 1995. First Named Inventor: Takehara. Abstract only, 2 pages.

U.S. Appl. No. 13/254,666, filed Sep. 2, 2011. First Named Inventor: Robert M. Porter.

International Patent Application Publication No. 2009/007782A4, published Jan. 15, 2009. Applicant: SolarEdge Ltd. Abstract and Claims only. 5 pages.

International Patent Application Publication No. 2009/072075A3, published Jun. 11, 2009. Applicant: SolarEdge Ltd. Abstract and Search Report. 4 pages.

European Patent Application No. EP0964457A3, published May 24, 2006. Applicant: Canon Kabushiki Kaisha. Abstract and Search Report. 4 pages.

European Patent Application No. EP0978884A3, published Mar. 22, 2000. Applicant: Canon Kabushiki Kaisha. Abstract and Search Report. 4 pages.

European Patent Application No. EP1120895A3, published May 6, 2004. Applicant: Murata Manufacturing Co., Ltd. Abstract and Search Report. 3 pages.

Japanese Patent No. 05003678A, published Jan. 8, 1993. Applicant: Toshiba F EE Syst KK, et al. Abstract only. 1 page.

Japanese Patent No. 6035555A, published Feb. 10, 1994. Applicant: Japan Storage Battery Co. Ltd. Abstract only. 1 page.

Japanese Patent No. 06141261A, published May 20, 1994. Applicant: Olympus Optical Co. Ltd. Abstract only. 1 page.

Japanese Patent No. 7026849A, published Jan. 27, 1995. Applicant: Sekisui House Ltd. Abstract only. 1 page.

Japanese Patent No. 07222436A, published Aug. 18, 1995. Applicant: Meidensha Corp. Abstract only. 1 page.

Japanese Patent No. 08033347A, published Feb. 2, 1996. Applicant: Hitachi Ltd et al. Abstract only. 1 page.

Japanese Patent No. 08066050A, published Mar. 8, 1996. Applicant: Hitachi Ltd. Abstract only. 1 page.

Japanese Patent No. 08181343A, published Jul. 12, 1996. Applicant: Sharp Corp. Abstract only. 1 page.

Japanese Patent No. 8204220A, published Aug. 9, 1996. Applicant: Mistubishi Electric Corp. Abstract only. 1 page.

Japanese Patent No. 09097918A, published Apr. 8, 1997. Applicant: Canon Inc. Abstract only. 1 page.

Japanese Patent No. 056042365A, published Apr. 20, 1981. Applicant: Seiko Epson Corp. Abstract only. 1 page.

Japanese Patent No. 60027964A, published Feb. 13, 1985. Applicant: NEC Corp. Abstract only. 1 page.

Japanese Patent No. 60148172A, published Aug. 5, 1985. Applicant: Seikosha Co. Ltd. Abstract only. 1 page.

Japanese Patent No. 62154121A, published Jul. 9, 1987. Applicant: Kyocera Corp. Abstract only. 1 page.

Japanese Patent No. 2000020150A, published Jan. 21, 2000. Applicant: Toshiba Fa Syst Eng Corp et al. Abstract only. 1 page.

Japanese Patent No. 2002231578A, published Aug. 16, 2002. Applicant: Meidensha Corp. Abstract only. 1 page.

Japanese Patent No. 07058843A, published Mar. 3, 1995. Applicant: Matsushita Electric Ind. Co. Ltd. Abstract only. 1 page.

Japanese Patent Application No. 2007104872A, published Apr. 19, 2007. Applicant: Ebara Densan Ltd. Abstract only. page.

Japanese Patent Application No. 2007225625A, filed Sep. 6, 2007. Applicant: Ahei Toyoji et al. Abstract only. 1 page.

Japanese Patent Application No. 2001086765A, filed Mar. 30, 2001. Applicant: Powerware Corp. Abstract only. A page.

Korean Patent Application No. 102005-7008700, filed May 13, 2005. Applicant: Exar Corporation. Abstract only. 2 pages.

Korean Patent Application No. 102004-0099601, filed Dec. 1, 2004. Applicant: Lee, Seong Ryong. Abstract only. 2 pages.

Korean Patent Application No. 102007-0036528, filed Apr. 13, 2007. Applicant: Industry-Academic Coop Foundation of Kyungnam Univ. Abstract only 2 pages.

International Application Publication No. WO2006/013600A3, published Feb. 9, 2006. Applicant: Universita Degli Studi DiRoma "La Sapienza". Abstract and Search Report. 5 pages.

International Application Publication No. 2006/048689A3, published May 11, 2006. Applicant: Enecsys Ltd. Abstract and Search Report. 7 pages.

International Application Publication No. 2009/140551A3, published Nov. 19, 2009. Applicant: National Semiconductor Corp. Abstract and Search Report. 3 pages.

International Application Publication No. 2009/140543A3, published Nov. 19, 2009. Applicant: National Semiconductor Corp. Abstract and Search Report. 4 pages.

International Application Publication No. 2009/140536A3, published Nov. 19, 2009. Applicant: National Semiconductor Corp. Abstract and Search Report. 4 pages.

Japanese Patent No. 09148613A, filed Jun. 6, 1997. Applicant: Sanyo Electric Co Ltd. Abstract only. 1 page.

International Application Publication No. 2010/062662A3, published Jun. 3, 2010. Applicant: Tigo Energy, Inc. Abstract and Search Report. 4 pages.

International Application Publication No. 2009/114341A3, published Sep. 17, 2009. Applicant: Tigo Energy, Inc. Abstract and Search Report. 3 pages.

International Application Publication No. 2009/075985A3, published Jun. 18, 2009. Applicant: Tigo Energy, Inc. Abstract and Search Report. 4 pages.

International Application Publication No. 2009/064683A3, published May 22, 2009. Applicant: Tigo Energy, Inc. Abstract and Search Report. 3 pages.

International Application Publication No. 2009/059028A3, published May 7, 2009. Applicant: Tigo Energy, Inc. Abstract and Search Report. 3 pages.

United States International Trade Commission, Investigation No. 337-TA-1327. Respondent Solaredge Technologies, Inc. and Solaredge Technologies, Ltd.'s Initial Invalidity Contentions. Nov. 2, 2022. 86 pages.

United States International Trade Commission, Investigation No. 337-TA-1327. Respondent Solaredge Technologies, Inc. and Solaredge Technologies, Ltd.'s Final Invalidity Contentions. Jan. 9, 2023. 103 pages.

United States International Trade Commission, Investigation No. 337-TA-1327. Complainant Ampt, LLC's Final Rebuttal Contentions. Jan. 23, 2023. 145 pages.

United States International Trade Commission, Investigation No. 337-TA-1327. Exhibit 630/917-A—Dynamic Drinkware Analysis for U.S. Pat. No. 9,088,178. 237 pages. Nov. 2, 2022.

(56) References Cited

OTHER PUBLICATIONS

United States International Trade Commission, Investigation No. 337-TA-1327. Exhibit 630/917-B—Dynamic Drinkware Analysis for US Publication No. 2009/0160259 to Naiknaware. 83 pages. Nov. 2, 2022.
United States International Trade Commission, Investigation No. 337-TA-1327. Exhibit 630/917-C—Dynamic Drinkware Analysis for US Publication No. 2009/0078300 to Ang et al. 36 pages. Nov. 2, 2022.
United States International Trade Commission, Investigation No. 337-TA-1327. Exhibit 630/917-D—Dynamic Drinkware Analysis for U.S. Pat. No. 8,773,092 to Fishelov. 4 pages. Nov. 2, 2022.
United States International Trade Commission, Investigation No. 337-TA-1327. Exhibit 630-A—Count from Interference No. 106,112. 25 pages. Nov. 2, 2022.
United States International Trade Commission, Investigation No. 337-TA-1327. Exhibit 630-B—Adest: 35 USC 102 & 103 Invalidity Chart for U.S. Pat. No. 9,673,630. 78 pages. Nov. 2, 2022.
United States International Trade Commission, Investigation No. 337-TA-1327. Exhibit 630-C—Klein 35 USC 102 & 103 Invalidity Chart for U.S. Pat. No. 9,673,630. 41 pages. Nov. 2, 2022.
United States International Trade Commission, Investigation No. 337-TA-1327. Exhibit 630-D—Caldwell 35 USC 102 & 103 Invalidity Chart for U.S. Pat. No. 9,673,630. 39 pages. Nov. 2, 2022.
United States International Trade Commission, Investigation No. 337-TA-1327. Exhibit 630-E—Naiknaware 35 USC 102 & 103 Invalidity Chart for U.S. Pat. No. 9,673,630. 54 pages. Nov. 2, 2022.
United States International Trade Commission, Investigation No. 337-TA-1327. Exhibit 630-F—Ang 35 USC 102 & 103 Invalidity Chart for U.S. Pat. No. 9,673,630. 67 pages. Nov. 2, 2022.
United States International Trade Commission, Investigation No. 337-TA-1327. Exhibit 630-G 35 USC 103 Invalidity Chart for U.S. Pat. No. 9,673,630. 229 pages. Nov. 2, 2022.
United States International Trade Commission, Investigation No. 337-TA-1327. Exhibit 917-A: Invalidity of U.S. Pat. No. 11,289,917 based on Count from Interference No. 106,112. 19 pages. Nov. 2, 2022.
United States International Trade Commission, Investigation No. 337-TA-1327. Exhibit 917-B—Adest: 35 USC 102 & 103 Invalidity Chart for U.S. Pat. No. 11,289,917. 51 pages. Nov. 2, 2022.
United States International Trade Commission, Investigation No. 337-TA-1327. Exhibit 917-C—Klein: 35 USC 102 & 103 Invalidity Chart for U.S. Pat. No. 11,289,917. 34 pages. Nov. 2, 2022.
United States International Trade Commission, Investigation No. 337-TA-1327. Exhibit 917-D—Caldwell 35 USC 103 Invalidity Chart for U.S. Pat. No. 11,289,917. 32 pages. Nov. 2, 2022.
United States International Trade Commission, Investigation No. 337-TA-1327. Exhibit 917-E—Naiknaware 35 USC 102 & 103 Invalidity Chart for U.S. Pat. No. 11,289,917. 42 pages. Nov. 2, 2022.
United States International Trade Commission, Investigation No. 337-TA-1327. Exhibit 917-F—Ang 35 USC 103 Invalidity Chart for U.S. Pat. No. 11,289,917. 46 pages. Nov. 2, 2022.
United States International Trade Commission, Investigation No. 337-TA-1327. Exhibit 917-G 35 USC 103 Invalidity Chart for U.S. Pat. No. 11,289,917. 155 pages. Nov. 2, 2022.
U.S. Appl. No. 17/379,516, filed Jul. 19, 2021. Notice of New or Revised Projected Publication Date mailed Dec. 3, 2021. 1 page.
U.S. Appl. No. 16/439,430, filed Jun. 12, 2019. Corrected Notice of Allowability dated Dec. 20, 2021. 2 pages.
U.S. Appl. No. 16/925,236, filed Jul. 9, 2020. Applicant-initiated Interview Summary dated Dec. 27, 2021. 2 pages.
U.S. Appl. No. 16/439,430, filed Jun. 12, 2019. Issue Notification dated Dec. 28, 2021. 1 page.
U.S. Appl. No. 17/379,516, filed Jul. 19, 2021. Office Action dated Jan. 4, 2022. 7 pages.
European Patent Application No. 08796302.1, Communication pursuant to Article 94(3) EPC, dated Dec. 21, 2021. 4 pages.
U.S. Appl. No. 17/379,516, filed Jul. 19, 2021. Corrected Notice of Allowability dated Mar. 2, 2022. 2 Pages.
U.S. Appl. No. 17/379,516, filed Jul. 19, 2021. Notice of Allowance dated Feb. 4, 2022. 8 pages.
U.S. Appl. No. 17/379,516, filed Jul. 19, 2021. Issue Notification dated Mar. 9, 2022. 1 page.
U.S. Appl. No. 17/379,516, filed Jul. 19, 2021. Notice of Publication dated Mar. 10, 2022. 1 page.
European Patent No. 2973982, Communication regarding the expiry of the time limit within which notice of opposition may be filed, dated Mar. 14, 2022. 1 page.
U.S. Appl. No. 16/925,236, filed Jul. 9, 2020. Notice of Allowance dated Mar. 17, 2022. 8 pages.
U.S. Appl. No. 16/925,236, filed Jul. 9, 2020. Examiner Interview Summary Record dated Mar. 17, 2022. 1 page.
U.S. Appl. No. 17/537,116, filed Nov. 29, 2021. Notice of Publication of Application dated Mar. 24, 2022. 1 page.
U.S. Appl. No. 16/925,236, filed Jul. 9, 2020. Corrected Notice of Allowability dated Jul. 7, 2022.
U.S. Appl. No. 17/706,194, filed Mar. 28, 2022. First Named Inventor: Ledenev. Non Final Office Action dated Aug. 2, 2022. 5 pages.
European Patent Application No. 17 209 600.0, Communication under Rule 71(3) EPC, dated Jun. 15, 2022. 52 pages.
U.S. Appl. No. 17/231,329, filed May 14, 2021. First Named Inventor: Ledenev. Non Final Office Action dated Aug. 10, 2022. 6 pages.
U.S. Appl. No. 17/866,793, filed Jul. 18, 2022. Filing Receipt dated Jul. 29, 2022. 4 pages.
U.S. Appl. No. 17/706,194, filed Mar. 28, 2022. First Named Inventor: Ledenev. Notice of Publication dated Jul. 14, 2022. 1 pages.
U.S. Appl. No. 17/902,650, filed Sep. 2, 2022. Filing Receipt dated Oct. 13, 2022. 4 pages.
U.S. Appl. No. 17/902,650, filed Sep. 2, 2022. Updated Filing Receipt dated Oct. 18, 2022. 4 pages.
U.S. Appl. No. 17/902,650, filed Sep. 2, 2022. Updated Filing Receipt dated Dec. 9, 2022. 4 pages.
U.S. Appl. No. 17/902,650, filed Sep. 2, 2022. Updated Filing Receipt dated Dec. 28, 2022. 4 pages.
U.S. Appl. No. 17/902,650, filed Sep. 2, 2022. Non Final Office Action dated Jan. 27, 2023. 7 pages.
U.S. Appl. No. 17/706,194, filed Mar. 28, 2022. First Named Inventor: Ledenev. Non Final Office Action dated Nov. 15, 2022. 9 pages.
U.S. Appl. No. 17/321,239, filed May 14, 2021. First Named Inventor: Ledenev. Notice of Allowance dated Jan. 26, 2023. 8 pages.
European Patent Application No. 17209600.0, Commucation under Rule 71(3) EPC, dated Jan. 5, 2023. 52 pages.
U.S. Appl. No. 17/902,650, filed Sep. 2, 2022. Notice of Publication of Application dated Mar. 23, 2023. 1 page.
Adverse Decisions in Interference involving Patent No. 8004116, received Jan. 31, 2023. 1 page.
Adverse Decisions in Interference involving Patent No. 7843085, received Jan. 31, 2023. 1 page.
Patent Interference No. 106,140 (DK), declared Jun. 26, 2023. Declaration of Interference dated Jun. 26, 2023. 9 pages.
U.S. Appl. No. 15/653,049, filed Jul. 18, 2017.
U.S. Appl. No. 14/078,011, filed Nov. 12, 2013.
U.S. Appl. No. 15/139,745, filed Apr. 27, 2016.
U.S. Appl. No. 12/911,153 filed Oct. 25, 2010.
U.S. Appl. No. 17/321,329, filed May 14, 2021. First named inventor: Ledenev. Notice of Allowance dated May 15, 2023. 8 pages.
Counterpart European Patent Application No. 17209600.0, Decision to Grant a European Patent pursuant to Article 97 (1) EPC dated May 11, 2023. 3 pages.
Counterpart European Patent Application No. 17209600.0, Transmission of the Certificate for a European patent pursuant to Rule 74 EPC dated Jun. 20, 2023. 2 pages.
U.S. Appl. No. 17/902,650, filed Sep. 2, 2022. First named inventor: Ledenev. Office Action dated Jun. 2, 2023. 8 pages.
U.S. Appl. No. 18/347,035, filed Jul. 5, 2023. Not yet publicly available.

(56) References Cited

OTHER PUBLICATIONS

U.S. Appl. No. 17/873,438, filed Jul. 26, 2022.
Patent Interference No. 106, 140 (DK), declared Jun. 26, 2023. Solaredge Notice of Related Proceedings dated Jul. 10, 2023. 4 pages.
Crews, Ronald., AN-1820 LM5032 Interleaved Boost Converter, Application Report SNVA335A-May 2008 Revised May 2013. Texas Instruments. 13 pages.
U.S. Appl. No. 18/242,226, filed Sep. 5, 2023.
U.S. Appl. No. 17/866,793, filed Jul. 18, 2022. Notice of Allowance dated Jul. 26, 2023. 8 pages.
U.S. Appl. No. 17/706,194, filed Mar. 28, 2022. First Named Inventor: Ledenev. Examiner Initiated Interview Summary dated Jun. 16, 2023. 2 pages.
U.S. Appl. No. 17/706,194, filed Mar. 28, 2022. First Named Inventor: Ledenev. Notice of Allowance dated May 2, 2023. 8 pages.
U.S. Appl. No. 18/242,226, filed Sep. 5, 2023. Filing Receipt dated Sep. 14, 2023. 3 pages.
Patent Interference No. 106, 140 (DK), declared Jun. 26, 2023. Ampt, LLC First Supplemental Notice of Related Proceedings dated Jul. 10, 2023. 3 pages.
Patent Interference No. 106, 141 (DK), declared Oct. 23, 2023. Declaration of Interference dated Oct. 23, 2023. 10 pages.
Patent Interference No. 106, 142 (DK), declared Oct. 23, 2023. Declaration of Interference dated Oct. 23, 2023. 10 pages.
Patent Interference No. 106, 143 (DK), declared Oct. 23, 2023. Declaration of Interference dated Oct. 23, 2023. 11 pages.
Patent Interference No. 106, 140 (DK), declared Jun. 26, 2023. Order—Show Cause dated Oct. 11, 2023. 3 pages.
United States U.S. Appl. No. 17/866,793, filed Jul. 18, 2022. Ex Parte Quayle Action dated Oct. 11, 2023. 6 pages.
Patent Interference No. 106, 144 (DK), declared Oct. 23, 2023. Declaration of Interference dated Oct. 23, 2023. 10 pages.
Patent Interference No. 106, 140 (DK), Judgment dated Nov. 17, 2023. 3 pages.
U.S. Appl. No. 17/902,650, filed Sep. 2, 2022. First named inventor: Ledenev. Notice of Allowance dated Oct. 20, 2023. 8 pages.
U.S. Appl. No. 17/706,194, filed Mar. 28, 2022. First named inventor: Ledenev. Corrected Notice of Allowability dated Oct. 17, 2023. 2 pages.
U.S. Appl. No. 17/321,329, filed May 14, 2021. First named inventor: Ledenev. Corrected Notice of Allowability dated Oct. 17, 2023. 2 pages.
Patent Interference No. 106, 141 (DK), declared Oct. 23, 2023. Order—Show Cause dated Dec. 4, 2023. 3 pages.
Patent Interference No. 106, 142 (DK), declared Oct. 23, 2023. Order—Show Case dated Dec. 4, 2023. 3 pages.
U.S. Appl. No. 18/531,499, filed Dec. 6, 2023. First named inventor: Porter.
Adverse Decisions in Interference, U.S. Pat. No. 9397497, Interference 106, 139 (sic), dated Dec. 26, 2023. 1 page.
Patent Interference No. 106, 143 (DK), declared Oct. 23, 2023. Termination dated Dec. 1, 2023. 3 pages.
European Patent Application No. 08796302.1, Office Action dated Jun. 28, 2016, 4 pages.
European Patent Application No. 08796302.1, Summons to Attend Oral Proceedings dated Jun. 1, 2023, 6 pages.
European Patent Application No. 08796302.1, Cancellation of Oral Proceedings dated Nov. 24, 2023, 1 page.
US Patent Interference No. 106, 143 involving U.S. Pat. No. 7,919,953, Termination dated Dec. 1, 2023, 3 pages.
U.S. Appl. No. 18/531,499, Filing Receipt dated Dec. 13, 2023, 3 pages.
India Patent App. No. 3419/KOLNP/2015, Hearing Adjournment Notice dated Dec. 19, 2023, 2 pages.
India Patent App. No. 3419/KOLNP/2015, Hearing Adjournment Notice dated Jan. 15, 2024, 3 pages.
India Patent App. No. 3419/KOLNP/2015, Hearing Adjournment Notice dated Feb. 2, 2024, 3 pages.
US Patent Interference No. 106, 142 involving U.S. Pat. No. 9,466,737, Judgment dated Jan. 25, 2024, 3 pages.
US Patent Interference No. 106, 141 involving U.S. Pat. No. 10,326,282, Judgment dated Jan. 25, 2024, 3 pages.
U.S. Appl. No. 17/321,329, Issue Notification dated Feb. 7, 2024, 2 pages.
U.S. Appl. No. 17/706,194, Issue Notification dated Feb. 7, 2024, 2 pages.
European Patent Application No. 08796302.1, Intention to Grant, dated Jan. 12, 2024, 65 pages.
U.S. Appl. No. 17/321,329, Decision on Petition dated Feb. 15, 2024, 1 page.
U.S. Appl. No. 18/242,226, Notice of Allowance dated Feb. 23, 2024, 8 pages.
U.S. Appl. No. 17/706,194, Decision on Petition dated Feb. 21, 2024, 1 page.
U.S. Appl. No. 17/902,650, Notice of Allowance dated Feb. 22, 2024, 8 pages.
U.S. Appl. No. 17/866,793, Notice of Allowance dated Feb. 22, 2024, 8 pages.
U.S. Appl. No. 17/866,793, Notice of Allowance dated Mar. 6, 2024, 8 pages.
U.S. Appl. No. 17/321,329, Notice of Allowance dated Mar. 21, 2024, 7 pages.
U.S. Appl. No. 17/706,194, Notice of Allowance dated Apr. 1, 2024, 8 pages.
U.S. Appl. No. 18/242,226, Issue Notification dated Apr. 23, 2024, 2 pages.
U.S. Appl. No. 17/902,650, Corrected Notice of Allowance dated May 6, 2024, 2 pages.

COORDINATED CONVERTER REACTIVELY ALTERING DISABLING PHOTOVOLTAIC ELECTRICAL ENERGY POWER SYSTEM

This application is a continuation of, and claims the benefit of and priority to U.S. patent application Ser. No. 16/439,430, filed Jun. 12, 2019, which is a continuation of, and claims the benefit and priority to U.S. patent application Ser. No. 15/793,704, filed Oct. 25, 2017 and issuing as U.S. Pat. No. 10,326,283 on Jun. 18, 2019, which is a continuation of, and claims the benefit and priority to U.S. patent application Ser. No. 15/094,803, filed Apr. 8, 2016, which is a continuation of, and claims benefit of and priority to, U.S. patent application Ser. No. 13/346,532, filed Jan. 9, 2012, which is a continuation of, and claims benefit of and priority to, U.S. patent application Ser. No. 12/682,882, filed Apr. 13, 2010, and issued as U.S. Pat. No. 8,093,756 on 10 Jan. 10, 2012, which is the National Stage of International Patent Application No. PCT/US2008/060345, filed Apr. 15, 2008, which claims priority to and the benefit of U.S. Provisional Application No. 60/980,157, filed Oct. 15, 2007, and claims priority to and the benefit of U.S. Provisional Application No. 60/982,053, filed Oct. 23, 2007, and claims priority to and the benefit of U.S. Provisional Application No. 60/986, 979, filed Nov. 9, 15, 2007, and is a continuation of, and claims benefit of and priority to, International Patent Application No. PCT/US2008/057105, filed Mar. 14, 2008, which claims priority to and the benefit of U.S. Provisional Application No. 60/980,157, filed Oct. 15, 2007, and claims priority to and the benefit of U.S. Provisional Application No. 60/982,053, filed Oct. 23, 2007, and claims priority to and the benefit of U.S. Provisional Application No. 60/986, 979, filed 20 Nov. 9, 2007, each said application hereby incorporated herein by reference in its entirety.

TECHNICAL FIELD

This invention relates to the technical field of alternative energy, specifically, methods and apparatus for creating electrical power from some type of alternative energy source to make it available for use in a variety of applications. Through perhaps four different aspects, the invention provides techniques and circuitry that can be used to harvest power at high efficiency from an alternative energy source such as a solar panel, or a sea of strings of panels so that this power can be provided for AC use, perhaps for transfer to a power grid or the like. These four aspects can exist perhaps independently and relate to: 1) controlling electrical power creation with an inverter, 2) operating an inverter at its maximal efficiency even when a solar panel's maximum power point would not be at that level, 3) protecting an inverter, and even 4) providing a system that can react and assure operation for differing components and perhaps even within code limitations or the like.

BACKGROUND

Renewable electrical energy that is electrical energy created from alternative sources such as those that are environmentally compatible and perhaps sourced from easily undisruptively available sources such as solar, wind, geothermal or the like is highly desirable. Considering, but not limiting, the example of solar power this is almost obvious. For years, solar power has been touted as one of the most promising for our increasingly industrialized society. Even though the amount of solar power theoretically available far exceeds most, if not all, other energy sources (alternative or not), there remain practical challenges to utilizing this energy. In general, solar power remains subject to a number of limitations that have kept it from fulfilling the promise it holds. In one regard, it has been a challenge to implement in a manner that provides adequate electrical output as compared to its cost. The present invention addresses an important aspect of this in a manner that significantly increases the ability to cost-effectively permit solar power to be electrically harnessed so that an AC output may be a cost-effective source of electrical power whether it be provided for internal use or for public consumption, such as feedback to a grid or the like.

Focusing on solar power as it may be applied in embodiments of the invention, one of the most efficient ways to convert solar power into electrical energy is through the use of solar cells. These devices create a photovoltaic DC current through the photovoltaic effect. Often these solar cells are linked together electrically to make a combination of cells into a solar panel or a PV (photovoltaic) panel. PV panels are often connected in series to provide high voltage at a reasonable current. Voltage, current, and power levels may be provided at an individual domestic level, such as for an individual house or the like. Similarly, large arrays of many, many panels may be combined in a sea of panels to create significant, perhaps megawatt outputs to public benefit perhaps as an alternative to creating a new coal burning power plant, a new nuclear power plant, or the like.

Regardless of the nature of the combination, the output (perhaps of a solar cell or a solar panel, or even combinations thereof) is then converted to make the electrical power most usable since the power converters often employed can use high voltage input more effectively. This converted output is then often inverted to provide an AC output as generally exists in more dispersed power systems whether at an individual domestic or even a public level. In a first stage in some systems, namely, conversion of the alternative source's input to a converted DC, conventional power converters sometimes even have at their input handled by an MPPT (maximum power point tracking) circuit to extract the maximum amount of power from one or more or even a string of series connected panels. One problem that arises with this approach, though, is that often the PV panels act as current sources and when combined in a series string, the lowest power panel can limit the current through every other panel. In a second stage in some systems, namely the inversion function to transform the DC into AC, another problem can be that operation of the conversion at maximum power point (MPP) can be somewhat incompatible with or at least suboptimal for an inverter. Prior to the present invention, it was widely seen that it was just an inherent characteristic that needed to be accepted and that the MPP conversion function was so electrically critical that it was generally accepted as a control requirement that made suboptimization at the inverter level merely a necessary attribute that was perhaps inherent in any converted-inverted system. Perhaps surprisingly, prior to this invention, the goal of optimizing both the MPP conversion function while also optimizing the inversion function was just not seen as an achievable or perhaps at least significant goal. The present invention proves that both such goals can not only be achieved, but the result can be an extraordinarily efficient system.

In understanding (and perhaps defending) the perceived paramount nature of an MPP operation, it may be helpful to understand that, in general, solar cells historically have been made from semiconductors such as silicon pn junctions. These junctions or diodes convert sunlight into electrical power. These diodes can have a characteristically low voltage output, often on the order of 0.6 volts. Such cells may behave like current sources in parallel with a forward diode. The output current from such a cell may be a function of many construction factors and, is often directly proportional to the amount of sunlight. The low voltage of such a solar cell can be difficult to convert to power suitable for supplying power to an electric power grid. Often, many diodes are connected in series on a photovoltaic panel. For example, a possible configuration could have 36 diodes or panels connected in series to make 21.6 volts. With the shunt diode and interconnect losses in practice such panels might only generate 15 volts at their maximum power point (MPP). For some larger systems having many such panels, even 15 volts may be too low to deliver over a wire without substantial losses. In addition, typical systems today may combine many panels in series to provide voltages in the 100's of volts in order to minimize the conduction loss between the PV panels and a power converter. Electrically, however, there can be challenges to finding the right input impedance for a converter to extract the maximum power from such a string of PV panels. Naturally, the input usually influences the output. Input variances can be magnified because, the PV panels usually act as current sources and the panel producing the lowest current can sometimes limit the current through the whole string. In some undesirable situations, weak panels can become back biased by the remainder of the panels. Although reverse diodes can be placed across each panel to limit the power loss in this case and to protect the panel from reverse breakdown, there still can be significant variances in the converted output and thus the inverted input. In solar panel systems, problems can arise due to: non-uniformity between panels, partial shade of individual panels, dirt or accumulated matter blocking sunlight on a panel, damage to a panel, and even non-uniform degradation of panels over time to name at least some aspects. These can all be considered as contributing to the perception that a varying inverted input was at least practically inevitable. Just the fact that a series connection is often desired to get high enough voltage to efficiently transmit power through a local distribution to a load, perhaps such as a grid-tied inverter has further compounded the aspect. In real world applications, there is also frequently a desire or need to use unlike types of panels without regard to the connection configuration desired (series or parallel, etc.). All of this can be viewed as contributing to the expectation of inevitability relative to the fact that the inverter input could not be managed for optimum efficiency.

In in previous stat-of-the-art system, acceptable efficiency has been at relatively lower levels (at least as compared to the present invention). For example, in the article by G. R. Walker, J. Xue and P. Sernia entitled "PV String Per-Module Maximum Power Point Enabling Converters" those authors may have even suggested that efficiency losses were inevitable. Lower levels of efficiency, such as achieved through their 'enhanced' circuitries, were touted as acceptable. Similarly, two of the same authors, G. R. Walker and P. Sernia in the article entitled "Cascaded DC-DC Converter Connection of Photovoltaic Modules" suggested that the needed technologies would always be at an efficiency disadvantage. These references even include an efficiency vs. power graph showing a full power efficiency of approximately 91%. With the high cost of PV panels operation through such a low efficiency converter it is no wonder that solar power has been seen as not yet readily acceptable for the marketplace. The present invention shows that this need not be true, and that much higher levels of efficiency are in fact achievable.

Another less understood problem with large series strings of PV panels may be with highly varying output voltage, the inverter stage driving the grid my need to operate over a very wide range also lowering its efficiency. It may also be a problem if during periods of time when the inverter section is not powering the grid that the input voltage to this stage may increase above regulatory limits. Or conversely, if the voltage during this time is not over a regulatory limit then the final operational voltage may be much lower than the ideal point of efficiency for the inverter. In addition, there may be start-up and protection issues which add significant cost to the overall power conversion process. Other less obvious issues affecting Balance of System (BOS) costs for a solar power installation are also involved. Thus, what at least one aspect of electrical solar power needs is an improvement in efficiency in the conversion stage of the electrical system. The present invention provides this needed improvement.

DISCLOSURE OF THE INVENTION

As mentioned with respect to the field of invention, the invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In various embodiments, the present invention discloses achievements, systems, and different initial exemplary control functionalities through which one may achieve some of the goals of the present invention. Systems provide for inverter controlled systems of photovoltaic conversion, high efficiency renewable energy creation, inverter protection designs, and even dynamically reactive conversion systems.

Some architectures may combine a PV panel with MPP and even a dual mode power conversion circuitry to make what may be referred to as a Power Conditioner (PC) element. Converters may have a topology such as the initial examples shown in FIGS. 10A and 10B; these are discussed in more detail in the priority applications. As discussed below, the Power Conditioners may be combined in series or parallel or any combination of series/parallel strings and even seas of panels that largely or even always produce their full output. Even differing types of panels, differing types of converters, and differing types of inverters may be combined.

In embodiments, this invention may permit in inverter to produce its maximum power thereby harvesting more total energy from the overall system. Interestingly, this may exist even while a converter alters its acceptance of alternative power to maintain an MPP. Embodiments may be configured so that the output may be a higher voltage AC output (for example, 400V or more). Additionally, configurations may allow for an easy to administer inverter protection, perhaps even with or without feedback elements.

MODE(S) FOR CARRYING OUT THE INVENTION

As mentioned above, the invention discloses a variety of aspects that may be considered independently or in combination with others. Initial understanding begins with the fact that one embodiment of a renewable electrical energy AC power system according to the present invention may combine any of the following concepts and circuits including: an inverter controlled system to at least some extent, a maximal efficiency inverter operational capability, a protected inverter alternative AC energy system, a dynamically reactive photovoltaic system, and an engineered code compliant alternative energy system. Aspects may include a very high efficiency photovoltaic converter, a multimodal photovoltaic converter, slaved systems, and even output voltage and/or output current protected system. Each of these should be understood from a general sense as well as through embodiments that display initial applications for implementation. Some initial benefits of each of these aspects are discussed individually and in combination in the following discussion as well as how each represents a class of topologies, rather than just those initially disclosed.

Figure 1:
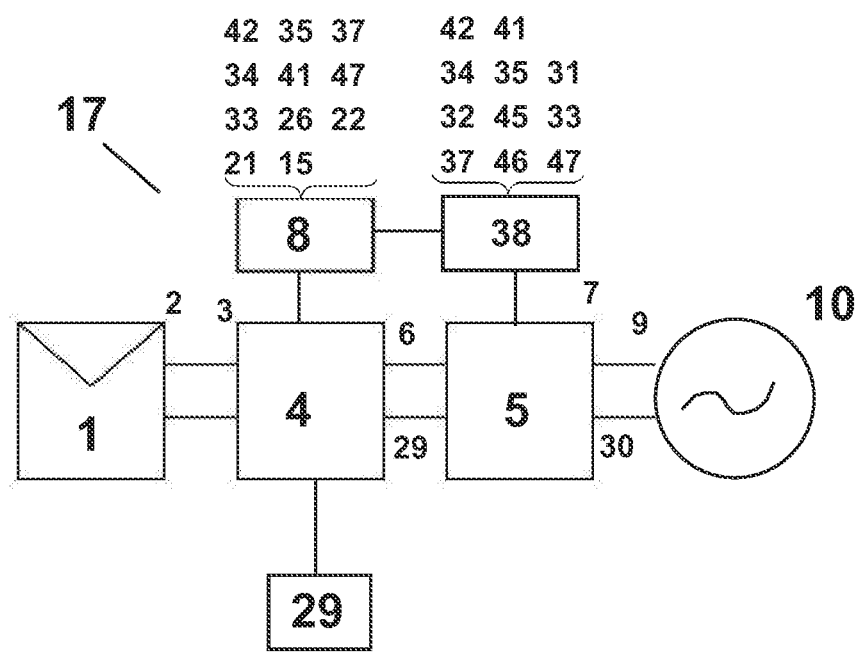
FIG. 1 shows a block diagram of a conversion system according to one embodiment of the invention for a single representative solar source.

FIG. 1 shows one embodiment of a renewable electrical energy power system illustrating the basic conversion and inversion principles of the present invention. As shown, it involves an alternative electrical energy source (1) (here indicated by nomenclature as a solar energy source) feeding into a photovoltaic DC-DC power converter (4) providing a converted output to a DC-AC inverter (5) that may perhaps ultimately interface with a grid (10). As may be appreciated, the alternative electrical energy source (1) may be a solar cell, a solar panel, or perhaps even a string of panels. Regardless, the alternative electrical energy source (1) may create an output such as a DC photovoltaic output (2). This DC photovoltaic output (2) may be established as a DC photovoltaic input (3) to the DC-DC power converter (4). Similarly, the DC-DC power converter (4) may create an output such as a DC photovoltaic output (6). This DC photovoltaic output (6), or more generally photovoltaic DC converter output, may be established as an inverter input (29) to the DC-AC inverter (5). Ultimately, the DC-AC inverter (5) may act to invert the converted DC and create an AC output such as a photovoltaic AC power output (30) which may be established an input to a grid (10), a domestic electrical system, or both, or some other power consuming device or thing.

The DC-DC power converter (4) may have its operation controlled by a capability generally indicated as converter functionality control circuitry (8). As one of ordinary skill in the art should well appreciate, this converter functionality control circuitry (8) may be embodied as true circuitry hardware or it may be firmware or even software to accomplish the desired control and would still fall within the meaning of a converter functionality control circuitry (8). Similarly, the DC-DC power converter (4) should be considered to represent photovoltaic DC-DC power conversion circuitry. In this regard it is likely that hardware circuitry is necessary, however combinations of hardware, firmware, and software should still be understood as encompassed by the circuitry term.

The DC-AC inverter (5) may also have its operation controlled by inverter control circuitry (38) that likewise may be embodied as true circuitry hardware or it may be firmware or even software to accomplish the desired control and would still fall within the meaning of an inverter controlling step or an inverter control circuitry (38).

As illustrated in FIG. 1, the various elements may be connected to each other. Direct connection is but one manner in which the various elements may be responsive to each other, that is, some effect in one may directly or indirectly cause an effect or change in another. For example, while there could be a connection between the inverter control circuitry (38) and the converter functionality control circuitry (8), effects can occur and responsiveness can exist even without the connection. In fact, in a preferred embodiment, no such direct connection is used as the effect can be cause even without such a connection.

Sequencing through the schematic diagram, it can be understood that the DC-DC power converter (4) may act to convert its input and thus provide a converted DC photovoltaic output (6) which may serve as an input to the DC-AC inverter (5) which may be of a variety of designs. This DC-AC inverter (5) may serve as one way to accomplish the step of inverting the DC power into an inverted AC (7) such as a photovoltaic AC power output (7) that can be used by, for example, a power grid (10) through some connection termed an AC power grid interface (9). In this manner the system may create a DC photovoltaic output (6) which may be established as an input to some type of DC-AC inverter (5). This step of inverting an input should be understood as encompassing and creation of any substantially alternating signal from any substantially unidirectional current flow signal even if that signal is not itself perfectly, or even substantially, steady.

Figure 2:
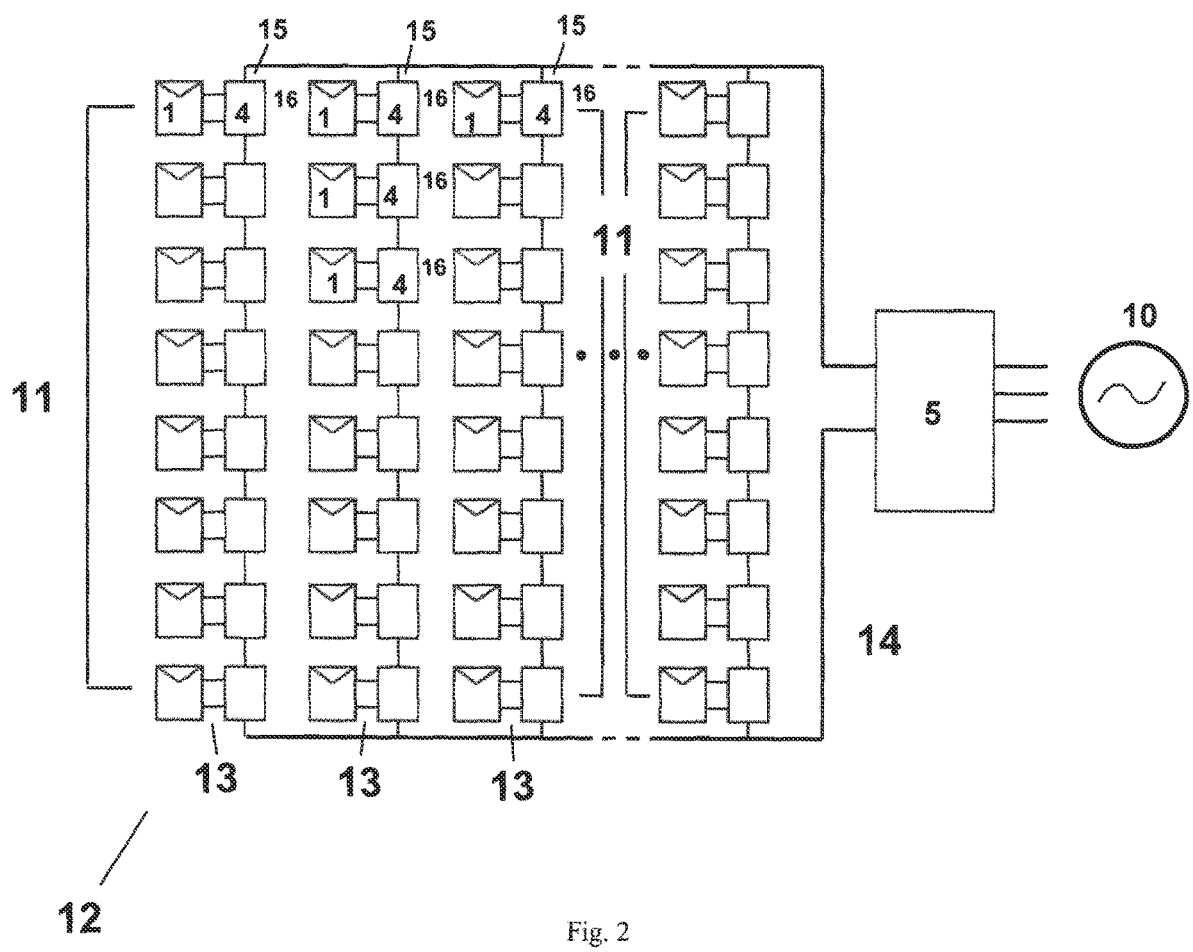
FIG. 2 shows a schematic of a sea of interconnected strings of panels according to one embodiment of the invention.
Figure 5:
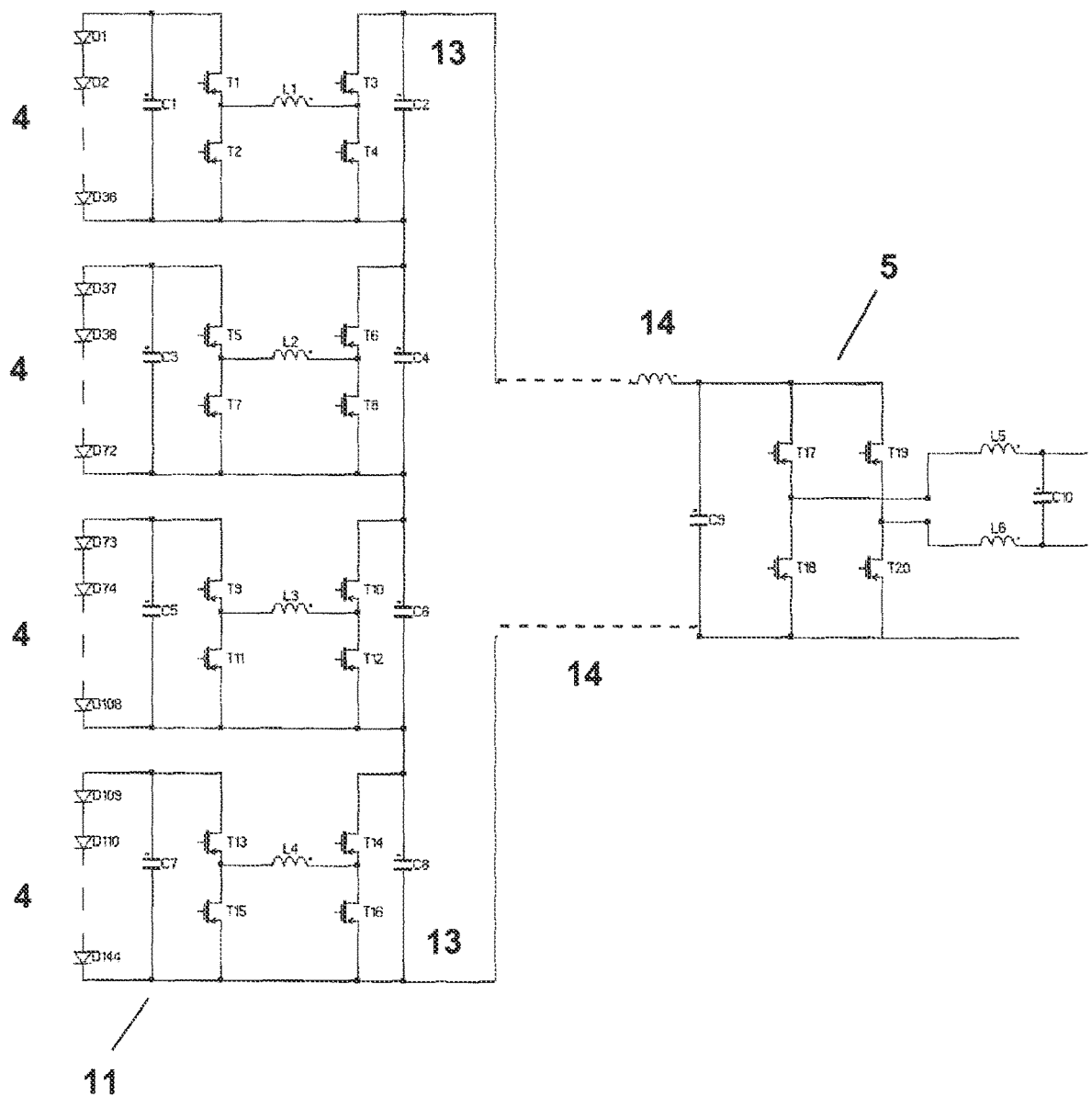
FIG. 5 shows an embodiment of the invention with series connected panels and a single grid-tied inverter configuration.

As shown in FIGS. 2 and 5, individual alternative electrical energy sources (1) (here shown as solar energy sources—whether at a cell, panel, or module level) may be combined to create a series of electrically connected sources. Such combinations may be responsive through either series or parallel connections. As shown in FIGS. 2 and 5, the connected plurality may form a string of electrically connected items, perhaps such as a string of electrically connected solar panels (11). As shown in FIG. 2, each of these strings may themselves be a component to a much larger combination perhaps forming a photovoltaic array (12) or even a sea of combined solar energy sources. By either physical or electrical layout, certain of these cells, panels, or strings may be adjacent in that they may be exposed to somewhat similar electrical, mechanical, environmental, solar exposure (or insolative) conditions. In situations where large arrays or seas are provided, it may be desirable to include a high voltage DC-AC solar power inverter perhaps with a three phase high voltage inverted AC photovoltaic output as schematically illustrated in FIG. 2.

As illustrated for an electrically serial combination, output may be combined so that their voltages may add whereas their currents may be identical. Conversely, electrically parallel combinations may exist. FIGS. 2 and 5 illustrate embodiments that are connected to accomplish serially combining or serially connecting items such as the converted DC photovoltaic outputs (6) to create a converted DC photovoltaic input to a DC-AC inverter (5). As shown, these serial connections may be of the converted DC photovoltaic outputs (6) which may then create a converted DC photovoltaic output (13) which may serve as a converted DC photovoltaic input (14) to some type of photovoltaic DC-AC inverter (5) or other load. Again, each alternative electrical energy source (1) may be a solar source such as at the cell, panel, string, or even array level. As would be well understood, parallel connections and the step of parallel connecting converters or their outputs could be accomplished as well.

As mentioned above, circuitry and systems can be configured to extract as much power as possible from an alternative electrical energy source (1); this is especially applicable for a solar power source or sources where insolation can be variable from source to even adjacent source. Electrically, this may be accomplished by achieving operation to operate at one or more solar cell, panel, or string's maximum power point (MPP) by MPP circuitry or maximum power point tracking (MPPT). Thus, in embodiments, a solar power system according to the invention may include an MPPT control circuit with a power conversion circuit. It may even include range limiting circuitry as discussed later.

Figure 3:
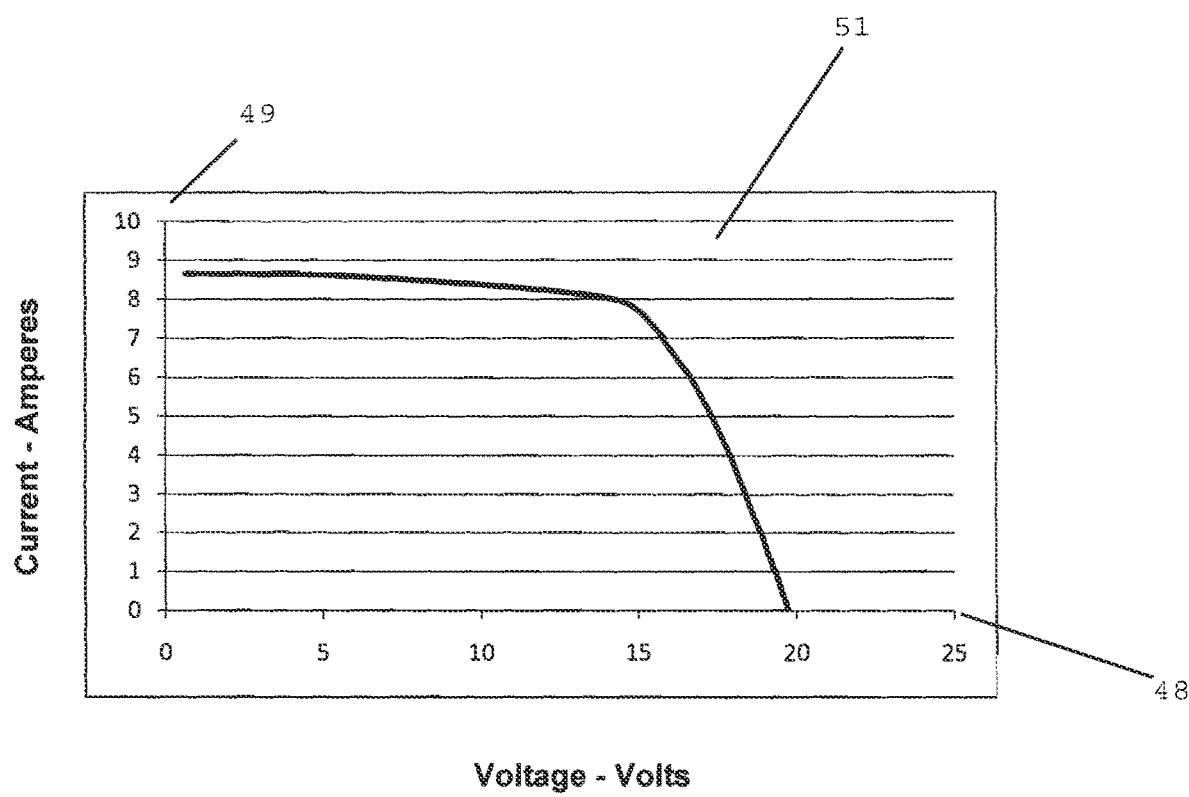
FIG. 3 shows a plot of a current and voltage relationship for a representative solar panel.
Figure 4:
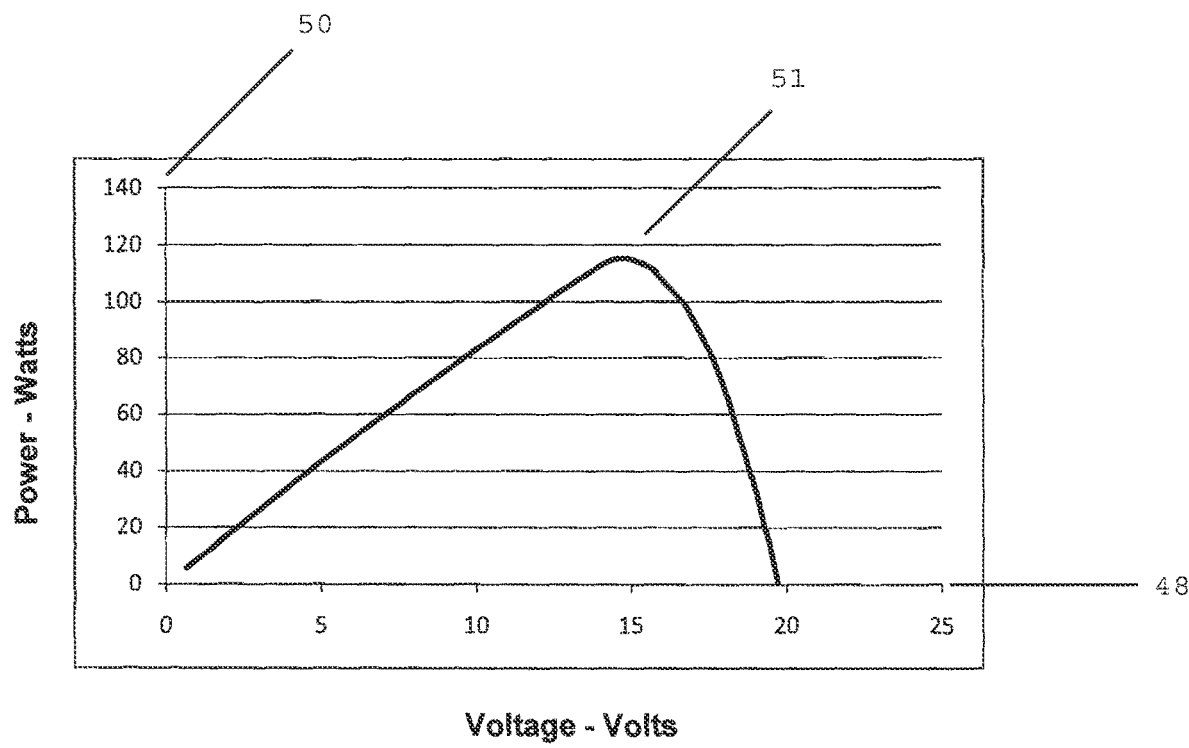
FIG. 4 shows a plot of a power and voltage relationship for a similar panel.

This aspect of maximum power point is illustrated by reference to FIGS. 3 and 4 and the Maximum Power Point Tracking (MPPT) circuit may be configured to find the optimum point for extracting power from a given panel or other alternative electrical energy source (1). As background, it should be understood that a panel such as may be measured in a laboratory may exhibit the voltage (48) and current (49) relationships indicated in FIG. 3. Current (49) in Amps is on the vertical axis. Voltage (48) in volts is on the horizontal axis. If one multiplies the voltage (48) times the current (49) to derive power (50) this is shown in FIG. 4. Power (50) is now on the vertical axis. The goal of an embodiment of an MPPT circuit as used here may be to apply an appropriate condition to a panel such that the panel may operate to provide its peak power. One can see graphically that the maximum power point (51) on this panel under the measurement conditions occurs when the panel produces approximately 15 volts and 8 amperes. This may be determined by a maximum photovoltaic power point converter functionality control circuitry (15) which may even be part or all of the modality of operation of the converter functionality control circuitry (8). In this fashion, the converter or the step of converting may provide a maximum photovoltaic power point modality of photovoltaic DC-DC power conversion or the step of maximum photovoltaic power point converting. This may be accomplished by switching and perhaps also by duty cycle switching at the converter or even inverter level and as such the system may accomplish maximum photovoltaic power point duty cycle switching or the step of maximum photovoltaic voltage determinatively duty cycle switching.

As one skilled in the art would appreciate, there are numerous circuit configurations that may be employed to derive MPP information. Some may be based on observing short circuit current or open circuit voltage. Another class of solutions may be referred to as a Perturb and Observe (P&O) circuit. The P&O methods may be used in conjunction with a technique referred to as a "hill climb" to derive the MPP. As explained below, this MPP can be determined individually for each source, for adjacent sources, of for entire strings to achieve best operation. Thus a combined system embodiment may utilize individually panel (understood to include any source level) dedicated maximum photovoltaic power point converter functionality control circuitries (16).

Regardless of whether individually configured or not, in one P&O method, an analog circuit could be configured to take advantage of existing ripple voltage on the panel. Using simple analog circuitry it may be possible to derive panel voltage and its first derivative (V'), as well as panel power and its first derivative (P'). Using the two derivatives and simple logic it may be possible to adjust the load on the panel as follows:

TABLE 1

| V' Positive | P' Positive | Raise Panel Voltage |
| V' Positive | P' Negative | Lower Panel Voltage |
| V' Negative | P' Positive | Lower Panel Voltage |
| V' Negative | P' Negative | Raise Panel Voltage |

There may be numerous other circuit configurations for finding derivatives and logic for the output, of course. In general, a power conditioner (17) may include power calculation circuitry, firmware, or software (21) which may even be photovoltaic multiplicative resultant circuitry (22). These circuitries may act to effect a result or respond to an item which is analogous to (even if not the precise mathematical resultant of a V*I multiplication function) a power indication. This may of course be a V*I type of calculation of some power parameters and the system may react to either raise or lower itself in some way to ultimately move closer to and eventually achieve operation at an MPP level. By provided a capability and achieving the step of calculating a photovoltaic multiplicative power parameter, the system can respond to that parameter for the desired result.

In many traditional systems, such an MPP operation is often performed at a macro level, that is for entire strings or the entire alternative electrical energy source network. As explained herein, this is one aspect that can contribute to less than optimal efficiency. Often many traditional systems derive MPP at a front end or by some control of the DC-AC inverter (5). Thus, by altering the inverter's power acceptance characteristics, an alteration of the current drawn or other parameter, and thus the total power created, can be altered to pull the maximum from the alternative electrical energy sources (1). Whether at the front of the inverter or not, of course, such an alteration would vary the input to the DC-AC inverter (5) and for this reason as well as the fact that insolation varies, it had come to be expected that inverters would always necessarily experience a variation in input and thus the more important goal of operation at an MPP level would not permit operation at the best efficiency input level for the inverter. The present invention shows that this is not true.

Figure 8:
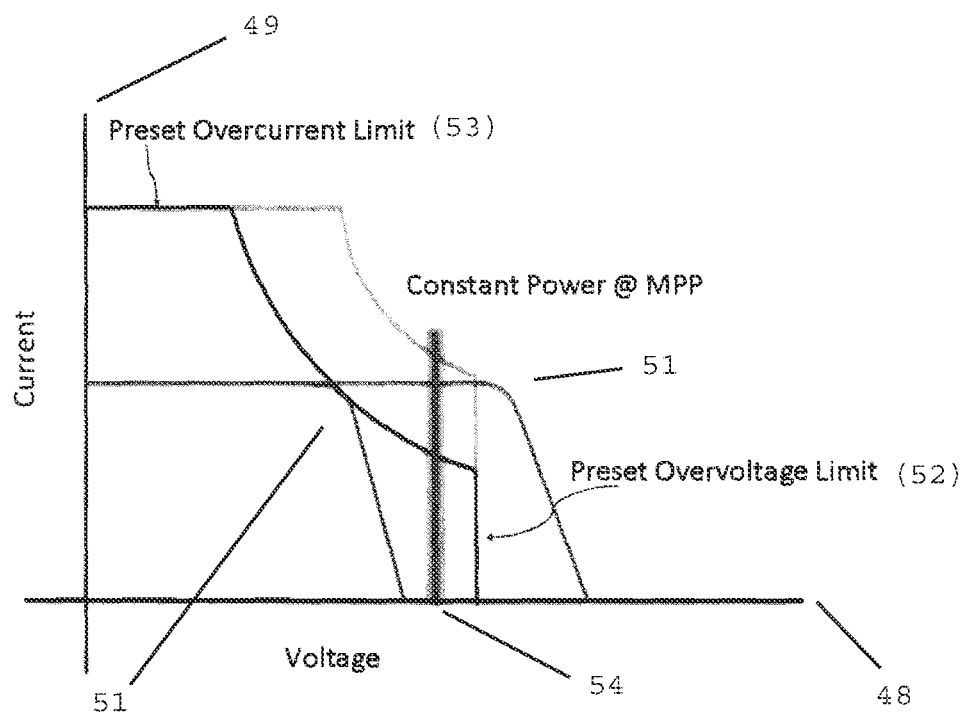
FIG. 8 shows a plot of combined sweet spot, protective, and coordinated process conditions according to one operational embodiment of the invention.
Figure 9:
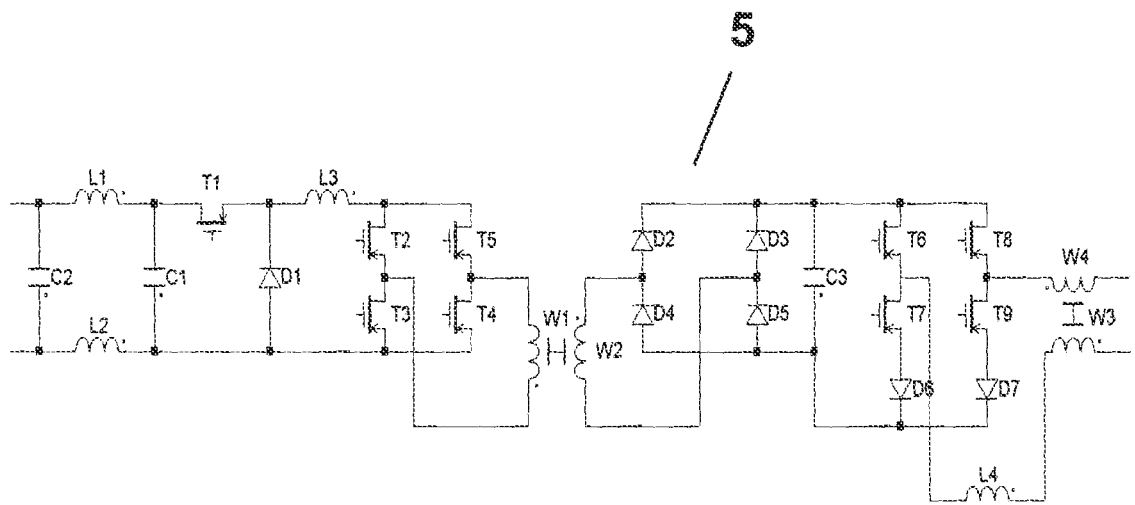
FIG. 9 shows a prior art system with a grid-tied inverter.
Figure 10A:
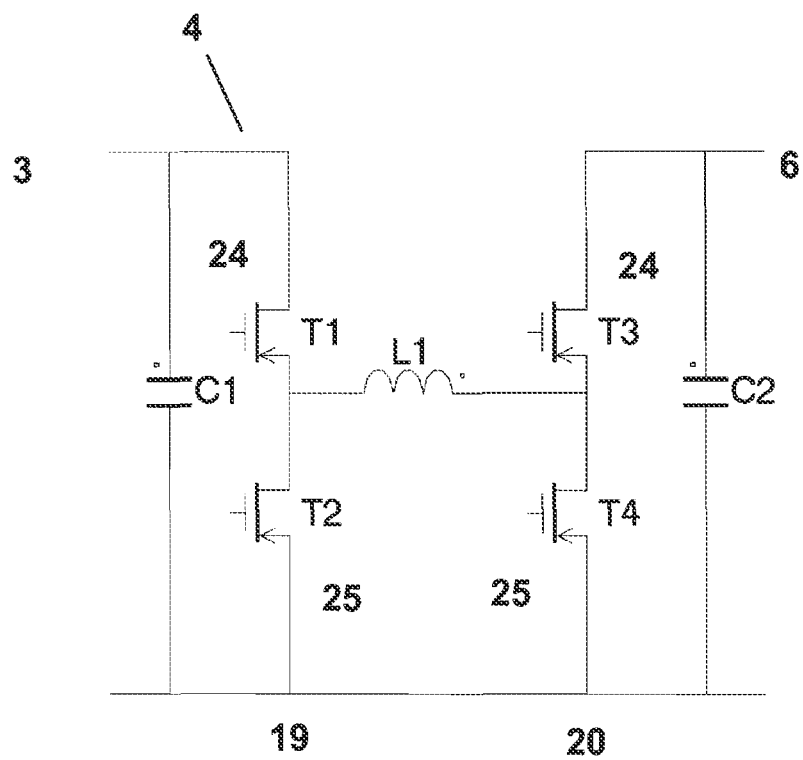
FIGS. 10A and 10B show two types of dual mode power conversion circuits such as might be used in embodiments of the invention.
Figure 10B:
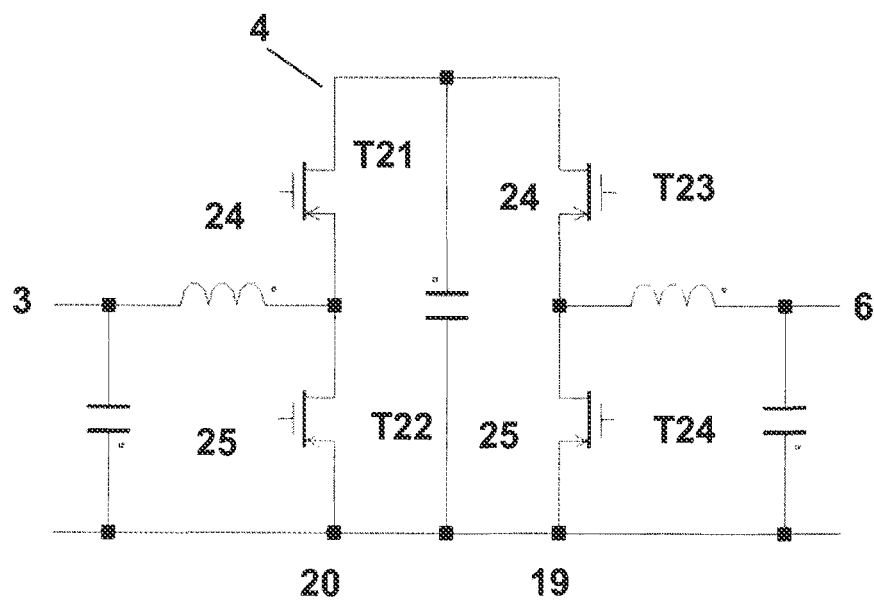

FIG. 9 illustrates one type of photovoltaic DC-AC inverter (5) that may be used. Naturally as may be appreciated from the earlier comments enhanced inverters that need not control MPP may be used. In one aspect of the invention, the inverter may have its input controlled at an optimal level. For example, a separate control input could be used so that the input voltage is at a most optimal level, perhaps such as a singular sweet spot (54) or the like as illustrated by the bold vertical line in FIG. 8. Interestingly and as explained in more detail below, this may be accomplished by the present invention in a manner that is independent of the MPP level at which the converter operates. Finally, as shown, the inverter may be connected to some type of AC power grid interface (9).

Another aspect of the invention is the possibility of the inverter controlling the output of the converter. Traditionally, the inverter has been viewed as a passive recipient of whatever the converter needs to output. In sharp contrast, embodiments of the present invention may involve having the DC-AC inverter (5) control the output of the DC-DC converter (4). As mentioned in more detail below, this may be accomplished by duty cycle switching the DC-AC inverter (5) perhaps through operation of the inverter control circuitry (38). This duty cycle switching can act to cause the output of the DC-DC converter (4) (which itself may have its own operation duty cycle switched to achieve MPP operation) to alter by load or otherwise so that it is at precisely the level the DC-AC inverter (5) wants. As mentioned above, this may be achieved by a direct control input or, for preferred embodiments of the invention may be achieved by simply alter an effect until the converter's DC photovoltaic output (6) and thus the inverter input (29) are as desired. This can be considered as one manner of photovoltaic inverter sourced converting within such a system. With this as but one example of operation, it should be understood that, in general, a control may be considered inverter sourced or derived from conditions or functions or circuitry associated with the DC-AC inverter (5) and thus embodiments of the invention may include inverter sourced photovoltaic power conversion output control circuitry within or associated with the inverter control circuitry (38).

In embodiments, an important aspect of the above control paradigm can be the operation of the inverter to control its own input at an optimal level. For example, it is known that inverter often have a level of voltage input at which the inverter achieves its inverting most efficiently. This is often referred to as the inverter input sweet spot and it is often associated with a specific voltage level for a specific inverter. By providing the action of photovoltaic inverter sourced controlling operation, embodiments may even provide a set point or perhaps substantially constant voltage output as the inverter input (29) and thus embodiments may have a substantially constant power conversion voltage output or may also achieve the step of substantially constant voltage output controlling of the operation of the system. An inverter voltage input set point may be so established, and embodiments may include inverter voltage input set point converter output voltage control circuitry to manage the step of inverter voltage input set point controlling of the operation of the system.

As mentioned above, a surprising aspect of embodiments of the invention may be the fact that inverter input may be maintained independent of and even without regard to a separately maintained MPP level of operation. Thus, inverter optimum input can exist while simultaneously maintaining MPP level of conversion functionality. As but one example, embodiments can include independent inverter operating condition converter output control circuitry or the step of independently controlling an inverter operating condition perhaps through the photovoltaic DC-DC converter or the photovoltaic DC-DC power converter (4). As mentioned above in embodiments, this can be achieved through duty cycle switching of both the photovoltaic DC-DC power converter (4) and the DC-AC inverter (5). In this manner, embodiments may include the step of maximum power point independently controlling the inverter input voltage. For solar panels, systems may have solar panel maximum power point independent inverter input voltage control circuitry (38). This circuitry may be configured for an optimal level and thus embodiments may have solar panel maximum power point independent inverter input optimization photovoltaic power control circuitry. Generally there may be a solar panel maximum power point independent power conversion output or even the step of solar panel maximum power point independently controlling of the operation of the system.

Figure 6A:
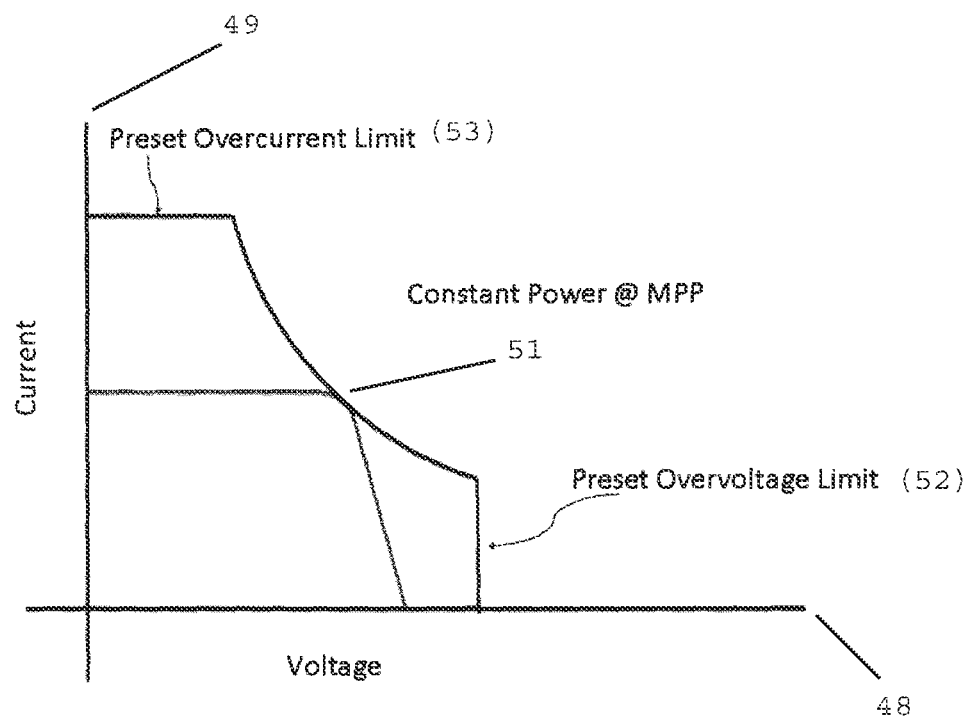
FIGS. 6A and 6B show plots of solar panel output operational conditions for differing temperatures and output paradigms.
Figure 6B:
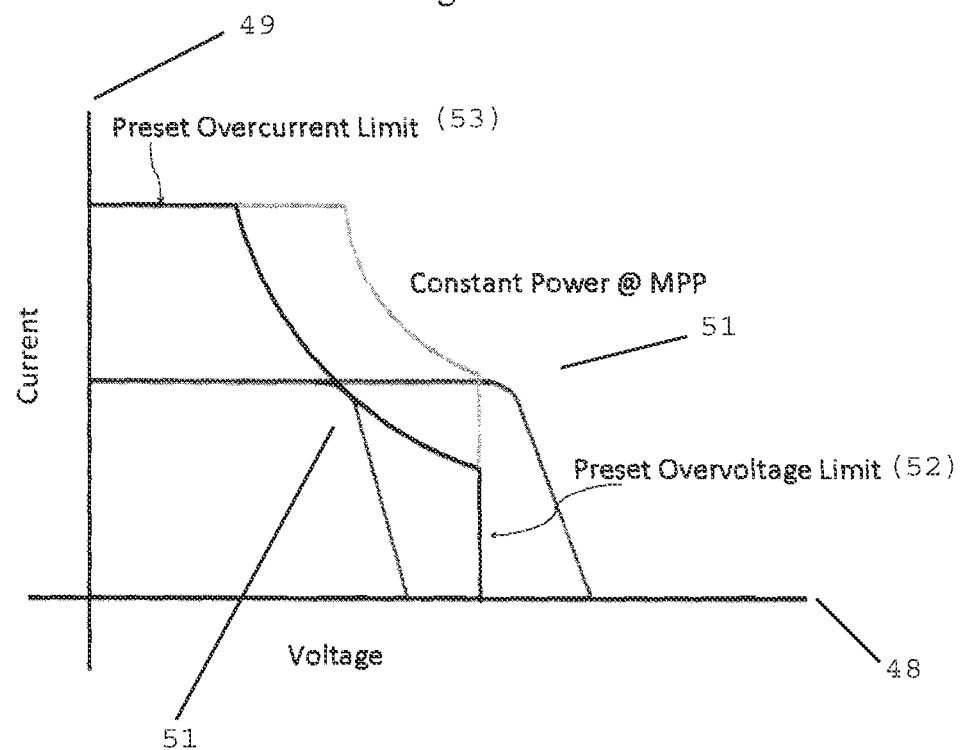

An aspect of operational capability that afford advantage is the capability of embodiments of the invention to accommodate differing operating conditions for various solar sources or panels. As shown in FIGS. 6A and 6B, voltages (48) of operation for maximum power point (51) can vary based upon not just changes in insolation but also whether the solar source is experiencing hot or cold temperature conditions. By permitting MPP to be accommodated through control apart from any voltage constraint, embodiments according to the invention may provide expansive panel capability. This may even be such that the converter is effectively a full photovoltaic temperature voltage operating range photovoltaic DC-DC power converter whereby it can operate at MPP voltages as high as that for the MPP in a cold temperature of operation as well as the MPP voltages as low as that for the MPP in a hot temperature of operation. Thus, as can be understood from FIGS. 6A and 6B, systems can provide solar energy source open circuit cold voltage determinative switching photovoltaic power conversion control circuitry and solar energy source maximum power point hot voltage determinative switching photovoltaic power conversion control circuitry. It can even achieve full photovoltaic temperature voltage operating range converting. This may be accomplished through proper operation of the switch duty cycles and systems may thus provide solar energy source open circuit cold voltage determinatively duty cycle switching and solar energy source maximum power point hot voltage determinatively duty cycle switching.

Further, viewing hot and cold voltages as perhaps the extreme conditions, similarly it can be understood how the system may accommodate varying amount of insolation and thus there may be provided insolation variable adaptive photovoltaic converter control circuitry that can extract MPP—even while maintaining an optimal inverter input—whether a panel is partially shaded, even if relative to an adjacent panel. Systems and their duty cycle switching may be adaptable to the amount of insolation and so the step of converting may be accomplished as insolation variably adaptively converting. This can be significant in newer technology panels such as cadmium-telluride solar panels and especially when combining outputs from a string of cadmium-telluride solar panels which can have broader operating voltages.

Of significant importance is the level of efficiency with which the entire system operates. This is defined as the power going out over the power coming in. A portion of the efficiency gain is achieved by using switching operation of transistor switches, however, the topology is far more significant in this regard. Specifically, by the operation of switches and the like as discussed above, the system can go far beyond the levels of efficiency previously thought possible. It can even provide a substantially power isomorphic photovoltaic DC-DC power conversion and substantially power isomorphic photovoltaic DC-AC power inversion that does not substantially change the form of power into heat rather than electrical energy by providing as high as about 99.2% efficiency. This can be provided by utilizing substantially power isomorphic photovoltaic converter and inverter functionality and a substantially power isomorphic photovoltaic converter and inverter and by controlling operation of the switches so that there is limited loss as discussed above. Such operation can be at levels of from 97, 97.5, 98, 98.5 up to either 99.2 or essentially the wire transmission loss efficiency (which can be considered the highest possible).

Figure 7:
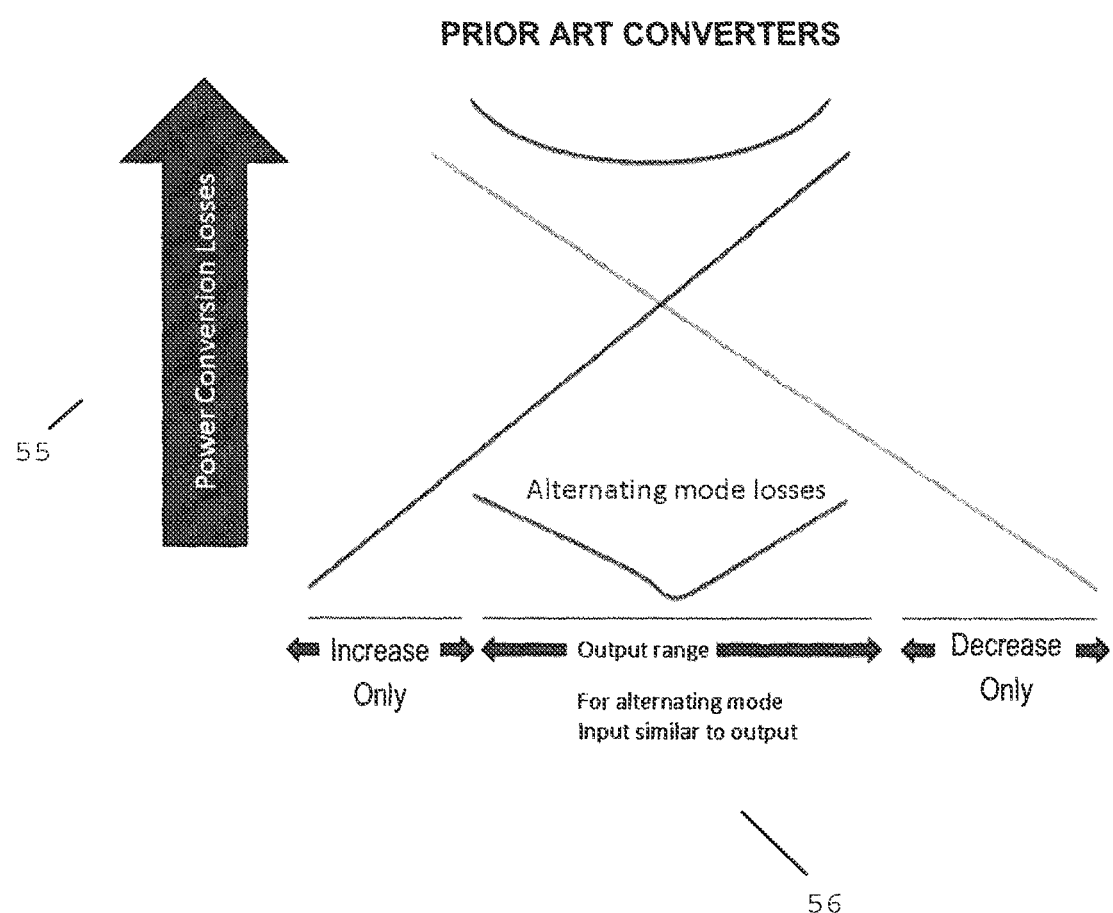
FIG. 7 shows a plot of converter losses by topology and range for a traditional approach considered for a converter element as may be used in embodiments of the present invention.

FIG. 7 shows a plot of converter losses (55) by topology and range (56) for a traditional approach considered for a converter element as may be used in embodiments of the present invention.

The combined abilities to operate the inverter at its most efficient, sweet spot while simultaneously operating the panels at their MPP aids in these efficiency advantages. While in prior art efficiency was sometimes shown to be less than 91%, this combination can accomplish the needed function while operating even above 98% and at levels as high as only those experiencing wire transmission losses. Efficiencies of about 99.2% can be achieved. When connected to a solar panel or an array of solar panels this efficiency difference can be of paramount importance. Embodiments having a constant voltage input to the inverter can thus be considered as having substantially power isomorphic photovoltaic inverter input control circuitry. When embodiments accomplish this through duty cycle switching for the inverter, such embodiments can be considered as having substantially power isomorphic photovoltaic inverter duty cycle control circuitry or as providing the step of substantially power isomorphically duty cycle switching the photovoltaic DC-AC inverter. The ability to set a constant input regardless of MPP needs allows the inverter controller to optimize the input for the inverter and so serve as inverter efficiency optimized converter control circuitry or provide the step of inverter efficiency optimization controlling of the operation of the system. Of course in embodiments where optimization is determined by operating at the point of maximum efficiency, or the sweet spot, the system can be understood as including inverter sweet spot control circuitry or even as inverter sweet spot converter control circuitry (46) when this is accomplished through the converter's output. Generally, it can also be considered as providing the step of inverter sweet spot controlling of the operation of the system. The inverter sweet spot operation capability can also be slaved to other functions (as discussed later) and thus the inverter sweet spot control circuitry can be slaved inverter sweet spot control circuitry or as providing the step of slavedly controlling sweet spot operation of the photovoltaic DC-AC inverter.

Considering the converter (as discussed in more detail in the priority applications), one aspect that contributes to such efficiency is the fact that minimal change of stored energy during the conversion process. As shown in FIG. 5, such embodiments may include a parallel capacitance and a series inductance. These may be used to store energy at at least some times in the operation of converting. It may even be considered that full energy conversion is not accomplished, only the amount of conversion necessary to achieve the desired result.

Also contributing to the overall system efficiency advantage in some embodiments can be the use of electrically connecting panels in a series string so the current through each power conditioner (PC) (17) output may be the same but the output voltage of each PC may be proportional to the amount of power its panel makes together with an MPP per panel capability. Consider the following examples to further disclose the functioning of such series connected embodiments. Examine the circuit of FIG. 5 and compare it to panels simply connected in series (keep in mind that the simple series connection may have a reverse diode across it). First, assume there are four panels in series each producing 100 volts and 1 amp feeding an inverter with its input set to 400 volts. This gives 400 watts output using either approach. Now consider the result of one panel making 100 volts and 0.8 amps (simulating partial shading—less light simply means less current). For the series connection the 0.8 amps flows through each panel making the total power 400× 0.8=320 watts. Now consider the circuit of FIG. 6. First, the total power would be 380 watts as each panel is making its own MPP. And of course the current from each Power Conditioner must be the same as they are after all still connected in series. But with known power from each PC the voltage may be calculated as:

$$3V + 0.8V = 400 \text{ volts, where V is the voltage on each full power panel.}$$

Thus, it can be seen that in this embodiment, three of the panels may have 105.3 volts and one may have 84.2 volts.

Further, in FIG. 5 it can be understood that in some embodiments, an additional benefit may be derived from the inclusion of individual MPP per panel power control. In such embodiments, a power block may be considered as a group of PV panels with power conversion and MPP per panel configurations. As such they may adapt their output as needed to always maintain maximum power from each and every power block.

The advantage of this type of a configuration is illustrated from a second example of MPP operation. This example is one to illustrate where one panel is shaded such that it can now only produce 0.5 amps. For the series connected string, the three panels producing 1 amp may completely reverse bias the panel making 0.5 amps causing the reverse diode to conduct. There may even be only power coming from three of the panels and this may total 300 watts. Again for an embodiment circuit of invention, each PC may be producing MPP totaling 350 watts. The voltage calculation would this time be:

$$3V + 0.5V = 400 \text{ volts}$$

This, in this instance, the three panels may have a voltage of 114.2 volts and the remaining one may have half as much, or 57.1 volts. These are basic examples to illustrate some advantages. In an actual PV string today there may be many PV panels in series. And usually none of them make exactly the same power. Thus, many panels may become back biased and most may even produce less than their individual MPP. As discussed below, such configurations can also be configured to include voltage limits and/or protection perhaps by setting operational boundaries. Importantly, however, output voltage can be seen as proportional to PV panel output power thus yielding a better result to be available to the DC-AC inverter (5) for use in its inversion. Now, when the DC-AC inverter (5) is also able to be operated at its sweet spot, it can efficiently invert the individualized MPP energy pulled from the sea of panels or the like for the overall system efficiency gains mentioned.

An interesting, and perhaps even surprising aspect of the invention is that the DC-AC inverter (5) can be coordinated with the photovoltaic DC-DC converter (4). Embodiments can have inverter coordinated photovoltaic power conversion control circuitry (45) or can provide the step of inverter coordinated converting or inverter coordinated controlling of the operations. As mentioned this can be direct or indirect. As shown in FIG. 1, there could be a direct connection from the inverter control circuitry (38) to the converter functionality control circuitry (8), however, in preferred embodiments, no such direct connection may be needed. Specifically, and for only one example, by simply controlling its duty cycle to maintain a sweet spot input, the DC-AC inverter (5) can cause the photovoltaic DC-DC converter (4) to alter its operation as it simply tries to maintain its duty cycle to maintain MPP. This indirect control is still considered as providing photovoltaic converter output control circuitry, and even more specifically, as providing photovoltaic converter output voltage control circuitry (32) because it causes the step of controlling a photovoltaic DC-DC converter output (also referred to as the DC photovoltaic output (2)) of the photovoltaic DC-DC converter (4), and even more specifically, as providing the step of controlling a photovoltaic DC-DC converter voltage output of the photovoltaic DC-DC converter (4).

While in theory or in normal operation the described circuits work fine, there can be additional requirements for a system to have practical function. For example the dual mode circuit (described in more detail in the priority applications) could go to infinite output voltage if there were no load present. This situation can actually occur frequently. Consider the situation in the morning when the sun first strikes a PV panel string with power conditioners (17). There may be no grid connection at this point and the inverter section may not draw any power. In this case the power conditioner (17) might in practical terms increase its output voltage until the inverter would break. The inverter could have overvoltage protection on its input adding additional power conversion components or, the power conditioner may simply have its own internal output voltage limit. For example if each power conditioner (17) could only produce 100 volts maximum and there was a string of ten PCs in series the maximum output voltage would be 1000 volts. This output voltage limit could make the grid-tied inverter less complex or costly and is illustrated in FIG. 6A as a preset overvoltage limit (52). Thus embodiments can present maximum voltage determinative switching photovoltaic power conversion control circuitry and maximum photovoltaic voltage determinative duty cycle switching (as shown in FIG. 6A as the preset overvoltage limit (52)). This can be inverter specific and so an additional aspect of embodiments of the invention can be the inclusion of inverter protection schemes. The operation over the potentially vast ranges of temperatures, insolations, and even panel conditions or characteristics can cause such significant variations in voltage (48) and current (49) because when trying to maintain one parameter (such as sweet spot voltage or the like), some of these variations can cause another parameter (such as output current or the like) to exceed an inverter, building code, or otherwise acceptable level. Embodiments of the present invention can account for these aspects as well and may even provide this through the DC-DC power converter (4) and/or the DC-AC inverter (5) thus including inverter protection photovoltaic power conversion control circuitry (33) at either or both levels. Considering output, input, voltage and current limitations as initial examples, it can be understood that embodiments can provide the steps of providing photovoltaic inverter protection power conversion control and even controlling a limited photovoltaic converter current output through operation of the photovoltaic DC-DC converter (4). These may be configured with consideration of maximum inverter inputs and converter outputs so there can be included maximum inverter input converter output control circuitry (37), maximum inverter voltage determinative switching photovoltaic power conversion control circuitry, or also the step of controlling a maximum inverter input converter output. As alluded to above, each of these more generic types of capabilities and elements as well as others can be provided in a slaved manner so that either they themselves are subservient to or dominant over another function and thus embodiments can provide slaved photovoltaic power control circuitry (34). As sometimes indicated in FIG. 1, such slaved photovoltaic power control circuitry (34)(as well as various other functions as a person of ordinary skill would readily understand) can be provided at either the photovoltaic DC-DC power converter (4), the DC-AC inverter (5), or both, or elsewhere. These can include converter current output limited photovoltaic power control circuitry, converter voltage output limited photovoltaic power control circuitry, or the like. Thus, embodiments can have slaved photovoltaic inverter protection control circuitry, or more specifically, slaved photovoltaic current level control circuitry or slaved photovoltaic voltage level control circuitry, or may provide the steps of slavedly providing photovoltaic inverter protection control of the photovoltaic DC-AC inverter (5), slavedly controlling current from the photovoltaic DC-DC converter (4), or the like. Considering such voltage and current limits, it can be understood that system may more generally be considered as including photovoltaic boundary condition power conversion control circuitry and as providing the step of photovoltaic boundary condition power conversion control. Thus, as illustrated in FIGS. 6A, 6B, and 8, boundary conditions may be set such as the overcurrent limit (53) and the overvoltage limit (52). And the DC-AC inverter (5), the photovoltaic DC-DC converter (4), and/or either or both of their control circuitries may serve as photovoltaic boundary condition converter functionality control circuitry, may achieve a photovoltaic boundary condition modality of photovoltaic DC-DC power conversion, and may accomplish the step of controlling a photovoltaic boundary condition of the photovoltaic DC-DC converter.

In the above example of a maximum output current limit, it should be understood that this may also be useful as illustrated in FIG. 6A as a preset overcurrent limit (53). This is less straightforward and is related to the nature of a PV panel. If a PV panel is subjected to insufficient light its output voltage may drop but its output current may not be capable of increasing. There can be an advantage to only allowing a small margin of additional current. For example, this same 100 watt panel which has a 100 volt maximum voltage limit could also have a 2 amp current limit without limiting its intended use. This may also greatly simplify the following grid tied inverter stage. Consider an inverter in a large installation which may need a crowbar shunt front end for protection. Such could be provided in addition to duty cycle control or the like. If the output of a PC could go to 100 amps the crowbar would have to handle impractical currents. This situation would not exist in a non PC environment as a simple PV panel string could be easily collapsed with a crowbar circuit. This current limit circuit may only be needed with a PC and it may be easily achieved by duty cycle or more precisely switch operation control. Once a current limit is included another BOS savings may be realized. Now the wire size for interconnect of the series string of PCs may be limited to only carry that maximum current limit. Here embodiments can present maximum photovoltaic inverter current converter functionality control circuitry, inverter maximum current determinative switching, photovoltaic inverter maximum current determinative duty cycle switch control circuitry, and photovoltaic inverter maximum current determinatively duty cycle switching or the like.

One more system problem may also be addressed. In solar installations it may occur on rare conditions that a panel or field of panels may be subjected to more than full sun. This may happen when a refractory situation exists with clouds or other reflective surfaces. It may be that a PV source may generate as much as 1.5 times the rated power for a few minutes. The grid tied inverter section must either be able to operate at this higher power (adding cost) or must somehow avoid this power. A power limit in the PC may be the most effective way to solve this problem. In general, protection of the DC-AC inverter (5) can be achieved by the photovoltaic DC-DC converter (4) as an inverter protection modality of the photovoltaic DC-DC power conversion or as inverter protection converter functionality control circuitry. In maintaining inverter sweet spot input, such circuitry can also provide desirable inverter operating conditions, thus embodiments may include photovoltaic inverter operating condition converter functionality control circuitry. There may also be embodiments that have small output voltage (even within an allowed output voltage range). This may accommodate an inverter with a small energy storage capacitor. The output voltage may even be coordinated with an inverter's energy storage capability.

As mentioned above, certain aspect may be slaved to (subservient) or may slave other aspects (dominant). One possible goal in switching for some embodiments may include the maximum power point operation and sweet spot operational characteristics discussed above as well as a number of modalities as discussed below. Some of these modalities may even be slaved such that one takes precedence of one or another at some point in time, in some power regime, or perhaps based on some power parameter to achieve a variety of modalities of operation. There may be photovoltaic duty cycle switching, and such may be controlled by photovoltaic duty cycle switch control circuitry (again understood as encompassing hardware, firmware, software, and even combinations of each). With respect to the DC-AC inverter (5), there may be more generally the slaved photovoltaic power control circuitry (34) mentioned above, slaved inverter operating condition control circuitry, slaved photovoltaic voltage level control circuitry and even the steps of slavedly controlling voltage from the photovoltaic DC-DC converter (4) or slavedly controlling operation of the photovoltaic DC-DC converter (4).

Another aspect of some embodiments of the invention can be protection or operation of components or the DC-AC inverter (5) so as to address abrupt changes in condition. This can be accomplished through the inclusion of soft transition photovoltaic power conversion control circuitry (35) or the step of softly transitioning a photovoltaic electrical parameter or more specifically even softly transitioning a converted photovoltaic power level electrical parameter. Thus, another mode of operation may be to make a value proportional (in its broadest sense) to some other aspect. For example, there can be advantages to making voltage proportional to current such as to provide soft start capability or the like. Thus embodiments may be configured for controlling a maximum photovoltaic output voltage proportional to a photovoltaic output current at at least some times during the process of converting a DC input to a DC output. In general, this may provide soft transition photovoltaic power conversion control circuitry (35). Focusing on voltage and current as only two such parameters, embodiments can include ramped photovoltaic current power conversion control circuitry, ramped photovoltaic voltage power conversion control circuitry, or the steps of ramping (which be linear or may have any other shape) a photovoltaic current level, ramping a photovoltaic voltage level, or the like. One of the many ways in which such soft transition can be accomplished can be by making one parameter proportional to another. For example, embodiments can include photovoltaic output voltage-photovoltaic output current proportional control circuitry (39) or can provide the step of controlling a photovoltaic output voltage proportional to a photovoltaic output current.

Further, embodiments of the system may include duty cycle control or switch operation that can be conducted so as to achieve one or more proportionalities between parameters perhaps such as the initial examples of maximum voltage output and current output or the like. Further, not only can any of the above by combined with any other of the above, but each may be provided in a slaved manner such that consideration of one modality is secondary to or dominant over that of another modality.

As mentioned above one technique of some control activities can be through the use of duty cycle switching or the like. Switches on either or both of the photovoltaic DC-DC power converter (4) or the DC-AC inverter (5) can be controlled in a variable duty cycle mode of operation such that frequency of switching alters to achieve the desired facet. The converter functionality control circuitry (8), perhaps providing the step of maximum photovoltaic power point duty cycle switching of a photovoltaic DC-DC converter, or the inverter control circuitry (38) may serve as photovoltaic duty cycle switch control circuitry. The duty cycle operations and switching can achieve a variety of results, from serving as photovoltaic transformation duty cycle switching, to photovoltaic impedance transformation duty cycle switching, to photovoltaic input control duty cycle switching, to photovoltaic output duty cycle switching, to photovoltaic voltage duty cycle switching, to photovoltaic current duty cycle switching, to soft transition duty cycle switching, to photovoltaic optimization duty cycle switching, to other operations. The photovoltaic inverter duty cycle switch control circuitry (31) may even act to provide the step of maximum photovoltaic voltage determinatively duty cycle switching the DC-AC inverter (5).

A variety of results have been described above. These may be achieved by simply altering the duty cycle of or switches affected by the switches. These can be accomplished based on thresholds and so provide threshold triggered alternative mode, threshold determinative, threshold activation, or threshold deactivation switching photovoltaic power conversion control circuitry. A burst mode of operation perhaps such as when nearing a mode alteration level of operation may be provided and at such times frequency can be halved, opposing modes can be both alternated, and level can be reduced as a change become incipient. This can be transient as well. In these manners burst mode switching photovoltaic power conversion control circuitry and burst mode switching can be accomplished, as well as transient opposition mode photovoltaic duty cycle switch control circuitry and even the step of transiently establishing opposing switching modes.

As discussed in more detail in the priority applications, there may be a variety of modes of operation of a photovoltaic DC-DC power converter (4). These may include modes of increasing and, perhaps alternatively, decreasing photovoltaic load impedance, the output, or otherwise. Systems according to embodiments of the invention may combine inverter aspects with a photovoltaic DC-DC power converter (4) that serves as a multimodal photovoltaic DC-DC power converter perhaps controlled by multimodal converter functionality control circuitry (26) in that it has more than one mode of operation. These modes may include, but should be understood as not limited to, photovoltaic output increasing and photovoltaic output decreasing, among others. In general, the aspect of multimodal activity encompasses at least processes where only one mode of conversion occurs at any one time.

Thus, a power conditioner (17) may provide at least first modality and second modality photovoltaic DC-DC power conversion circuitry, DC-DC power converter, or DC-DC power conversion in conjunction with the inverter capabilities discussed herein. By offering the capability of more than one mode of operation (even though not necessarily utilized at the same time), or in offering the capability of changing modes of operation, the system may accomplish the step of multimodally operating. Similarly, by offering the capability of controlling to effect more than one mode of conversion operation (again, even though not necessarily utilized at the same time), or in controlling to change modes of operation, the system may accomplish the step of multimodally controlling operation of a photovoltaic DC-DC power converter (4) or a DC-AC inverter (5).

Embodiments may include a photovoltaic DC-DC power converter (4) that has even two or more modes of operation and thus may be considered a dual mode power conversion circuit or dual mode converter. The dual mode nature of this circuit may embody a significant benefit and another distinction may be that most DC/DC converters are often intended to take an unregulated source and produce a regulated output. In this invention, the input to the DC/DC converter is regulated either up or down—and in a highly efficient manner—to be at the PV panel MPP. The dual mode nature of the converter may also serve to facilitate an effect caused by the inverter's operation even without a direct connection. Of course, such modes of operation can be adapted for application with respect to the inverter's duty cycle switching as well.

As mentioned above, the PCs and photovoltaic DC-DC power converters (4) may handle individual panels. They may be attached to a panel, to a frame, or separate. Embodiments may have converters physically integral to such panels in the sense that they are provided as one attached unit for ultimate installation. This can be desirable such as when there are independent operating conditions for separate solar sources, and even adjacent solar sources to accommodate variations in insolation, condition, or otherwise. Each panel or the like may achieve its own MPP, and may coordinate protection with all others in a string or the like.

As may be understood, systems can include an aspect of reacting to operational conditions to which elements are subjected. This can occur in a dynamic fashion so that as one condition changes, nearly instantly a reaction to control appropriately is caused. They can also react to installation conditions and can react to the particular elements. This can make installation easier. For example, if connected to differing types of solar panels, differing age or condition elements, differing types of converters, or even differing types of inverters, some embodiments of the invention can automatically act to accommodate the element, to stay within code, or to otherwise act so that regardless of the overall system or the overall dissimilarity, an optimal result can be achieved. Again this dynamically reactive control feature can be configured at either or both the photovoltaic DC-DC power converter (4) or the DC-AC inverter (5). At either location, embodiments can provide dynamically reactive internal output limited photovoltaic power control circuitry (42) it can also provide the step of dynamically reactively controlling an internal output or even dynamically reactively converting. Both of these features, or even any other dynamically reactive capability, can be slaved either dominantly or subserviently. Thus, embodiments of the invention can provide slaved dynamically reactive photovoltaic power control circuitry or the step of slavedly dynamically reactively controlling an aspect of the system. This could include slavedly dynamically reactively controlling an internal output through operation of the photovoltaic DC-DC converter (4).

The aspect of addressing an external as well as an internal output can be helpful to meeting code or other requirements when there is no way to know what type of panel or other component the system is hooked to. In situations where an internal signal (perhaps such as the signal transmitting power from a rooftop collection of panels to a basement inverter grid connection) is not permitted to exceed a specified level of voltage, current, or otherwise needs to meet limitations on existing wiring or circuit breakers or the like, embodiments can provide the dynamically reactive control as code compliant dynamically reactive photovoltaic power control circuitry (41). It may also provide the step of code compliantly dynamically reactively controlling an internal output. This can occur through operation of the photovoltaic DC-DC converter (4), the DC-AC inverter (5), or otherwise. Of course, this code complaint feature can be slaved to take dominance over other features such as MPP activity, sweet spot activity, boundary condition activity, or the like. In this manner embodiments can provide slaved code compliant dynamically reactive photovoltaic power control circuitry or can provide the step of slavedly code compliantly dynamically reactively controlling internal output, perhaps through operation of the photovoltaic DC-DC converter (4) or otherwise. Beyond code compliance, it can be readily understood how the general feature of a dynamically reactive control can act to permit connection to existing or dissimilar sources as well. Thus whether by programming, circuitry, or other configuration, embodiments can provide dynamically multisource reactive photovoltaic power control circuitry (43) or may provide the step of multisource dynamically reactively controlling internal output, perhaps through operation of the photovoltaic DC-DC converter (4). Of course, this can all be accomplished while maintaining the inverter input at an optimum level in appropriate circumstances and thus embodiments can include reactive inverter input optimization photovoltaic power control circuitry.

As the invention becomes more accepted it may be advantageous to permit comparison with more traditional technologies or operating conditions. This can be achieved by simple switch operation whereby traditional modes of operation can be duplicated or perhaps adequately mimicked to permit a comparison. Thus, for a solar focus, embodiments may include a solar power conversion comparator (44) that can compare first and second modes of operation, perhaps the improved mode of an embodiment of the present invention and a traditional, less efficient mode. This comparator may involve indicating some solar energy parameter for each. In this regard, the shunt switch operation disable element may be helpful. From this a variety of difference can be indicated, perhaps: solar power output, solar power efficiency differences, solar power cost differences, solar power insolation utilization comparisons, and the like. Whether through software or hardware or otherwise, embodiments can include an ability to function with a first power capability and a second power capability. These may be traditional and improved capabilities, perhaps such as a traditional power conversion capability and an improved power conversion capability or a traditional power inversion capability and an improved power inversion capability. The inverter control circuitry (38) or the converter functionality control circuitry (8) or otherwise can be configured to achieve either or both of these first and second capabilities. As one example, the inverter can act to achieve an input voltage that would have been seen without the features of the present invention and thus embodiments can provide an off-maximum efficiency inverter input voltage control (47) or may act to provide the step of controlling inverter input voltage off a maximum efficiency level. In instances where the improved embodiment achieves inverter sweet spot operation capability, embodiments may act to compare the steps of traditionally power inverting a DC photovoltaic input and sweet spot input inverting a DC photovoltaic input. Any of these can provide a user any type of output to inform the user for comparison with other systems.

By the above combinations of these concepts and circuitry, at least some of the following benefits may be realized:

Every PV panel may produce its individual maximum power. Many estimates today indicate this may increase the power generated in a PV installation by 20% or even more.

The grid tied inverter may be greatly simplified and operate more efficiently.

The Balance of System costs for a PV installation may be reduced.

The circuitry, concepts and methods of various embodiments of the invention may be broadly applied. It may be that one or more PCs per panel may be used. For example there may be non-uniformities on a single panel or other reasons for harvesting power from even portions of a panel. It may be for example that small power converters may be used on panel segments optimizing the power which may be extracted from a panel. This invention is explicitly stated to include sub panel applications.

This invention may be optimally applied to strings of panels. It may be more economical for example to simply use a PC for each string of panels in a larger installation. This could be particularly beneficial in parallel connected strings if one string was not able to produce much power into the voltage the remainder of the strings is producing. In this case one PC per string may increase the power harvested from a large installation.

This invention is assumed to include many physical installation options. For example there may be a hard physical connection between the PC and a panel. There may be an interconnection box for strings in which a PC per string may be installed. A given panel may have one or more PCs incorporated into the panel. A PC may also be a stand-alone physical entity.

All of the foregoing is discussed at times in the context of a solar power application. As may be appreciated, some if not all aspects may be applied in other contexts as well. Thus, this disclosure should be understood as supporting other applications regardless how applied.

Previously presented definitions of invention, together with newly developed converter intuitive statements of invention from the prior specifications, all now considered as clauses for potential use later, include the following:

A: Converter Intuitive Focused Clauses

1. An inverter coordinated renewable electrical energy power system comprising:
    at least one alternative electrical energy source having a DC photovoltaic output;
    at least one photovoltaic DC-DC power converter responsive to said DC photovoltaic output and having a photovoltaic DC converter output;
    a DC-AC inverter responsive to said photovoltaic DC converter output;
    indirect inverter coordinated photovoltaic power conversion control circuitry; and
    a photovoltaic AC power output responsive to said photovoltaic DC-AC inverter.

2. An inverter coordinated photovoltaic electrical energy power system comprising:
    at least one alternative electrical energy source having a DC photovoltaic output;
    at least one photovoltaic DC-DC power converter responsive to said DC photovoltaic output and having a photovoltaic DC converter output;
    an indirect inverter coordinated converter functionality control to which said at least one photovoltaic DC-DC power converter is responsive;
    a DC-AC inverter responsive to said photovoltaic DC converter output; and
    a photovoltaic AC power output responsive to said photovoltaic DC-AC inverter.

3. An inverter coordinated photovoltaic electrical energy power system as described in clause 2 or any other clause, wherein said indirect inverter coordinated converter functionality control to which said at least one photovoltaic DC-DC power converter is responsive comprises a direct inverter connection free inverter coordinated converter functionality control.

4. An inverter coordinated photovoltaic electrical energy power system as described in clause 2 or any other clause, wherein said indirect inverter coordinated converter functionality control to which said at least one photovoltaic DC-DC power converter is responsive comprises no direct inverter-converter control connection converter functionality control.

5. An inverter coordinated photovoltaic electrical energy power system as described in clause 4 or any other clause, wherein said no direct inverter-converter control connection converter functionality control comprises no separate direct inverter-converter control connection converter functionality control.

6. An inverter coordinated photovoltaic electrical energy power system as described in clause 4 or any other clause, wherein said no direct inverter-converter control connection converter functionality control comprises no control dedicated direct inverter-converter control connection converter functionality control.

7. An inverter coordinated photovoltaic electrical energy power system as described in clause 3 or any other clause, wherein said direct inverter connection free inverter coordinated converter functionality control comprises an inverter control communication free inverter coordinated converter functionality control.
8. An inverter coordinated photovoltaic electrical energy power system as described in clause 7 or any other clause, wherein said inverter control communication free inverter coordinated converter functionality control comprises no communication inverter-reactive converter functionality control.
9. An inverter coordinated photovoltaic electrical energy power system as described in clause 3, 7, or any other clause, wherein said indirect inverter coordinated converter functionality control to which said at least one photovoltaic DC-DC power converter is responsive comprises a converter switch operation converter functionality control.
10. An inverter coordinated photovoltaic electrical energy power system as described in clause 9 or any other clause, wherein said converter switch operation converter functionality control comprises a converter duty cycle switching converter functionality control.
11. An inverter coordinated photovoltaic electrical energy power system as described in clause 3, 7, or any other clause, wherein said indirect inverter coordinated converter functionality control to which said at least one photovoltaic DC-DC power converter is responsive comprises a converter operation control.
12. An inverter coordinated photovoltaic electrical energy power system as described in clause 11 or any other clause, wherein said converter operation control comprises a power conversion deactivation converter functionality control.
13. An inverter coordinated photovoltaic electrical energy power system as described in clause 11 or any other clause, wherein said converter operation control comprises a power conversion activation converter functionality control.
14. An inverter coordinated photovoltaic electrical energy power system as described in clause 13 or any other clause, wherein said power conversion activation converter functionality control comprises a conversion startup converter functionality control.
15. An inverter coordinated photovoltaic electrical energy power system as described in clause 214 or any other clause, wherein said conversion startup converter functionality control comprises a conversion soft start converter functionality control.
16. An inverter coordinated photovoltaic electrical energy power system as described in clause 3, 7, or any other clause, wherein said indirect inverter coordinated converter functionality control to which said at least one photovoltaic DC-DC power converter is responsive comprises an inverter sourced converter functionality control.
17. An inverter coordinated photovoltaic electrical energy power system as described in clause 3, 7, or any other clause, wherein said indirect inverter coordinated converter functionality control to which said at least one photovoltaic DC-DC power converter is responsive comprises an inverter operational condition responsive converter functionality control.
18. An inverter coordinated photovoltaic electrical energy power system as described in clause 17 or any other clause, wherein said inverter operational condition responsive converter functionality control comprises a slaved inverter operational condition converter functionality control.
19. An inverter coordinated photovoltaic electrical energy power system as described in clause 3, 7, or any other clause, and further comprising a separate converter functionality control.
20. An inverter coordinated photovoltaic electrical energy power system as described in clause 19 or any other clause, wherein said separate converter functionality control comprises a slaved separate converter functionality control.
21. An inverter coordinated photovoltaic electrical energy power system as described in clause 20 or any other clause, wherein said slaved separate converter functionality control comprises a slaved separate converter functionality control that is slavedly responsive to said indirect inverter coordinated converter functionality control.
22. An inverter coordinated photovoltaic electrical energy power system as described in clause 19 or any other clause, wherein said separate converter functionality control comprises a maximum power point converter functionality control, and wherein said indirect inverter coordinated converter functionality control comprises a maximum power point independent converter functionality control.
23. An inverter coordinated photovoltaic electrical energy power system as described in clause 22 or any other clause, wherein said indirect inverter coordinated converter functionality control and said maximum power point converter functionality control both comprise simultaneous converter functionality control options.
24. An inverter coordinated photovoltaic electrical energy power system as described in clause 23 or any other clause, wherein said maximum power point converter functionality control comprises a slaved maximum power point converter functionality control that is slavedly responsive to said indirect inverter coordinated converter functionality control.
25. An inverter coordinated photovoltaic electrical energy power system as described in clause 19 or any other clause, wherein said separate converter functionality control comprises a power producing photovoltaic boundary condition converter functionality control, and wherein said indirect inverter coordinated converter functionality control comprises a power producing photovoltaic boundary condition independent converter functionality control.
26. An inverter coordinated photovoltaic electrical energy power system as described in clause 25 or any other clause, wherein said indirect inverter coordinated converter functionality control and said power producing photovoltaic boundary condition converter functionality control both comprise simultaneous converter functionality control options.
27. An inverter coordinated photovoltaic electrical energy power system as described in clause 25 or any other clause, wherein said power producing photovoltaic boundary condition converter functionality control comprises a slaved power producing photovoltaic boundary condition converter functionality control that is slavedly responsive to said indirect inverter coordinated converter functionality control.
28. An inverter coordinated photovoltaic electrical energy power system as described in clause 3, 7, or any other clause, wherein said indirect inverter coordinated converter functionality control to which said at least one photovoltaic DC-DC power converter is responsive comprises load effect converter functionality control.

29. An inverter coordinated photovoltaic electrical energy power system as described in clause 28 or any other clause, wherein said load effect converter functionality control comprises a no load present converter functionality control.
30. An inverter coordinated photovoltaic electrical energy power system as described in clause 29 or any other clause, wherein said no load present converter functionality control comprises a power conversion deactivation converter functionality control.
31. An inverter coordinated photovoltaic electrical energy power system as described in clause 3, 7, or any other clause, wherein said indirect inverter coordinated converter functionality control to which said at least one photovoltaic DC-DC power converter is responsive comprises an insolation effect converter functionality control.
32. An inverter coordinated photovoltaic electrical energy power system as described in clause 31 or any other clause, wherein said insolation effect converter functionality control comprises insolation initiation converter functionality control.
33. An inverter coordinated photovoltaic electrical energy power system as described in clause 31 or any other clause, wherein said insolation effect converter functionality control comprises over insolation converter functionality control.
34. An inverter coordinated photovoltaic electrical energy power system as described in clause 3, 7, or any other clause, wherein said indirect inverter coordinated converter functionality control to which said at least one photovoltaic DC-DC power converter is responsive comprises a grid effect converter functionality control.
35. An inverter coordinated photovoltaic electrical energy power system as described in clause 34 or any other clause, wherein said grid effect converter functionality control comprises a grid unconnected converter functionality control.
36. An inverter coordinated photovoltaic electrical energy power system as described in clause 3, 7, or any other clause, wherein said indirect inverter coordinated converter functionality control to which said at least one photovoltaic DC-DC power converter is responsive comprises automatic change accommodation converter functionality control.
37. An inverter coordinated photovoltaic electrical energy power system as described in clause 36 or any other clause, wherein said automatic change accommodation converter functionality control comprises a power conversion activation converter functionality control.
38. An inverter coordinated photovoltaic electrical energy power system as described in clause 36 or any other clause, wherein said automatic change accommodation converter functionality control comprises a power conversion deactivation converter functionality control.
39. An inverter coordinated photovoltaic electrical energy power system as described in clause 37 or any other clause, wherein said automatic change accommodation converter functionality control further comprises a power conversion deactivation converter functionality control.
40. An inverter coordinated photovoltaic electrical energy power system as described in clause 3, 7, or any other clause, wherein said indirect inverter coordinated converter functionality control to which said at least one photovoltaic DC-DC power converter is responsive comprises inverter-specific converter functionality control.
41. An inverter coordinated photovoltaic electrical energy power system as described in clause 40 or any other clause, wherein said inverter-specific converter functionality control comprises inverter-specific effects converter functionality control.
42. An inverter coordinated photovoltaic electrical energy power system as described in clause 41 or any other clause, wherein said inverter-specific effects converter functionality control comprises inverter-specific make and model converter functionality control.
43. An inverter coordinated photovoltaic electrical energy power system as described in clause 41 or any other clause, wherein said inverter-specific effects converter functionality control further comprises inverter-specific make and model converter functionality control.
44. An inverter coordinated photovoltaic electrical energy power system as described in clause 40 or any other clause, wherein said inverter-specific converter functionality control comprises an inverter-specific small energy storage capacitor converter functionality control.
45. An inverter coordinated photovoltaic electrical energy power system as described in clause 3, 7, or any other clause, wherein said indirect inverter coordinated converter functionality control to which said at least one photovoltaic DC-DC power converter is responsive comprises an abrupt change in inverter condition converter functionality control.
46. An inverter coordinated photovoltaic electrical energy power system as described in clause 45 or any other clause, wherein said abrupt change in inverter condition converter functionality control comprise power conversion activation converter functionality control.
47. An inverter coordinated photovoltaic electrical energy power system as described in clause 45 or any other clause, wherein said abrupt change in inverter condition converter functionality control comprise power conversion deactivation converter functionality control.
48. An inverter coordinated photovoltaic electrical energy power system as described in clause 46 or any other clause, wherein said abrupt change in inverter condition converter functionality control comprise power conversion deactivation converter functionality control.
49. An inverter coordinated photovoltaic electrical energy power system as described in clause 45 or any other clause, wherein said abrupt change in inverter condition converter functionality control comprise soft transition converter functionality control.
50. An inverter coordinated photovoltaic electrical energy power system as described in clause 45 or any other clause, wherein said abrupt change in inverter condition converter functionality control comprise crowbar shunt protection effect converter functionality control.
51. An inverter coordinated photovoltaic electrical energy power system as described in clause 3, 7, or any other clause, wherein said indirect inverter coordinated converter functionality control to which said at least one photovoltaic DC-DC power converter is responsive comprises soft transition converter functionality control.
52. An inverter coordinated photovoltaic electrical energy power system as described in clause 3, 7, or any other clause, wherein said indirect inverter coordinated converter functionality control to which said at least one photovoltaic DC-DC power converter is responsive comprises crowbar shunt protection effect converter functionality control.
53. An inverter coordinated photovoltaic electrical energy power system as described in clause 52 or any other clause, wherein said crowbar shunt protection effect converter functionality control comprises power conversion deactivation converter functionality control.
54. An inverter coordinated photovoltaic electrical energy power system as described in clause 3, 7, or any other clause, wherein said indirect inverter coordinated converter functionality control to which said at least one photovoltaic DC-DC power converter is responsive comprises proportional value converter functionality control.
55. An inverter coordinated photovoltaic electrical energy power system as described in clause 54 or any other clause, wherein said proportional value converter functionality control comprises voltage-current proportional converter functionality control.
56. An inverter coordinated photovoltaic electrical energy power system as described in clause 3, 7, or any other clause, wherein said indirect inverter coordinated converter functionality control to which said at least one photovoltaic DC-DC power converter is responsive comprises ramped value converter functionality control.
57. An inverter coordinated photovoltaic electrical energy power system as described in clause 56 or any other clause, wherein said ramped value converter functionality control comprises linearly ramped value converter functionality control.
58. An inverter coordinated photovoltaic electrical energy power system as described in clause 56 or any other clause, wherein said ramped value converter functionality control comprises voltage ramped converter functionality control.
59. An inverter coordinated photovoltaic electrical energy power system as described in clause 56 or any other clause, wherein said ramped value converter functionality control comprises current ramped converter functionality control.
60. An inverter coordinated photovoltaic electrical energy power system as described in clause 58 or any other clause, wherein said ramped value converter functionality control comprises current ramped converter functionality control.
61. An inverter coordinated photovoltaic electrical energy power system as described in clause 56 or any other clause, wherein said ramped value converter functionality control comprises power ramped converter functionality control.
62. An inverter coordinated photovoltaic electrical energy power system as described in clause 3, 7, or any other clause, wherein said indirect inverter coordinated converter functionality control to which said at least one photovoltaic DC-DC power converter is responsive comprises threshold triggered converter functionality control.
63. An inverter coordinated photovoltaic electrical energy power system as described in clause 62 or any other clause, wherein said threshold triggered converter functionality control comprises inverter operational condition threshold responsive converter functionality control.
64. An inverter coordinated photovoltaic electrical energy power system as described in clause 62 or any other clause, wherein said threshold triggered converter functionality control comprises power conversion activation converter functionality control.
65. An inverter coordinated photovoltaic electrical energy power system as described in clause 62 or any other clause, wherein said threshold triggered converter functionality control comprises power conversion deactivation converter functionality control.
66. An inverter coordinated photovoltaic electrical energy power system as described in clause 64 or any other clause, wherein said threshold triggered converter functionality control comprises power conversion deactivation converter functionality control.
67. A method of providing inverter coordinated photovoltaic electrical energy power comprising the steps of:
creating a DC photovoltaic output from said at least one alternative electrical energy source;
establishing said DC photovoltaic output as a DC photovoltaic input to a at least one photovoltaic DC-DC power converter;
converting said DC photovoltaic input to create a converted DC photovoltaic output;
indirectly inverter coordinated controlling said step of converting said DC photovoltaic input to create a converted DC photovoltaic output;
establishing said converted DC photovoltaic output as a converted DC photovoltaic input to a photovoltaic DC-AC inverter; and
inverting said converted DC photovoltaic input into a photovoltaic AC power output.
68. A method of providing inverter coordinated photovoltaic electrical energy power as described in clause 67 or any other clause, wherein said step of indirectly inverter coordinated controlling said step of converting said DC photovoltaic input to create a converted DC photovoltaic output comprises the step of direct inverter connection free inverter coordinated converter functionality controlling a photovoltaic DC-DC converter.
69. A method of providing inverter coordinated photovoltaic electrical energy power as described in clause 67 or any other clause, wherein said step of indirectly inverter coordinated controlling said step of converting said DC photovoltaic input to create a converted DC photovoltaic output comprises the step of inverter coordinated controlling said step of converting without any direct inverter-converter control connection.
70. A method of providing inverter coordinated photovoltaic electrical energy power as described in clause 69 or any other clause, wherein the step of the step of inverter coordinated controlling said step of converting without any direct inverter-converter control connection comprises the step of inverter coordinated controlling said step of converting without any separate direct inverter-converter control connection.
71. A method of providing inverter coordinated photovoltaic electrical energy power as described in clause 69 or any other clause, wherein the step of the step of inverter coordinated controlling said step of converting without any direct inverter-converter control connection comprises the step of inverter coordinated controlling said step of converting without any control dedicated direct inverter-converter control connection.
72. A method of providing inverter coordinated photovoltaic electrical energy power as described in clause 68 or any other clause, wherein said step of direct inverter connection free inverter coordinated converter functionality controlling a photovoltaic DC-DC converter comprises the step of inverter control communication free inverter operating condition coordinating conversion.

73. A method of providing inverter coordinated photovoltaic electrical energy power as described in clause 72 or any other clause, wherein said step of inverter control communication free inverter operating condition coordinating conversion comprises the step of reacting to said inverter without any communication from said inverter.

74. A method of providing inverter coordinated photovoltaic electrical energy power comprising the steps of:
establishing a plurality of solar panels;
creating a highly varying DC photovoltaic output from each of said plurality of solar panels;
individually establishing each said highly varying DC photovoltaic output as an individual DC photovoltaic input to an individual inverter operating condition coordinated photovoltaic DC-DC converter; thereby establishing a plurality of DC-DC converters;
indirectly, by said DC-DC converters, inverter operating condition coordinating conversion of each said individual DC photovoltaic input into a converted DC photovoltaic output for a high voltage, high power photovoltaic DC-AC inverter;
serially connecting a plurality of said converted DC photovoltaic outputs to create a combined higher voltage converted DC photovoltaic output;
establishing said combined higher voltage converted DC photovoltaic output as a converted DC photovoltaic input to said high voltage, high power photovoltaic DCAC inverter; and
inputting said converted DC photovoltaic input at a coordinated inverter operating condition of said high voltage, high power photovoltaic DC-AC inverter.

75. A method of providing inverter coordinated photovoltaic electrical energy power as described in clause 74 or any other clause, wherein said step of indirectly, by said DC-DC converters, inverter operating condition coordinating conversion of each said individual DC photovoltaic input into a converted DC photovoltaic output for a high voltage, high power photovoltaic DC-AC inverter comprises the step of direct inverter connection free inverter coordinated converter functionality controlling said inverter operating condition coordinated photovoltaic DC-DC converter.

76. A method of providing inverter coordinated photovoltaic electrical energy power as described in clause 74 or any other clause, wherein said step of indirectly, by said DC-DC converters, inverter operating condition coordinating conversion of each said individual DC photovoltaic input into a converted DC photovoltaic output for a high voltage, high power photovoltaic DC-AC inverter comprises the step of inverter operating condition coordinating conversion without any direct inverter-converter control connection 77. A method of providing inverter coordinated photovoltaic electrical energy power as described in clause 76 or any other clause, wherein said step of inverter operating condition coordinating conversion without any direct inverter-converter control connection comprises the step of inverter operating condition coordinating conversion without any separate direct inverter-converter control connection.

78. A method of providing inverter coordinated photovoltaic electrical energy power as described in clause 76 or any other clause, wherein said step of inverter operating condition coordinating conversion without any direct inverter-converter control connection comprises the step of inverter operating condition coordinating conversion without any control dedicated direct inverter-converter control connection.

79. A method of providing inverter coordinated photovoltaic electrical energy power as described in clause 75 or any other clause, wherein said step of direct inverter connection free inverter coordinated converter functionality controlling said inverter operating condition coordinated photovoltaic DC-DC converter comprises the step of inverter control communication free inverter operating condition coordinating conversion.

80. A method of providing inverter coordinated photovoltaic electrical energy power as described in clause 79 or any other clause, wherein said step of inverter control communication free inverter operating condition coordinating conversion comprises the step of reacting to said inverter without any communication from said inverter.

81. A method of providing inverter coordinated photovoltaic electrical energy power comprising the steps of:
establishing at least one solar energy source;
creating a highly varying DC photovoltaic output from said at least one solar energy source;
establishing said highly varying DC photovoltaic output as a DC photovoltaic input to a photovoltaic DC-DC converter;
indirectly inverter operating condition coordinating conversion of said DC photovoltaic input into a converted DC photovoltaic output for a high power photovoltaic DC-AC inverter, by said DC-DC converter;
establishing said converted DC photovoltaic output as a converted DC photovoltaic input to said high power photovoltaic DC-AC inverter; and
inverting said converted DC photovoltaic input into a high power inverted AC photovoltaic output.

82. A method of providing inverter coordinated photovoltaic electrical energy power as described in clause 81 or any other clause, wherein said step of indirectly inverter operating condition coordinating conversion of said DC photovoltaic input into a converted DC photovoltaic output for a high power photovoltaic DC-AC inverter, by said DC-DC converter comprises the step of direct inverter connection free inverter coordinated converter functionality controlling a photovoltaic DC-DC converter.

83. A method of providing inverter coordinated photovoltaic electrical energy power as described in clause 81 or any other clause, wherein said step of indirectly inverter operating condition coordinating conversion of said DC photovoltaic input into a converted DC photovoltaic output for a high power photovoltaic DC-AC inverter, by said DC-DC converter comprises the step of inverter operating condition coordinating conversion without any direct inverter-converter control connection.

84. A method of providing inverter coordinated photovoltaic electrical energy power as described in clause 83 or any other clause, wherein said step of inverter operating condition coordinating conversion without any direct inverter-converter control connection comprises the step of inverter operating condition coordinating conversion without any separate direct inverter-converter control connection.

85. A method of providing inverter coordinated photovoltaic electrical energy power as described in clause 83 or any other clause, wherein said step of inverter operating condition coordinating conversion without any direct inverter-converter control connection comprises the step of inverter operating condition coordinating conversion without any control dedicated direct inverter-converter control connection.

86. A method of providing inverter coordinated photovoltaic electrical energy power as described in clause 82 or any other clause, wherein said step of direct inverter connection free inverter coordinated converter functionality controlling a photovoltaic DC-DC converter comprises the step of inverter control communication free inverter operating condition coordinating conversion.

87. A method of providing inverter coordinated photovoltaic electrical energy power as described in clause 86 or any other clause, wherein said step of inverter control communication free inverter operating condition coordinating conversion comprises the step of reacting to said inverter without any communication from said inverter.

88. A converter coordinated photovoltaic electrical energy power system comprising:
at least one alternative electrical energy source having a DC photovoltaic output;
at least one photovoltaic DC-DC power converter responsive to said DC photovoltaic output and having a photovoltaic DC converter output;
a DC-AC inverter responsive to said photovoltaic DC converter output;
an indirect converter coordinated inverter functionality control to which said DC-AC inverter is responsive; and
a photovoltaic AC power output responsive to said photovoltaic DC-AC inverter.

B: Priority Case PCT/US2008/060345 Claims Now Stated as Clauses

1. An integrated renewable electrical energy power system comprising:
at least one alternative electrical energy source having a DC photovoltaic output;
at least one photovoltaic DC-DC power converter responsive to said DC photovoltaic output and having a photovoltaic DC converter output;
a DC-AC inverter responsive to said photovoltaic DC converter output;
inverter sourced photovoltaic power conversion output control circuitry; and
a photovoltaic AC power output responsive to said photovoltaic DC-AC inverter.

2. An integrated renewable electrical energy power system as described in clause 1 or any other clause, wherein said inverter sourced photovoltaic power conversion output control circuitry comprises solar panel maximum power point independent power conversion output control circuitry.

3. An integrated renewable electrical energy power system as described in clause 2 or any other clause, wherein said solar panel maximum power point independent power conversion output control circuitry comprises solar panel maximum power point independent inverter input voltage control circuitry.

4. An integrated renewable electrical energy power system as described in clause 1 or any other clause, wherein said inverter sourced photovoltaic power conversion output control circuitry comprises substantially constant power conversion voltage output control circuitry.

5. An integrated renewable electrical energy power system as described in clause 4 or any other clause, wherein said substantially constant power conversion voltage output control circuitry comprises photovoltaic inverter duty cycle switch control circuitry.

6. An integrated renewable electrical energy power system as described in clause 1 or any other clause, wherein said inverter sourced photovoltaic power conversion output control circuitry comprises slaved inverter operating condition control circuitry.

7. An integrated renewable electrical energy power system as described in clause 6 or any other clause, wherein said slaved inverter operating condition control circuitry comprises slaved inverter sweet spot control circuitry.

8. An inverter optimized renewable electrical energy power system comprising:
at least one alternative electrical energy source having a DC photovoltaic output;
at least one photovoltaic DC-DC power converter responsive to said DC photovoltaic output and having a photovoltaic DC converter output;
a DC-AC inverter responsive to said photovoltaic DC converter output;
reactive inverter input optimization photovoltaic power control circuitry; and
a photovoltaic AC power output responsive to said photovoltaic DC-AC inverter.

9. An inverter optimized renewable electrical energy power system as described in clause 8 or any other clause, wherein said reactive inverter input optimization photovoltaic power control circuitry comprises solar panel maximum power point independent inverter input optimization photovoltaic power control circuitry.

10. An inverter optimized renewable electrical energy power system as described in clause 8, 9, or any other clause, wherein said reactive inverter input optimization photovoltaic power control circuitry comprises inverter efficiency optimized converter control circuitry.

11. An inverter optimized renewable electrical energy power system as described in clause 8, 9, or any other clause, wherein said reactive inverter input optimization photovoltaic power control circuitry comprises inverter voltage input set point converter output voltage control circuitry.

12. An inverter optimized renewable electrical energy power system as described in clause 11 or any other clause, wherein said inverter voltage input set point converter output voltage control circuitry comprises inverter sweet spot converter control circuitry.

13. An inverter optimized renewable electrical energy power system as described in clause 12 or any other clause, wherein said inverter sweet spot converter control circuitry comprises photovoltaic inverter duty cycle switch control circuitry.

14. An inverter optimized renewable electrical energy power system as described in clause 10 or any other clause, wherein said inverter efficiency optimized converter control circuitry comprises substantially power isomorphic photovoltaic inverter input control circuitry.
15. An inverter optimized renewable electrical energy power system as described in clause 14 or any other clause, wherein said substantially power isomorphic photovoltaic inverter input control circuitry comprises substantially power isomorphic photovoltaic inverter duty cycle control circuitry.
16. An inverter optimized renewable electrical energy power system as described in clause 10, 15, or any other clause, wherein said inverter efficiency optimized converter control circuitry comprises inverter efficiency optimized converter control circuitry selected from a group consisting of:
  at least about 97% efficient photovoltaic conversion circuitry,
  at least about 97.5% efficient photovoltaic conversion circuitry,
  at least about 98% efficient photovoltaic conversion circuitry,
  at least about 98.5% efficient photovoltaic conversion circuitry,
  at least about 97% up to about 99.2% efficient photovoltaic conversion circuitry,
  at least about 97.5% up to about 99.2% efficient photovoltaic conversion circuitry,
  at least about 98% up to about 99.2% efficient photovoltaic conversion circuitry,
  at least about 98.5% up to about 99.2% efficient photovoltaic conversion circuitry,
  at least about 97% up to about wire transmission loss efficient photovoltaic conversion circuitry,
  at least about 97.5% up to about wire transmission loss efficient photovoltaic conversion circuitry,
  at least about 98% up to about wire transmission loss efficient photovoltaic conversion circuitry, and
  at least about 98.5% up to about wire transmission loss efficient photovoltaic conversion circuitry.
17. An inverter protected renewable electrical energy power system comprising:
  at least one alternative electrical energy source having a DC photovoltaic output;
  at least one photovoltaic DC-DC power converter responsive to said DC photovoltaic output and having a photovoltaic DC converter output;
  a DC-AC inverter responsive to said photovoltaic DC converter output;
  inverter coordinated photovoltaic power conversion control circuitry; and
  a photovoltaic AC power output responsive to said photovoltaic DC-AC inverter.
18. An inverter protected renewable electrical energy power system as described in clause 17 or any other clause, wherein said inverter coordinated photovoltaic power conversion control circuitry comprises photovoltaic converter output control circuitry.
19. An inverter protected renewable electrical energy power system as described in clause 18 or any other clause, wherein said photovoltaic converter output control circuitry comprises photovoltaic converter output voltage control circuitry.
20. An inverter protected renewable electrical energy power system as described in clause 19 or any other clause, wherein said photovoltaic converter output voltage control circuitry comprises photovoltaic inverter duty cycle switch control circuitry.
21. An inverter protected renewable electrical energy power system as described in clause 22 or any other clause, wherein said inverter coordinated photovoltaic power conversion control circuitry comprises slaved photovoltaic power control circuitry.
22. An inverter protected renewable electrical energy power system as described in clause 21 or any other clause, wherein said slaved photovoltaic power control circuitry comprises slaved photovoltaic inverter protection control circuitry.
23. An inverter protected renewable electrical energy power system as described in clause 21 or any other clause, wherein said slaved photovoltaic power control circuitry comprises slaved photovoltaic voltage level control circuitry.
24. An inverter protected renewable electrical energy power system as described in clause 21, 23, or any other clause, wherein said slaved photovoltaic power control circuitry comprises slaved photovoltaic current level control circuitry.
25. An inverter protected renewable electrical energy power system as described in clause 17 or any other clause, wherein said inverter coordinated photovoltaic power conversion control circuitry comprises inverter protection photovoltaic power conversion control circuitry.
26. An inverter protected renewable electrical energy power system as described in clause 25 or any other clause, wherein said inverter protection photovoltaic power conversion control circuitry comprises photovoltaic boundary condition power conversion control circuitry.
27. An inverter protected renewable electrical energy power system as described in clause 26 or any other clause, wherein said inverter coordinated photovoltaic power conversion control circuitry further comprises independent inverter operating condition converter output control circuitry.
28. An inverter protected renewable electrical energy power system as described in clause 17, 26, 27, or any other clause, wherein said inverter coordinated photovoltaic power conversion control circuitry comprises maximum inverter input converter output control circuitry.
29. An inverter protected renewable electrical energy power system as described in clause 17 or any other clause, wherein said inverter coordinated photovoltaic power conversion control circuitry comprises:
  maximum photovoltaic inverter current converter functionality control circuitry;
  slaved maximum photovoltaic power point converter functionality control circuitry; and
  maximum photovoltaic inverter input photovoltaic voltage converter output voltage functionality control circuitry.
30. A dynamically reactive renewable electrical energy power system comprising:
  at least one alternative electrical energy source having a DC photovoltaic output;
  at least one photovoltaic DC-DC power converter responsive to said DC photovoltaic output and having a photovoltaic DC converter output;
  a DC-AC inverter responsive to said photovoltaic DC converter output;
  dynamically reactive internal output limited photovoltaic power control circuitry; and a photovoltaic AC power output responsive to said photovoltaic DC-AC inverter.

31. A dynamically reactive renewable electrical energy power system as described in clause 30 or any other clause, wherein said dynamically reactive internal output limited photovoltaic power control circuitry comprises dynamically multisource reactive photovoltaic power control circuitry.

32. A dynamically reactive renewable electrical energy power system as described in clause 31 or any other clause, wherein said dynamically multisource reactive photovoltaic power control circuitry comprises converter voltage output limited photovoltaic power control circuitry.

33. A dynamically reactive renewable electrical energy power system as described in clause 31, 32, or any other clause, wherein said dynamically multisource reactive photovoltaic power control circuitry comprises converter current output limited photovoltaic power control circuitry.

34. A dynamically reactive renewable electrical energy power system as described in clause 30 through 33, or any other clause, wherein said dynamically reactive internal output limited photovoltaic power control circuitry comprises code compliant dynamically reactive photovoltaic power control circuitry.

35. A dynamically reactive renewable electrical energy power system as described in clause 34 or any other clause, wherein said code compliant dynamically reactive photovoltaic power control circuitry comprises slaved dynamically reactive photovoltaic power control circuitry.

36. A dynamically reactive renewable electrical energy power system as described in clause 35 or any other clause, wherein said slaved dynamically reactive photovoltaic power control circuitry comprises slaved code compliant dynamically reactive photovoltaic power control circuitry.

37. A renewable electrical energy power system as described in clause 1, 8, 17, 30, or any other clause, wherein said at least one alternative electrical energy source comprises at least one solar cell.

38. A renewable electrical energy power system as described in clause 1, 8, 17, 30, or any other clause, wherein said at least one alternative electrical energy source comprises a plurality of electrically connected solar cells.

39. A renewable electrical energy power system as described in clause 1, 8, 17, 30, or any other clause, wherein said at least one alternative electrical energy source comprises a plurality of adjacent electrically connected solar cells.

40. A renewable electrical energy power system as described in clause 1, 8, 17, 30, or any other clause, wherein said at least one alternative electrical energy source comprises at least one solar panel.

41. A renewable electrical energy power system as described in clause 1, 8, 17, 30, or any other clause, wherein said at least one alternative electrical energy source comprises a plurality of electrically connected solar panels.

42. A renewable electrical energy power system as described in clause 1, 8, 17, 30, or any other clause, wherein said at least one alternative electrical energy source comprises at least one string of electrically connected solar panels.

43. A renewable electrical energy power system as described in clause 41 or any other clause, wherein said at least one photovoltaic DC-DC power converter comprises a plurality of individually panel dedicated photovoltaic DC-DC power converters.

44. A renewable electrical energy power system as described in clause 43 or any other clause, wherein said at least one photovoltaic DC-DC power converter comprises a plurality of individually panel dedicated maximum photovoltaic power point converter functionality control circuitries.

45. A renewable electrical energy power system as described in clause 44 or any other clause, wherein said plurality of individually panel dedicated photovoltaic DC-DC power converters and said plurality of individually panel dedicated maximum power point converter functionality control circuitries are each physically integrated with individual solar panels.

46. A renewable electrical energy power system as described in clause 43 or any other clause, wherein said plurality of individually panel dedicated photovoltaic DC-DC power converters and said plurality of solar panels comprise a plurality of series connected strings of solar power circuits.

47. A renewable electrical energy power system as described in clause 46 or any other clause, wherein said DC-AC inverter comprises a high voltage DC-AC solar power inverter.

48. A renewable electrical energy power system as described in clause 47 or any other clause, wherein said photovoltaic AC power output comprises a three-phase photovoltaic AC power output.

49. A renewable electrical energy power system as described in clause 41 or any other clause, wherein said plurality of solar panels comprises a plurality of cadmium-telluride solar panels.

50. A renewable electrical energy power system as described in clause 1, 8, 17, 30, or any other clause, wherein said photovoltaic DC-DC power converter comprises at least one multimodal photovoltaic DC-DC power converter and further comprises multimodal converter functionality control circuitry.

51. A renewable electrical energy power system as described in clause 50 or any other clause, wherein said multimodal converter functionality control circuitry comprises photovoltaic boundary condition converter functionality control circuitry.

52. A renewable electrical energy power system as described in clause 50, 51, or any other clause, wherein said multimodal converter functionality control circuitry comprises a maximum photovoltaic inverter input photovoltaic converter output voltage functionality control circuitry.

53. A renewable electrical energy power system as described in clause 50, 51, or any other clause, wherein said multimodal converter functionality control circuitry comprises maximum photovoltaic output voltage-photovoltaic output current proportional photovoltaic converter functionality control circuitry.

54. A renewable electrical energy power system as described in clause 50 or any other clause, wherein said multimodal converter functionality control circuitry comprises:
maximum photovoltaic inverter current converter functionality control circuitry;
slaved maximum photovoltaic power point converter functionality control circuitry; and maximum photovoltaic inverter input photovoltaic voltage converter output voltage functionality control circuitry.
55. A renewable electrical energy power system as described in clause 50 or any other clause, wherein said multimodal converter functionality control circuitry comprises:
maximum photovoltaic inverter current converter functionality control circuitry;
slaved photovoltaic voltage increase and photovoltaic voltage decrease maximum photovoltaic power point converter functionality control circuitry; and
maximum photovoltaic inverter input voltage photovoltaic converter output voltage functionality control circuitry.
56. A renewable electrical energy power system as described in clause 50 or any other clause, wherein said multimodal converter functionality control circuitry comprises multimodal converter functionality control circuitry selected from a group consisting of:
alternative mode photovoltaic power converter functionality control circuitry configured to alternatively switch at least some times between first modality photovoltaic DC-DC power conversion circuitry and second modality photovoltaic DC-DC power conversion circuitry;
both photovoltaic load impedance increase converter functionality control circuitry and photovoltaic load impedance decrease converter functionality control circuitry;
photovoltaic boundary condition converter functionality control circuitry;
posterior photovoltaic operating condition converter functionality control circuitry;
posterior photovoltaic element protection converter functionality control circuitry;
substantially power isomorphic photovoltaic converter functionality control circuitry;
photovoltaic disable mode converter functionality control circuitry;
photovoltaic inverter protection converter functionality control circuitry; photovoltaic inverter coordinated converter functionality control circuitry;
photovoltaic slaved mode converter functionality control circuitry; and
photovoltaic inverter slaved converter functionality control circuitry.
57. A renewable electrical energy power system as described in clause 1, 8, 17, or any other clause, and furthering comprising dynamically reactive internal output limited photovoltaic power control circuitry.
58. A renewable electrical energy power system as described in clause 57 or any other clause, wherein said dynamically reactive internal output limited photovoltaic power control circuitry comprises code compliant dynamically reactive photovoltaic power control circuitry.
59. A renewable electrical energy power system as described in clause 58 or any other clause, wherein said code compliant dynamically reactive photovoltaic power control circuitry comprises slaved dynamically reactive photovoltaic power control circuitry.
60. A renewable electrical energy power system as described in clause 59 or any other clause, wherein said slaved dynamically reactive photovoltaic power control circuitry comprises slaved code compliant dynamically reactive photovoltaic power control circuitry.
61. A renewable electrical energy power system as described in clause 8, 17, 30, or any other clause, and further comprising inverter sourced photovoltaic power conversion output control circuitry.
62. A renewable electrical energy power system as described in clause 61 or any other clause, wherein said inverter sourced photovoltaic power conversion output control circuitry comprises solar panel maximum power point independent power conversion output control circuitry.
63. A renewable electrical energy power system as described in clause 62 or any other clause, wherein said solar panel maximum power point independent power conversion output control circuitry comprises solar panel maximum power point independent inverter input voltage control circuitry.
64. A renewable electrical energy power system as described in clause 61 or any other clause, wherein said inverter sourced photovoltaic power conversion output control circuitry comprises substantially constant power conversion voltage output control circuitry.
65. A renewable electrical energy power system as described in clause 64 or any other clause, wherein said substantially constant power conversion voltage output control circuitry comprises photovoltaic inverter duty cycle switch control circuitry.
66. A renewable electrical energy power system as described in clause 61 or any other clause, wherein said inverter sourced photovoltaic power conversion output control circuitry comprises slaved inverter operating condition control circuitry.
67. An integrated renewable electrical energy power system as described in clause 66 or any other clause, wherein said slaved inverter operating condition control circuitry comprises slaved inverter sweet spot control circuitry.
68. A renewable electrical energy power system as described in clause 1, 17, 30, or any other clause, and further comprising reactive inverter input optimization photovoltaic power control circuitry.
69. A renewable electrical energy power system as described in clause 68 or any other clause, wherein said reactive inverter input optimization photovoltaic power control circuitry comprises solar panel maximum power point independent inverter input optimization photovoltaic power control circuitry.
70. A renewable electrical energy power system as described in clause 68, 69, or any other clause, wherein said reactive inverter input optimization photovoltaic power control circuitry comprises inverter efficiency optimized converter control circuitry.
71. A renewable electrical energy power system as described in clause 68, 69, or any other clause, wherein said reactive inverter input optimization photovoltaic power control circuitry comprises inverter voltage input set point converter output voltage control circuitry.
72. A renewable electrical energy power system as described in clause 71 or any other clause, wherein said inverter voltage input set point converter output voltage control circuitry comprises inverter sweet spot converter control circuitry.
73. A renewable electrical energy power system as described in clause 72 or any other clause, wherein said inverter sweet spot converter control circuitry comprises photovoltaic inverter duty cycle switch control circuitry.

74. A renewable electrical energy power system as described in clause 70 or any other clause, wherein said inverter efficiency optimized converter control circuitry comprises substantially power isomorphic photovoltaic inverter input control circuitry.
75. A renewable electrical energy power system as described in clause 74 or any other clause, wherein said substantially power isomorphic photovoltaic inverter input control circuitry comprises substantially power isomorphic photovoltaic inverter duty cycle control circuitry.
76. A renewable electrical energy power system as described in clause 70, 75, or any other clause, wherein said inverter efficiency optimized converter control circuitry comprises inverter efficiency optimized converter control circuitry selected from a group consisting of:
  at least about 97% efficient photovoltaic conversion circuitry,
  at least about 97.5% efficient photovoltaic conversion circuitry,
  at least about 98% efficient photovoltaic conversion circuitry,
  at least about 98.5% efficient photovoltaic conversion circuitry,
  at least about 97% up to about 99.2% efficient photovoltaic conversion circuitry,
  at least about 97.5% up to about 99.2% efficient photovoltaic conversion circuitry,
  at least about 98% up to about 99.2% efficient photovoltaic conversion circuitry,
  at least about 98.5% up to about 99.2% efficient photovoltaic conversion circuitry,
  at least about 97% up to about wire transmission loss efficient photovoltaic conversion circuitry,
  at least about 97.5% up to about wire transmission loss efficient photovoltaic conversion circuitry,
  at least about 98% up to about wire transmission loss efficient photovoltaic conversion circuitry, and
  at least about 98.5% up to about wire transmission loss efficient photovoltaic conversion circuitry.
77. A renewable electrical energy power system as described in clause 1, 8, 30, or any other clause, further comprising inverter coordinated photovoltaic power conversion control circuitry.
78. A renewable electrical energy power system as described in clause 77 or any other clause, wherein said inverter coordinated photovoltaic power conversion control circuitry comprises photovoltaic converter output voltage control circuitry.
79. A renewable electrical energy power system as described in clause 78 or any other clause, wherein said photovoltaic converter output voltage control circuitry comprises photovoltaic inverter duty cycle switch control circuitry.
80. A renewable electrical energy power system as described in clause 77 or any other clause, wherein said inverter coordinated photovoltaic power conversion control circuitry comprises slaved photovoltaic power control circuitry.
81. A renewable electrical energy power system as described in clause 80 or any other clause, wherein said slaved photovoltaic power control circuitry comprises slaved photovoltaic inverter protection control circuitry.
82. A renewable electrical energy power system as described in clause 80 or any other clause, wherein said slaved photovoltaic power control circuitry comprises slaved photovoltaic voltage level control circuitry.
83. A renewable electrical energy power system as described in clause 80, 82 or any other clause, wherein said slaved photovoltaic power control circuitry comprises slaved photovoltaic current level control circuitry.
84. A renewable electrical energy power system as described in clause 77 or any other clause, wherein said inverter coordinated photovoltaic power conversion control circuitry comprises inverter protection photovoltaic power conversion control circuitry.
85. A renewable electrical energy power system as described in clause 84 or any other clause, wherein said inverter protection photovoltaic power conversion control circuitry comprises photovoltaic boundary condition power conversion control circuitry.
86. A renewable electrical energy power system as described in clause 85 or any other clause, wherein said inverter coordinated photovoltaic power conversion control circuitry further comprises independent inverter operating condition converter output control circuitry.
87. A renewable electrical energy power system as described in clause 77, 85, 86, or any other clause, wherein said inverter coordinated photovoltaic power conversion control circuitry comprises maximum inverter input converter output control circuitry.
88. A renewable electrical energy power system as described in clause 77 or any other clause, wherein said inverter coordinated photovoltaic power conversion control circuitry comprises:
  maximum photovoltaic inverter current converter functionality control circuitry;
  slaved maximum photovoltaic power point converter functionality control circuitry; and
  maximum photovoltaic inverter input photovoltaic voltage converter output voltage functionality control circuitry.
89. A renewable electrical energy power system as described in clause 1, 8, 17, 30, or any other clause, and further comprising a solar power conversion comparator that indicates a solar energy parameter of a first power capability as compared to a second power capability.
90. A renewable electrical energy power system as described in clause 89 or any other clause, wherein said first power capability comprises a traditional power conversion capability and wherein said second power capability comprises an inverter sweet spot operation capability.
91. A renewable electrical energy power system as described in clause 90 or any other clause, wherein said solar power conversion comparator comprises a solar power conversion comparator selected from a group consisting of: a solar power output difference comparator; a solar power efficiency difference comparator; a solar power cost difference comparator; and a solar power insolation utilization comparator.
92. A renewable electrical energy power system as described in clause 89, 91, or any other clause, wherein said solar power conversion comparator comprises an off-maximum efficiency inverter input voltage control.
93. A renewable electrical energy power system as described in clause 1, 8, 17, 30, or any other clause, and further comprising soft transition photovoltaic power conversion control circuitry.

94. A renewable electrical energy power system as described in clause 93 or any other clause, wherein said soft transition photovoltaic power conversion control circuitry comprises ramped photovoltaic voltage power conversion control circuitry.
95. A renewable electrical energy power system as described in clause 93, 94, or any other clause, wherein said soft transition photovoltaic power conversion control circuitry comprises ramped photovoltaic current power conversion control circuitry.
96. A renewable electrical energy power system as described in clause 93 or any other clause, wherein said soft transition photovoltaic power conversion control circuitry comprises photovoltaic output voltage-photovoltaic output current proportional duty cycle switch control circuitry.
97. A renewable electrical energy power system as described in clause 1, 8, 17, 30, or any other clause, wherein said control circuitry comprises photovoltaic inverter duty cycle switch control circuitry.
98. A renewable electrical energy power system as described in clause 97 or any other clause, wherein said photovoltaic inverter duty cycle switch control circuitry comprises photovoltaic inverter duty cycle switch control circuitry selected from a group consisting of:
  maximum inverter voltage determinative switching photovoltaic power conversion control circuitry; and
  maximum inverter current determinative switching photovoltaic power conversion control circuitry.
99. A renewable electrical energy power system as described in clause 97 or any other clause, wherein said photovoltaic duty cycle switch control circuitry further comprises maximum photovoltaic voltage determinative duty cycle switch control circuitry.
100. A renewable electrical energy power system as described in clause 97, 99, or any other clause, wherein said photovoltaic duty cycle switch control circuitry further comprises photovoltaic inverter maximum current determinative duty cycle switch control circuitry.
101. A renewable electrical energy power system as described in clause 1, 8, 17, 30, or any other clause, and further comprising an AC power grid interface to which said AC power output supplies power.
102. A renewable electrical energy power system as described in clause 1, 8, 17, 30, or any other clause, wherein said DC-AC inverter comprises a high voltage DC-AC solar power inverter.
103. A renewable electrical energy power system as described in clause 102 or any other clause, wherein said photovoltaic AC power output comprises a three phase photovoltaic AC power output.
104. A method of integrated renewable electrical energy power creation comprising the steps of:
  creating a DC photovoltaic output from at least one alternative electrical energy source;
  establishing said DC photovoltaic output as a DC photovoltaic input to a photovoltaic DC-DC power converter;
  photovoltaic inverter sourced converting said DC photovoltaic input into a converted DC photovoltaic output;
  photovoltaic inverter sourced controlling operation of said photovoltaic DC-DC converter while it acts to convert said DC photovoltaic input into said converted DC photovoltaic output;
  establishing said converted DC photovoltaic output as a converted DC photovoltaic input to a photovoltaic DC-AC inverter; and
  inverting said converted DC photovoltaic input into a photovoltaic AC power output.
105. A method of integrated renewable electrical energy power creation as described in clause 104 or any other clause, wherein said step of photovoltaic inverter sourced controlling operation of said photovoltaic DC-DC converter comprises the step of solar panel maximum power point independently controlling operation of said photovoltaic DC-DC converter.
106. A method of integrated renewable electrical energy power creation as described in clause 105 or any other clause, wherein said step of solar panel maximum power point independent controlling operation of said photovoltaic DC-DC converter comprises the step of maximum power point independently controlling inverter input voltage from said photovoltaic DC-DC converter.
107. A method of integrated renewable electrical energy power creation as described in clause 104 or any other clause, wherein said step of photovoltaic inverter sourced controlling operation comprises the step of substantially constant voltage output controlling operation of said photovoltaic DC-DC converter.
108. A method of integrated renewable electrical energy power creation as described in clause 107 or any other clause, wherein said step of substantially constant voltage output controlling operation of said photovoltaic DC-DC converter comprises the step of duty cycle switching said photovoltaic DC-AC inverter.
109. A method of integrated renewable electrical energy power creation as described in clause 104 or any other clause, wherein said step of photovoltaic inverter sourced controlling operation comprises the step of slavedly controlling operation of said photovoltaic DC-DC converter.
110. A method of integrated renewable electrical energy power creation as described in clause 109 or any other clause, wherein said step of slavedly controlling operation of said photovoltaic DC-DC converter comprises the step of slavedly controlling sweet spot operation of said photovoltaic DC-AC inverter.
111. A method of inverter optimized renewable electrical energy power creation comprising the steps of:
  creating a DC photovoltaic output from at least one alternative electrical energy source;
  establishing said DC photovoltaic output as a DC photovoltaic input to a photovoltaic DC-DC power converter;
  converting said DC photovoltaic input into a converted DC photovoltaic output;
  reactive inverter input optimization controlling operation of said photovoltaic DC-DC converter while it acts to convert said DC photovoltaic input into said converted DC photovoltaic output;
  establishing said converted DC photovoltaic output as a converted DC photovoltaic input to a photovoltaic DC-AC inverter; and
  inverting said converted DC photovoltaic input into a photovoltaic AC power output.
112. A method of inverter optimized renewable electrical energy power creation as described in clause 111 or any other clause, wherein said step of reactive inverter input optimization controlling operation of said photovoltaic DC-DC converter comprises the step of solar panel maximum power point independently controlling operation of said photovoltaic DC-DC converter.

113. A method of inverter optimized renewable electrical energy power creation as described in clause 111, 112, or any other clause, wherein said step of reactive inverter input optimization controlling operation of said photovoltaic DC-DC converter comprises the step of inverter efficiency optimization controlling operation of said photovoltaic DC-DC converter.

114. A method of inverter optimized renewable electrical energy power creation as described in clause 111, 112, or any other clause, wherein said step of reactive inverter input optimization controlling operation of said photovoltaic DC-DC converter comprises the step of inverter voltage input set point controlling operation of said photovoltaic DC-DC converter.

115. A method of inverter optimized renewable electrical energy power creation as described in clause 114 or any other clause, wherein said step of inverter voltage input set point controlling operation of said photovoltaic DC-DC converter comprises the step of inverter sweet spot controlling operation of said photovoltaic DC-DC converter.

116. A method of inverter optimized renewable electrical energy power creation as described in clause 115 or any other clause, wherein said step of inverter sweet spot controlling operation of said photovoltaic DC-DC converter comprises the step of duty cycle switching said photovoltaic DC-AC inverter.

117. A method of inverter optimized renewable electrical energy power creation as described in clause 113 or any other clause, wherein said step of inverter efficiency optimization controlling operation of said photovoltaic DC-DC converter comprises the step of substantially power isomorphically controlling operation of said photovoltaic DC-DC converter.

118. A method of inverter optimized renewable electrical energy power creation as described in clause 117 or any other clause, wherein said step of substantially power isomorphically controlling operation of said photovoltaic DC-DC converter comprises the step of substantially power isomorphically duty cycle switching said photovoltaic DC-AC inverter.

119. A method of inverter optimized renewable electrical energy power creation as described in clause 113, 118, or any other clause, wherein said step of substantially power isomorphically converting comprises the step of substantially power isomorphically converting selected from a group consisting of:
  solar power converting with at least about 97% efficiency,
  solar power converting with at least about 97.5% efficiency,
  solar power converting with at least about 98% efficiency,
  solar power converting with at least about 98.5% efficiency,
  solar power converting with at least about 97% up to about 99.2% efficiency,
  solar power converting with at least about 97.5% up to about 99.2% efficiency,
  solar power converting with at least about 98% up to about 99.2% efficiency,
  solar power converting with at least about 98.5% up to about 99.2% efficiency,
  solar power converting with at least about 97% up to about wire transmission loss efficiency,
  solar power converting with at least about 97.5% up to about wire transmission loss efficiency,
  solar power converting with at least about 98% up to about wire transmission loss efficiency, and
  solar power converting with at least about 98.5% up to about wire transmission loss efficiency.

120. A method of inverter protected renewable electrical energy power creation comprising the steps of:
  creating a DC photovoltaic output from at least one alternative electrical energy source;
  establishing said DC photovoltaic output as a DC photovoltaic input to a photovoltaic DC-DC power converter;
  photovoltaic inverter coordinated converting said DC photovoltaic input into a converted DC photovoltaic output;
  photovoltaic inverter coordinated controlling operation of said photovoltaic DC-DC converter while it acts to convert said DC photovoltaic input into said converted DC photovoltaic output;
  establishing said converted DC photovoltaic output as a converted DC photovoltaic input to a photovoltaic DC-AC inverter; and
  inverting said converted DC photovoltaic input into a photovoltaic AC power output.

121. A method of inverter protected renewable electrical energy power creation as described in clause 120 or any other clause, wherein said step of photovoltaic inverter coordinated controlling operation of said photovoltaic DC-DC converter comprises the step of controlling a photovoltaic DC-DC converter output of said photovoltaic DC-DC converter.

122. A method of inverter protected renewable electrical energy power creation as described in clause 121 or any other clause, wherein said step of controlling a photovoltaic DC-DC converter output of said photovoltaic DC-DC converter comprises the step of controlling a photovoltaic DC-DC converter voltage output of said photovoltaic DC-DC converter.

123. A method of inverter protected renewable electrical energy power creation as described in clause 122 or any other clause, wherein said step of controlling a photovoltaic DC-DC converter output of said photovoltaic DC-DC converter comprises the step of duty cycle switching said photovoltaic DC-AC inverter.

124. A method of inverter protected renewable electrical energy power creation as described in clause 120 or any other clause, wherein said step of photovoltaic inverter coordinated controlling operation of said photovoltaic DC-DC converter comprises the step of slavedly controlling operation of said photovoltaic DC-DC converter.

125. A method of inverter protected renewable electrical energy power creation as described in clause 124 or any other clause, wherein said step of slavedly controlling operation of said photovoltaic DC-DC converter comprises the step of slavedly providing photovoltaic inverter protection control of said photovoltaic DC-AC inverter.

126. A method of inverter protected renewable electrical energy power creation as described in clause 124 or any other clause, wherein said step of slavedly controlling operation of said photovoltaic DC-DC converter comprises the step of slavedly controlling voltage from said photovoltaic DC-DC converter.

127. A method of inverter protected renewable electrical energy power creation as described in clause 124, 126, or any other clause, wherein said step of slavedly controlling operation of said photovoltaic DC-DC converter comprises the step of slavedly controlling current from said photovoltaic DC-DC converter.
128. A method of inverter protected renewable electrical energy power creation as described in clause 120 or any other clause, wherein said step of photovoltaic inverter coordinated controlling operation of said photovoltaic DC-DC converter comprises the step of providing photovoltaic inverter protection power conversion control.
129. A method of inverter protected renewable electrical energy power creation as described in clause 128 or any other clause, wherein said step of providing photovoltaic inverter protection power conversion control comprises the step of providing photovoltaic boundary condition power conversion control.
130. A method of inverter protected renewable electrical energy power creation as described in clause 129 or any other clause, wherein said step of photovoltaic inverter coordinated controlling operation of said photovoltaic DC-DC converter comprises the step of independently controlling an inverter operating condition through said photovoltaic DC-DC converter.
131. A method of inverter protected renewable electrical energy power creation as described in clause 120, 129, 130, or any other clause, wherein said step of photovoltaic inverter coordinated controlling operation of said photovoltaic DC-DC converter comprises the step of controlling a maximum inverter input converter output.
132. A method of inverter protected renewable electrical energy power creation as described in clause 120 or any other clause, wherein said step of photovoltaic inverter coordinated controlling operation of said photovoltaic DC-DC converter comprises the steps of:
controlling a maximum photovoltaic inverter input current from said photovoltaic DC-DC converter;
slavedly controlling a maximum photovoltaic power point operation through said photovoltaic DC-DC converter; and
controlling a maximum photovoltaic inverter input voltage from said photovoltaic DC-DC converter.
133. A method of dynamically reactive renewable electrical energy power creation comprising the steps of:
creating a DC photovoltaic output from at least one alternative electrical energy source;
establishing said DC photovoltaic output as a DC photovoltaic input to a photovoltaic DC-DC power converter;
dynamically reactively converting said DC photovoltaic input into a converted DC photovoltaic output;
dynamically reactively controlling internal output through operation of said photovoltaic DC-DC converter while it acts to convert said DC photovoltaic input into said converted DC photovoltaic output;
establishing said converted DC photovoltaic output as a converted DC photovoltaic input to a photovoltaic DC-AC inverter; and
inverting said converted DC photovoltaic input into a photovoltaic AC power output.
134. A method of dynamically reactive renewable electrical energy power creation as described in clause 133 or any other clause, wherein said step of dynamically reactively controlling internal output through operation of said photovoltaic DC-DC converter comprises the step of multisource dynamically reactively controlling internal output through operation of said photovoltaic DC-DC converter.
135. A method of dynamically reactive renewable electrical energy power creation as described in clause 134 or any other clause, wherein said step of multisource dynamically reactively controlling internal output through operation of said photovoltaic DC-DC converter comprises the step of controlling a limited photovoltaic converter voltage output through operation of said photovoltaic DC-DC converter.
136. A method of dynamically reactive renewable electrical energy power creation as described in clause 134, 135, or any other clause, wherein said step of multisource dynamically reactively controlling internal output through operation of said photovoltaic DC-DC converter comprises the step of controlling a limited photovoltaic converter current output through operation of said photovoltaic DC-DC converter.
137. A method of dynamically reactive renewable electrical energy power creation as described in clause 133 through 136, or any other clause, wherein said step of dynamically reactively controlling internal output through operation of said photovoltaic DC-DC converter comprises the step of code compliantly dynamically reactively controlling internal output through operation of said photovoltaic DC-DC converter.
138. A method of dynamically reactive renewable electrical energy power creation as described in clause 137 or any other clause, wherein said step of code compliantly dynamically reactively controlling internal output through operation of said photovoltaic DC-DC converter comprises the step of slavedly dynamically reactively controlling internal output through operation of said photovoltaic DC-DC converter.
139. A method of dynamically reactive renewable electrical energy power creation as described in clause 138 or any other clause, wherein said step of slavedly dynamically reactively controlling internal output through operation of said photovoltaic DC-DC converter comprises the step of slavedly code compliantly dynamically reactively controlling internal output through operation of said photovoltaic DC-DC converter.
140. A method of renewable electrical energy power creation as described in clause 104, 111, 120, 133, or any other clause, wherein said step of creating a DC photovoltaic output from at least one solar energy source comprises the step of creating a DC photovoltaic output from at least one solar cell.
141. A method of renewable electrical energy power creation as described in clause 104, 110, 120, 133, or any other clause, wherein said step of creating a DC photovoltaic output from at least one solar energy source comprises the step of creating a DC photovoltaic output from a plurality of electrically connected solar cells.
142. A method of renewable electrical energy power creation as described in clause 104, 110, 120, 133, or any other clause, wherein said step of creating a DC photovoltaic output from at least one solar energy source comprises the step of creating a DC photovoltaic output from a plurality of adjacent electrically connected solar cells.
143. A method of renewable electrical energy power creation as described in clause 104, 111, 120, 133, or any other clause, wherein said step of creating a DC photovoltaic output from at least one solar energy source comprises the step of creating a DC photovoltaic output from at least one solar panel.

144. A method of renewable electrical energy power creation as described in clause 104, 111, 120, 133, or any other clause, wherein said step of creating a DC photovoltaic output from at least one solar energy source comprises the step of combining outputs from a plurality of electrically connected solar panels.

145. A method of renewable electrical energy power creation as described in clause 104, 111, 120, 133, or any other clause, wherein said step of creating a DC photovoltaic output from at least one solar energy source comprises the step of creating a DC photovoltaic output from at least one string of electrically connected solar panels.

146. A method of renewable electrical energy power creation as described in clause 144 or any other clause, wherein said step of converting said DC photovoltaic input further comprises the step of individual dedicated panel converting a DC photovoltaic input from each of said plurality of solar panels.

147. A method of renewable electrical energy power creation as described in clause 146 or any other clause, wherein said step of individual dedicated panel converting a DC photovoltaic input from each of said plurality of solar panels comprises the step of individual dedicated maximum photovoltaic power point converting a DC photovoltaic input from each of said plurality of solar panels.

148. A method of renewable electrical energy power creation as described in clause 147 or any other clause, wherein said step of converting said DC photovoltaic input comprises the step of physically integrally converting said DC photovoltaic input for individual solar panels.

149. A method of renewable electrical energy power creation as described in clause 146 or any other clause, and further comprising the step of serially connecting a plurality of photovoltaic DC-DC power converters to serially connect outputs from said plurality of solar panels.

150. A method of renewable electrical energy power creation as described in clause 149 or any other clause, wherein said step of inverting said converted DC photovoltaic input into an inverted AC photovoltaic output comprises the step of high voltage inverting said converted DC photovoltaic input into a high voltage inverted AC photovoltaic output.

151. A method of renewable electrical energy power creation as described in clause 150 or any other clause, wherein said step of high voltage inverting said converted DC photovoltaic input into a high voltage inverted AC photovoltaic output comprises the step of high voltage inverting said converted DC photovoltaic input into a three-phase high voltage inverted AC photovoltaic output.

152. A method of renewable electrical energy power creation as described in clause 144 or any other clause, wherein said step of combining outputs from a plurality of electrically connected solar panels comprises the step of combining outputs from a plurality of cadmium-telluride solar panels.

153. A method of renewable electrical energy power creation as described in clause 104, 111, 120, 133, or any other clause, and further comprising the steps of:
multimodally converting said DC photovoltaic input into a converted DC photovoltaic output; and
multimodally controlling operation of said photovoltaic DC-DC converter while it acts to convert said DC photovoltaic input into said converted DC photovoltaic output.

154. A method of renewable electrical energy power creation as described in clause 153 or any other clause, wherein said step of multimodally controlling operation of said photovoltaic DC-DC converter comprises the step of controlling a photovoltaic boundary condition of said photovoltaic DC-DC converter.

155. A method of renewable electrical energy power creation as described in clause 153, 154, or any other clause, wherein said step of multimodally controlling operation of said photovoltaic DC-DC converter comprises the step of controlling a maximum photovoltaic inverter input voltage output by said photovoltaic DC-DC converter.

156. A method of renewable electrical energy power creation as described in clause 153, 154, or any other clause, wherein said step of multimodally controlling operation of said photovoltaic DC-DC converter comprises the step of controlling a maximum photovoltaic output voltage proportional to a photovoltaic output current at at least some time during the process of converting said DC photovoltaic input into a converted DC photovoltaic output.

157. A method of renewable electrical energy power creation as described in clause 153 or any other clause, wherein said step of controlling said photovoltaic DC-DC converter while it acts to convert said DC photovoltaic input into said converted DC photovoltaic output comprises the steps of:
controlling a maximum photovoltaic inverter input current from said photovoltaic DC-DC converter;
slavedly controlling a maximum photovoltaic power point operation through said photovoltaic DC-DC converter; and
controlling a maximum photovoltaic inverter input voltage from said photovoltaic DC-DC converter.

158. A method of renewable electrical energy power creation as described in clause 153 or any other clause, wherein said step of controlling said photovoltaic DC-DC converter while it acts to convert said DC photovoltaic input into said converted DC photovoltaic output comprises the steps of:
controlling a maximum photovoltaic inverter input current from said photovoltaic DC-DC converter;
slavedly controlling a photovoltaic impedance increase and photovoltaic impedance decrease through said photovoltaic DC-DC converter; and
controlling a maximum photovoltaic inverter input voltage through operation of said photovoltaic DC-DC converter.

159. A method of renewable electrical energy power creation as described in clause 153 or any other clause, wherein said step of controlling said photovoltaic DC-DC converter while it acts to convert said DC photovoltaic input into said converted DC photovoltaic output comprises a step selected from a group consisting of the steps of:
alternating between a first modality of photovoltaic DC-DC power conversion and a second modality of photovoltaic DC-DC power conversion at at least some times;

both photovoltaic load impedance increasing and photovoltaic load impedance decreasing;
controlling a photovoltaic conversion boundary condition;
controlling a posterior photovoltaic operating condition through control of said photovoltaic DC-DC converter;
protecting a posterior photovoltaic element through control of said photovoltaic DC-DC converter;
substantially power isomorphically controlling operation of said photovoltaic DC-DC converter;
substantially power isomorphic photovoltaic converter functionality control circuitry;
disabling a photovoltaic conversion mode through control of said photovoltaic DC-DC converter;
protecting a photovoltaic inverter through control of said photovoltaic DC-DC converter
controlling said photovoltaic DC-DC converter to coordinate with characteristics of a photovoltaic inverter;
slavedly controlling a photovoltaic conversion modality through said photovoltaic DC-DC converter; and
photovoltaic inverter slavedly controlling a photovoltaic conversion modality through said photovoltaic DC-DC converter.

160. A method of renewable electrical energy power creation as described in clause 104, 111, 120, or any other clause, further comprising dynamically reactively controlling internal output through operation of said photovoltaic DC-DC converter while it acts to convert said DC photovoltaic input into said converted DC photovoltaic output.

161. A method of renewable electrical energy power creation as described in clause 160 or any other clause, wherein said step of dynamically reactively controlling internal output through operation of said photovoltaic DC-DC converter comprises the step of code compliantly dynamically reactively controlling internal output through operation of said photovoltaic DC-DC converter.

162. A method of renewable electrical energy power creation as described in clause 161 or any other clause, wherein said step of code compliantly dynamically reactively controlling internal output through operation of said photovoltaic DC-DC converter comprises the step of slavedly dynamically reactively controlling internal output through operation of said photovoltaic DC-DC converter.

163. A method of renewable electrical energy power creation as described in clause 162 or any other clause, wherein said step of slavedly dynamically reactively controlling internal output through operation of said photovoltaic DC-DC converter comprises the step of slavedly code compliantly dynamically reactively controlling internal output through operation of said photovoltaic DC-DC converter.

164. A method of renewable electrical energy power creation as described in clause 111, 120, 133, or any other clause, further comprising the step of photovoltaic inverter sourced controlling operation of said photovoltaic DC-DC converter.

165. A method of renewable electrical energy power creation as described in clause 164 or any other clause, wherein said step of photovoltaic inverter sourced controlling operation of said photovoltaic DC-DC converter comprises the step of solar panel maximum power point independently controlling operation of said photovoltaic DC-DC converter.

166. A method of renewable electrXal energy power creation as described in clause 165 or any other clause, wherein said step of solar panel maximum power point independent controlling operation of said photovoltaic DC-DC converter comprises the step of maximum power point independently controlling inverter input voltage from said photovoltaic DC-DC converter.

167. A method of renewable electrical energy power creation as described in clause 164 or any other clause, wherein said step of photovoltaic inverter sourced controlling operation comprises the step of substantially constant voltage output controlling operation of said photovoltaic DC-DC converter.

168. A method of renewable electrical energy power creation as described in clause 167 or any other clause, wherein said step of substantially constant voltage output controlling operation of said photovoltaic DC-DC converter comprises the step of duty cycle switching said photovoltaic DC-AC inverter.

169. A method of renewable electrical energy power creation as described in clause 164 or any other clause, wherein said step of photovoltaic inverter sourced controlling operation comprises the step of slavedly controlling operation of said photovoltaic DC-DC converter.

170. A method of renewable electrical energy power creation as described in clause 169 or any other clause, wherein said step of slavedly controlling operation of said photovoltaic DC-DC converter comprises the step of slavedly controlling sweet spot operation of said photovoltaic DC-AC inverter.

171. A method of renewable electrical energy power creation as described in clause 104, 120, 133, or any other clause, and further comprising the step of reactive inverter input optimization controlling operation of said photovoltaic DC-DC converter while it acts to convert said DC photovoltaic input into said converted DC photovoltaic output.

172. A method of renewable electrical energy power creation as described in clause 171 or any other clause, wherein said step of reactive inverter input optimization controlling operation of said photovoltaic DC-DC converter comprises the step of solar panel maximum power point independently controlling operation of said photovoltaic DC-DC converter.

173. A method of renewable electrical energy power creation as described in clause 171, 172, or any other clause, wherein said step of reactive inverter input optimization controlling operation of said photovoltaic DC-DC converter comprises the step of inverter efficiency optimization controlling operation of said photovoltaic DC-DC converter.

174. A method of renewable electrical energy power creation as described in clause 171, 172, or any other clause, wherein said step of reactive inverter input optimization controlling operation of said photovoltaic DC-DC converter comprises the step of inverter voltage input set point controlling operation of said photovoltaic DC-DC converter.

175. A method of renewable electrical energy power creation as described in clause 174 or any other clause, wherein said step of inverter voltage input set point controlling operation of said photovoltaic DC-DC converter comprises the step of inverter sweet spot controlling operation of said photovoltaic DC-DC converter.

176. A method of renewable electrical energy power creation as described in clause 175 or any other clause, wherein said step of inverter sweet spot controlling operation of said photovoltaic DC-DC converter comprises the step of duty cycle switching said photovoltaic DC-AC inverter.
177. A method of renewable electrical energy power creation as described in clause 173 or any other clause, wherein said step of inverter efficiency optimization controlling operation of said photovoltaic DC-DC converter comprises the step of substantially power isomorphically controlling operation of said photovoltaic DC-DC converter.
178. A method of renewable electrical energy power creation as described in clause 177 or any other clause, wherein said step of substantially power isomorphically controlling operation of said photovoltaic DC-DC converter comprises the step of substantially power isomorphically duty cycle switching said photovoltaic DC-AC inverter.
179. A method of renewable electrical energy power creation as described in clause 173, 178, or any other clause, wherein said step of substantially power isomorphically converting comprises the step of substantially power isomorphically converting selected from a group consisting of:
    solar power converting with at least about 97% efficiency,
    solar power converting with at least about 97.5% efficiency,
    solar power converting with at least about 98% efficiency,
    solar power converting with at least about 98.5% efficiency,
    solar power converting with at least about 97% up to about 99.2% efficiency,
    solar power converting with at least about 97.5% up to about 99.2% efficiency,
    solar power converting with at least about 98% up to about 99.2% efficiency,
    solar power converting with at least about 98.5% up to about 99.2% efficiency,
    solar power converting with at least about 97% up to about wire transmission loss efficiency,
    solar power converting with at least about 97.5% up to about wire transmission loss efficiency,
    solar power converting with at least about 98% up to about wire transmission loss efficiency, and
    solar power converting with at least about 98.5% up to about wire transmission loss efficiency.
180. A method of renewable electrical energy power creation as described in clause 104, 111, 133, or any other clause, and further comprising the step of photovoltaic inverter coordinated controlling operation of said photovoltaic DC-DC converter while it acts to convert said DC photovoltaic input into said converted DC photovoltaic output.
181. A method of renewable electrical energy power creation as described in clause 180 or any other clause, wherein said step of controlling a photovoltaic DC-DC converter output of said photovoltaic DC-DC converter comprises the step of controlling a photovoltaic DC-DC converter voltage output of said photovoltaic DC-DC converter.
182. A method of renewable electrical energy power creation as described in clause 181 or any other clause, wherein said step of controlling a photovoltaic DC-DC converter output of said photovoltaic DC-DC converter comprises the step of duty cycle switching said photovoltaic DC-AC inverter.
183. A method of renewable electrical energy power creation as described in clause 180 or any other clause, wherein said step of photovoltaic inverter coordinated controlling operation of said photovoltaic DC-DC converter comprises the step of slavedly controlling operation of said photovoltaic DC-DC converter.
184. A method of renewable electrical energy power creation as described in clause 183 or any other clause, wherein said step of slavedly controlling operation of said photovoltaic DC-DC converter comprises the step of slavedly providing photovoltaic inverter protection control of said photovoltaic DC-AC inverter.
185. A method of renewable electrical energy power creation as described in clause 183 or any other clause, wherein said step of slavedly controlling operation of said photovoltaic DC-DC converter comprises the step of slavedly controlling voltage from said photovoltaic DC-DC converter.
186. A method of renewable electrical energy power creation as described in clause 183, 185, or any other clause, wherein said step of slavedly controlling operation of said photovoltaic DC-DC converter comprises the step of slavedly controlling current from said photovoltaic DC-DC converter.
187. A method of renewable electrical energy power creation as described in clause 180 or any other clause, wherein said step of photovoltaic inverter coordinated controlling operation of said photovoltaic DC-DC converter comprises the step of providing photovoltaic inverter protection power conversion control.
188. A method of renewable electrical energy power creation as described in clause 187 or any other clause, wherein said step of providing photovoltaic inverter protection power conversion control comprises the step of providing photovoltaic boundary condition power conversion control.
189. A method of renewable electrical energy power creation as described in clause 188 or any other clause, wherein said step of photovoltaic inverter coordinated controlling operation of said photovoltaic DC-DC converter comprises the step of independently controlling an inverter operating condition through said photovoltaic DC-DC converter.
190. A method of renewable electrical energy power creation as described in clause 180, 188, 189, or any other clause, wherein said step of photovoltaic inverter coordinated controlling operation of said photovoltaic DC-DC converter comprises the step of controlling a maximum inverter input converter output.
    controlling a maximum photovoltaic inverter input current from said photovoltaic DC-DC converter;
    slavedly controlling a maximum photovoltaic power point operation through said photovoltaic DC-DC converter; and
    controlling a maximum photovoltaic inverter input voltage from said photovoltaic DC-DC converter.
191. A method of renewable electrical energy power creation as described in clause 180 or any other clause, wherein said step of photovoltaic inverter coordinated controlling operation of said photovoltaic DC-DC converter comprises the steps of:
192. A method of renewable electrical energy power creation as described in clause 104, 111, 120, 133, or any other clause, and further comprising the step of comparing solar power conversion between a first power capability as compared to a second power capability.
193. A method of renewable electrical energy power creation as described in clause 192 or any other clause, wherein said step of comparing solar power conversion between a first power capability as compared to a second power capability comprises the step of switching between the steps of traditionally power inverting said DC photovoltaic input and sweet spot input inverting said DC photovoltaic input.
194. A method of renewable electrical energy power creation as described in clause 192, 193, or any other clause, wherein said step of comparing solar power conversions comprises a step selected from a group consisting of:
comparing solar power output differences;
comparing solar power efficiency differences;
comparing solar power cost differences; and
comparing solar power insolation utilizations.
195. A method of renewable electrical energy power creation as described in clause 192, 194, or any other clause, wherein said step of comparing solar power conversions comprises the step of controlling inverter input voltage off a maximum efficiency level.
196. A method of renewable electrical energy power creation as described in clause 104, 111, 120, 133, or any other clause, and further comprising the step of softly transitioning a converted photovoltaic power level electrical parameter.
197. A method of renewable electrical energy power creation as described in clause 196 or any other clause, wherein said step of softly transitioning a converted photovoltaic power level electrical parameter comprises the step of ramping a photovoltaic voltage level.
198. A method of renewable electrical energy power creation as described in clause 196, 197, or any other clause, wherein said step of softly transitioning a converted photovoltaic power level electrical parameter comprises the step of ramping a photovoltaic current level.
199. A method of renewable electrical energy power creation as described in clause 196 or any other clause, wherein said step of softly transitioning a converted photovoltaic power level electrical parameter comprises the step of controlling a photovoltaic output voltage proportional to a photovoltaic output current.
200. A method of renewable electrical energy power creation as described in clause 104, 111, 120, 133, or any other clause, wherein said step of controlling operation of said photovoltaic DC-DC converter comprises the step of duty cycle switching said photovoltaic DC-AC inverter.
201. A method of renewable electrical energy power creation as described in clause 200 or any other clause, wherein said step of duty cycle switching said DC-AC inverter comprises a step selected from a group consisting of:
maximum photovoltaic voltage determinatively duty cycle switching a photovoltaic DC-AC inverter; and
photovoltaic inverter maximum current determinatively duty cycle switching a photovoltaic DC-AC inverter.
202. A method of renewable electrical energy power creation as described in clause 200 or any other clause, wherein said step of duty cycle switching said DC-AC inverter comprises the step of maximum photovoltaic power point duty cycle switching a photovoltaic DC-DC converter.
203. A method of renewable electrical energy power creation as described in clause 200 through 202, or any other clause, wherein said step of duty cycle switching a photovoltaic DC-DC converter comprises the step of photovoltaic inverter maximum current determinatively duty cycle switching a photovoltaic DC-DC converter.
204. An alternative electrical energy power system as described in clause 104, 111, 120, 133, or any other clause, and further comprising the step of interfacing said inverted AC photovoltaic output with an AC power grid.
205. An alternative electrical energy power system as described in clause 104, 111, 120, 133, or any other clause, wherein said step of photovoltaic DC-AC inverting comprises the step of high voltage inverting said converted DC photovoltaic input into a high voltage inverted AC photovoltaic output.
206. An alternative electrical energy power system as described in clause 205 or any other clause, wherein said step of high voltage inverting said converted DC photovoltaic input into a high voltage inverted AC photovoltaic output comprises the step of high voltage inverting said converted DC photovoltaic input into a three-phase high voltage inverted AC photovoltaic output.

C: Priority Case PCT/US2008/057105 Claims Now Stated as Clauses:
1. A vacillatory conversion mode solar energy power system comprising:
at least one solar energy source having a DC photovoltaic output;
a DC input that accepts power from said DC photovoltaic output;
first modality photovoltaic DC-DC power conversion circuitry responsive to said DC input;
second modality photovoltaic DC-DC power conversion circuitry responsive to said DC input;
alternative mode photovoltaic power converter functionality control circuitry configured to alternatively switch at at least some times between said first modality photovoltaic DC-DC power conversion circuitry and said second modality photovoltaic DC-DC power conversion circuitry;
a photovoltaic DC-DC power converter responsive to said alternative mode photovoltaic power converter functionality control circuitry;
a photovoltaic DC power output connected to said photovoltaic DC-DC power converter;
a photovoltaic DC-AC inverter responsive to said photovoltaic DC power output; and
a photovoltaic AC power output responsive to said photovoltaic DC-AC inverter.
2. A vacillatory conversion mode solar energy power system as described in clause 1 or any other clause, wherein said alternative mode photovoltaic power converter functionality control circuitry comprises disable alternative mode photovoltaic power conversion control circuitry.
3. A vacillatory conversion mode solar energy power system as described in clause 2 or any other clause, wherein said first modality photovoltaic DC-DC power conversion circuitry and said second modality photovoltaic DC-DC power conversion circuitry comprise opposite modality photovoltaic DC-DC power conversion circuitries.
4. A vacillatory conversion mode solar energy power system as described in clause 3 or any other clause, wherein said opposite modality photovoltaic DC-DC power conversion circuitries comprise at least one photovoltaic impedance increase photovoltaic DC-DC power conversion circuitry and at least one photovoltaic impedance decrease photovoltaic DC-DC power conversion circuitry.
5. A vacillatory conversion mode solar energy power system as described in clause 1 or any other clause, wherein said alternative mode photovoltaic power converter functionality control circuitry comprises substantially disjunctive impedance transformation photovoltaic power conversion control circuitry.
6. A vacillatory conversion mode solar energy power system as described in clause 1 or any other clause, wherein said alternative mode photovoltaic power converter functionality control circuitry comprises alternative mode photovoltaic power converter functionality control circuitry selected from a group consisting of:
photovoltaic impedance transformation power conversion control circuitry;
maximum photovoltaic inverter current converter functionality control circuitry;
maximum photovoltaic power point converter functionality control circuitry;
photovoltaic inverter operating condition converter functionality control circuitry;
both photovoltaic load impedance increase converter functionality control circuitry and photovoltaic load impedance decrease converter functionality control circuitry;
slaved maximum photovoltaic power point converter functionality control circuitry;
slaved photovoltaic inverter operating condition converter functionality control circuitry;
slaved photovoltaic load impedance increase converter functionality control circuitry;
slaved photovoltaic load impedance decrease converter functionality control circuitry;
both slaved photovoltaic load impedance increase converter functionality control circuitry and slaved photovoltaic load impedance decrease converter functionality control circuitry;
photovoltaic boundary condition converter functionality control circuitry;
posterior photovoltaic element protection converter functionality control circuitry;
photovoltaic inverter protection converter functionality control circuitry;
photovoltaic inverter coordinated converter functionality control circuitry; and
all permutations and combinations of each of the above.
7. A vacillatory conversion mode solar energy power system as described in clause 1 or any other clause, and further comprising photovoltaic power condition responsive circuitry to which said alternative mode photovoltaic power conversion control circuitry is responsive.
8. A vacillatory conversion mode solar energy power system as described in clause 7 or any other clause, wherein said alternative mode photovoltaic power converter functionality control circuitry comprises threshold triggered alternative mode photovoltaic power conversion control circuitry.
9. A vacillatory conversion mode solar energy power system as described in clause 1 or 6 or any other clause, and further comprising an AC power grid interface to which said AC power output supplies power.
10. A solar energy power converter comprising:
at least one solar energy source having a DC photovoltaic output;
a DC input that accepts power from said DC photovoltaic output;
first modality photovoltaic DC-DC power conversion circuitry responsive to said DC input;
second modality photovoltaic DC-DC power conversion circuitry responsive to said DC input;
alternative mode photovoltaic power converter functionality control circuitry configured to alternatively switch at at least some times between said first modality photovoltaic DC-DC power conversion circuitry and said second modality photovoltaic DC-DC power conversion circuitry;
a photovoltaic DC-DC power converter responsive to said alternative mode photovoltaic power converter functionality control circuitry; and
a photovoltaic DC power output connected to said photovoltaic DC-DC power converter.
11. An efficient solar energy power system comprising:
at least one solar energy source having a DC photovoltaic output;
a DC input that accepts power from said DC photovoltaic output;
at least one substantially power isomorphic photovoltaic DC-DC power converter responsive to said DC input;
substantially power isomorphic photovoltaic converter functionality control circuitry to which at least one of said substantially isomorphic DC-DC power converters are responsive;
a photovoltaic DC power output connected to said photovoltaic DC-DC power converter;
a photovoltaic DC-AC inverter responsive to said photovoltaic DC power output; and
a photovoltaic AC power output responsive to said photovoltaic DC-AC inverter.
12. An efficient solar energy power system as described in clause 11 or any other clause, wherein said substantially power isomorphic photovoltaic DC-DC power converter comprises a substantially power isomorphic photovoltaic impedance converter.
13. An efficient solar energy power system as described in clause 12 or any other clause, wherein said substantially power isomorphic photovoltaic impedance converter comprises a substantially power isomorphic switchmode photovoltaic impedance converter.
14. An efficient solar energy power system as described in clause 13 or any other clause, wherein said at least one solar power source comprises at least one plurality of solar panels, wherein said DC-DC power converter comprises a plurality of series connected DC-DC power converters, each independently responsive to one of said plurality of solar panels, and wherein said plurality of series connected DC-DC power converters each individually comprise:
individual first modality photovoltaic DC-DC power conversion circuitry responsive to said DC input;

individual second modality photovoltaic DC-DC power conversion circuitry responsive to said DC input; and individual alternative mode photovoltaic power converter functionality control circuitry configured to alternatively switch at at least some times between said first modality photovoltaic DC-DC power conversion circuitry and said second modality photovoltaic DC-DC power conversion circuitry.

15. An efficient solar energy power system as described in clause 14 or any other clause, wherein said individual alternative mode photovoltaic power converter functionality control circuitry comprises static switch alternative mode photovoltaic power conversion control circuitry.

16. An efficient solar energy power system as described in clause 11 or 14, or any other clause wherein said substantially power isomorphic photovoltaic converter functionality control circuitry comprises substantially power isomorphic photovoltaic converter functionality control circuitry selected from a group consisting of:
   at least about 97% efficient photovoltaic conversion circuitry,
   at least about 97.5% efficient photovoltaic conversion circuitry,
   at least about 98% efficient photovoltaic conversion circuitry,
   at least about 98.5% efficient photovoltaic conversion circuitry,
   at least about 97% up to about 99.2% efficient photovoltaic conversion circuitry,
   at least about 97.5% up to about 99.2% efficient photovoltaic conversion circuitry,
   at least about 98% up to about 99.2% efficient photovoltaic conversion circuitry,
   at least about 98.5% up to about 99.2% efficient photovoltaic conversion circuitry,
   at least about 97% up to about wire transmission loss efficient photovoltaic conversion circuitry,
   at least about 97.5% up to about wire transmission loss efficient photovoltaic conversion circuitry,
   at least about 98% up to about wire transmission loss efficient photovoltaic conversion circuitry, and
   at least about 98.5% up to about wire transmission loss efficient photovoltaic conversion circuitry.

17. An efficient solar energy power system as described in clause 11, 14, or 16 or any other clause, and further comprising an AC power grid interface to which said AC power output supplies power.

18. A solar energy power converter comprising:
   at least one solar energy source having a DC photovoltaic output;
   a DC input that accepts power from said DC photovoltaic output;
   at least one substantially power isomorphic photovoltaic DC-DC power converter responsive to said DC input;
   substantially power isomorphic photovoltaic converter functionality control circuitry to which at least one of said substantially isomorphic DC-DC power converters are responsive; and
   a photovoltaic DC power output connected to said photovoltaic DC-DC power converter.

19. A multimodal solar energy power system comprising:
   at least one solar energy source having a DC photovoltaic output;
   a DC input that accepts power from said DC photovoltaic output;
   at least one multimodal photovoltaic DC-DC power converter responsive to said DC input;
   multimodal converter functionality control circuitry to which said at least one multimodal photovoltaic DC-DC power converter is responsive;
   a photovoltaic DC power output connected to said multimodal photovoltaic DC-DC power converter;
   a photovoltaic DC-AC inverter responsive to said photovoltaic DC power output; and
   a photovoltaic AC power output responsive to said photovoltaic DC-AC inverter.

20. A multimodal solar energy power system as described in clause 19 or any other clause, wherein said at least one multimodal photovoltaic DC-DC power converter comprises at least one low energy storage photovoltaic DC-DC power converter.

21. A multimodal solar energy power system as described in clause 20 or any other clause, wherein said at least one low energy storage photovoltaic DC-DC power converter comprises at least one partial energy storage photovoltaic DC-DC power converter.

22. A multimodal solar energy power system as described in clause 20 or any other clause, wherein said at least one low energy storage photovoltaic DC-DC power converter comprises at least one substantially constant energy storage photovoltaic DC-DC power converter.

23. A multimodal solar energy power system as described in clause 20 or any other clause, wherein said at least one low energy storage photovoltaic DC-DC power converter comprises at least one energy storage-duty cycle proportionality photovoltaic DC-DC power converter.

24. A multimodal solar energy power system as described in clause 20 or any other clause, wherein said at least one low energy storage photovoltaic DC-DC power converter comprises at least one switch cycle inductor energy-duty cycle proportionality photovoltaic DC-DC power converter.

25. A multimodal solar energy power system as described in clause 20 or any other clause, wherein said at least one low energy storage photovoltaic DC-DC power converter comprises at least one cycle-by-cycle energy storage-conversion voltage difference proportionality photovoltaic DC-DC power converter.

26. A multimodal solar energy power system as described in clause 19 or 20 or any other clause, wherein said multimodal converter functionality control circuitry comprises alternative mode photovoltaic power converter functionality control circuitry.

27. A multimodal solar energy power system as described in clause 19 or any other clause, wherein said at least one solar energy source comprises at least one plurality of solar panels, wherein said at least one multimodal photovoltaic DC-DC power converter comprises a plurality of series connected multimodal photovoltaic DC-DC power converters, each responsive to one of said plurality of solar panels and further comprising a series connection combining a plurality of photovoltaic DC converter outputs to create said converter photovoltaic DC power output.

28. A multimodal solar energy power system as described in clause 27 or any other clause, wherein said plurality of series connected multimodal photovoltaic DC-DC power converters are physically integrated with individual solar panels.

29. A multimodal solar energy power system as described in clause 19 or any other clause, wherein said multimodal converter functionality control circuitry comprises photovoltaic boundary condition converter functionality control circuitry.
30. A multimodal solar energy power system as described in clause 29 or any other clause, wherein said multimodal converter functionality control circuitry further comprises independent photovoltaic operating condition converter functionality control circuitry.
31. A multimodal solar energy power system as described in clause 19, 29, or 30 or any other clause, wherein said multimodal converter functionality control circuitry comprises maximum photovoltaic inverter input photovoltaic voltage converter output voltage functionality control circuitry.
32. A multimodal solar energy power system as described in clause 19, 29, or 30 or any other clause, wherein said multimodal converter functionality control circuitry comprises maximum photovoltaic output voltage-photovoltaic output current proportional photovoltaic converter functionality control circuitry.
33. A multimodal solar energy power system as described in clause 19 or any other clause, wherein said multimodal converter functionality control circuitry comprises:
    maximum photovoltaic inverter current converter functionality control circuitry;
    slaved maximum photovoltaic power point converter functionality control circuitry; and
    maximum photovoltaic inverter input photovoltaic voltage converter output voltage functionality control circuitry.
34. A multimodal solar energy power system as described in clause 19 or any other clause, wherein said multimodal converter functionality control circuitry comprises:
    maximum photovoltaic inverter current converter functionality control circuitry;
    slaved photovoltaic voltage increase and photovoltaic voltage decrease maximum photovoltaic power point converter functionality control circuitry; and
    maximum photovoltaic inverter input voltage photovoltaic converter output-voltage functionality control circuitry.
35. A multimodal solar energy power system as described in clause 19 or any other clause, wherein said multimodal converter functionality control circuitry comprises multimodal converter functionality control circuitry selected from a group consisting of:
    alternative mode photovoltaic power converter functionality control circuitry configured to alternatively switch at at least some times between first modality photovoltaic DC-DC power conversion circuitry and second modality photovoltaic DC-DC power conversion circuitry;
    both photovoltaic load impedance increase converter functionality control circuitry and photovoltaic load impedance decrease converter functionality control circuitry;
    photovoltaic boundary condition converter functionality control circuitry;
    posterior photovoltaic operating condition converter functionality control circuitry;
    posterior photovoltaic element protection converter functionality control circuitry;
    substantially power isomorphic photovoltaic converter functionality control circuitry;
    photovoltaic disable mode converter functionality control circuitry;
    photovoltaic inverter protection converter functionality control circuitry;
    photovoltaic inverter coordinated converter functionality control circuitry;
    photovoltaic slaved mode converter functionality control circuitry; and
    photovoltaic inverter slaved converter functionality control circuitry.
36. A multimodal solar energy power system as described in clause 19, 20, 27, or 35 or any other clause, and further comprising an AC power grid interface to which said AC power output supplies power.
37. A solar energy power converter comprising:
    at least one solar energy source having a DC photovoltaic output;
    a DC input that accepts power from said DC photovoltaic output;
    at least one multimodal photovoltaic DC-DC power converter responsive to said DC input;
    multimodal converter functionality control circuitry to which said at least one multimodal photovoltaic DC-DC power converter is responsive; and
    a photovoltaic DC power output connected to said multimodal photovoltaic DC-DC power converter.
38. A solar energy power system as described in clause 37 or any other clause, wherein said photovoltaic DC-AC inverter comprises a high voltage DC-AC solar power inverter.
39. A solar energy power system as described in clause 38 or any other clause, wherein said photovoltaic AC power output comprises a three phase photovoltaic AC power output.
40. A solar energy power system as described in clause 1, 11, or 19 or any other clause, wherein said at least one solar energy source having a DC photovoltaic output comprises at least one solar cell.
41. A solar energy power system as described in clause 1, 11, or 19 or any other clause, wherein said at least one solar energy source having a DC photovoltaic output comprises a plurality of electrically connected solar cells.
42. A solar energy power system as described in clause 1, 11, or 19 or any other clause, wherein said at least one solar energy source having a DC photovoltaic output comprises a plurality of adjacent electrically connected solar cells.
43. A solar energy power system as described in clause 1, 11, or 19 or any other clause, wherein said at least one solar energy source having a DC photovoltaic output comprises at least one solar panel.
44. A solar energy power system as described in clause 1, 11, or 19 or any other clause, wherein said at least one solar energy source having a DC photovoltaic output comprises a plurality of electrically connected solar panels.
45. A solar energy power system as described in clause 1, 11, or 19 or any other clause, wherein said at least one solar energy source having a DC photovoltaic output comprises at least one string of electrically connected solar panels.
46. A solar energy power system as described in clause 44 or any other clause, wherein said wherein said photovoltaic DC-DC power converter comprises:
    at least one photovoltaic power interrupt switch element;

at least one photovoltaic power shunt switch element; and photovoltaic switch control circuitry to which said at least one photovoltaic power interrupt switch element and said at least one photovoltaic power shunt switch element are responsive.

47. A solar energy power system as described in clause 44 or any other clause, wherein said at least one power interrupt switch element comprises a pair of power series pathed semiconductor switches, and wherein said at least one power shunt switch element comprises a pair of power shunt pathed semiconductor switches.

48. A solar energy power system as described in clause 47 or any other clause, wherein said photovoltaic DC-DC power converter further comprises:
   a. at least one parallel capacitance; and
   b. at least one series inductance.

49. A solar energy power system as described in clause 47 or any other clause, wherein said converter functionality control circuitry comprises fractional switch element control circuitry.

50. A solar energy power system as described in clause 44 through 49 or any other clause, wherein said control circuitry comprises photovoltaic impedance transformation duty cycle switch control circuitry.

51. A solar energy power system as described in clause 44 through 50 or any other clause, wherein said at least one solar energy source comprises at least one plurality of solar panels, wherein said at least one photovoltaic DC-DC power converter comprises a plurality of series connected photovoltaic DC-DC power converters, each responsive to one of said plurality of solar panels and further comprising a series connection combining a plurality of photovoltaic DC converter outputs to create said converter photovoltaic DC power output.

52. A solar energy power system as described in clause 51 or any other clause, wherein said plurality of photovoltaic DC-DC power converters comprise a plurality of individually panel dedicated photovoltaic DC-DC power converters.

53. A solar energy power system as described in clause 52 or any other clause, wherein said converter functionality control circuitry comprises a plurality of individually panel dedicated maximum photovoltaic power point converter functionality control circuitries.

54. A solar energy power system as described in clause 53 or any other clause, wherein said plurality of individually panel dedicated photovoltaic DC-DC power converters and said plurality of individually panel dedicated maximum power point converter functionality control circuitries are each physically integrated with individual solar panels.

55. A solar energy power system as described in clause 52 or any other clause, wherein said plurality of individually panel dedicated photovoltaic DC-DC power converters and said plurality of solar panels comprise a plurality of series connected strings of solar power circuits.

56. A solar energy power system as described in clause 55 or any other clause, wherein said photovoltaic DC-AC inverter comprises a high voltage DC-AC solar power inverter.

57. A solar energy power system as described in clause 56 or any other clause, wherein said photovoltaic AC power output comprises a three phase photovoltaic AC power output.

58. A solar energy power system as described in clause 44 or any other clause, wherein said plurality of solar panels comprises a plurality of cadmium-telluride solar panels.

59. A solar energy power system as described in clause 51 or 55 or any other clause, wherein said photovoltaic DC-DC power converter comprises a full photovoltaic temperature voltage operating range photovoltaic DC-DC power converter.

60. A solar energy power system as described in clause 11 or 19 or any other clause, wherein said photovoltaic DC-DC power converter comprises:
   first modality photovoltaic DC-DC power conversion circuitry responsive to said DC input; and
   second modality photovoltaic DC-DC power conversion circuitry responsive to said DC input; and
   wherein said converter functionality control circuitry comprises alternative mode photovoltaic power converter functionality control circuitry configured to alternatively switch at at least some times between said first modality photovoltaic DC-DC power conversion circuitry and said second modality photovoltaic DC-DC power conversion circuitry.

61. A solar energy power system as described in clause 60 or any other clause, wherein said alternative mode photovoltaic power converter functionality control circuitry comprises disable alternative mode photovoltaic power conversion control circuitry.

62. A solar energy power system as described in clause 61 or any other clause, wherein said first modality photovoltaic DC-DC power conversion circuitry and said second modality photovoltaic DC-DC power conversion circuitry comprise opposite modality photovoltaic DC-DC power conversion circuitries.

63. A solar energy power system as described in clause 62 or any other clause, wherein said opposite modality photovoltaic DC-DC power conversion circuitries comprise at least one impedance increase photovoltaic DC-DC power conversion circuitry and at least one impedance decrease photovoltaic DC-DC power conversion circuitry.

64. A solar energy power system as described in clause 60 or any other clause, wherein said alternative mode photovoltaic power converter functionality control circuitry comprises substantially disjunctive impedance transformation photovoltaic power conversion control circuitry.

65. A solar energy power system as described in clause 60 or any other clause, wherein said alternative mode photovoltaic power converter functionality control circuitry comprises alternative mode photovoltaic power converter functionality control circuitry selected from a group consisting of:
   photovoltaic impedance transformation power conversion control circuitry;
   maximum photovoltaic inverter current converter functionality control circuitry;
   maximum photovoltaic power point converter functionality control circuitry;
   photovoltaic inverter operating condition converter functionality control circuitry;
   both photovoltaic load impedance increase converter functionality control circuitry and photovoltaic load impedance decrease converter functionality control circuitry;
   slaved maximum photovoltaic power point converter functionality control circuitry;

slaved photovoltaic inverter operating condition converter functionality control circuitry;
slaved photovoltaic load impedance increase converter functionality control circuitry;
slaved photovoltaic load impedance decrease converter functionality control circuitry;
both slaved photovoltaic load impedance increase converter functionality control circuitry and slaved photovoltaic load impedance decrease converter functionality control circuitry;
photovoltaic boundary condition converter functionality control circuitry;
posterior photovoltaic element protection converter functionality control circuitry;
photovoltaic inverter protection converter functionality control circuitry;
photovoltaic inverter coordinated converter functionality control circuitry; and
all permutations and combinations of each of the above.

66. A solar energy power system as described in clause 65 or any other clause, and further comprising photovoltaic power condition responsive circuitry to which said alternative mode photovoltaic power conversion control circuitry is responsive.

67. A solar energy power system as described in clause 66 or any other clause, wherein said alternative mode photovoltaic power converter functionality control circuitry comprises threshold triggered alternative mode photovoltaic power conversion control circuitry.

68. A solar energy power system as described in clause 1 or 11 or any other clause, wherein said photovoltaic DC-DC power converter comprises at least one multimodal photovoltaic DC-DC power converter and wherein said converter functionality control circuitry comprises multimodal converter functionality control circuitry.

69. A solar energy power system as described in clause 68 or any other clause, wherein said wherein said multimodal converter functionality control circuitry comprises photovoltaic boundary condition converter functionality control circuitry.

70. A solar energy power system as described in clause 69 or any other clause, wherein said multimodal converter functionality control circuitry further comprises independent photovoltaic operating condition converter functionality control circuitry.

71. A solar energy power system as described in clause 68, 69, or 70 or any other clause, wherein said multimodal converter functionality control circuitry comprises a maximum photovoltaic inverter input photovoltaic converter output voltage functionality control circuitry.

72. A solar energy power system as described in clause 68, 69, or 70 or any other clause, wherein said multimodal converter functionality control circuitry comprises maximum photovoltaic output voltage-photovoltaic output current proportional photovoltaic converter functionality control circuitry.

73. A solar energy power system as described in clause 68 or any other clause, wherein said multimodal converter functionality control circuitry comprises:
maximum photovoltaic inverter current converter functionality control circuitry;
slaved maximum photovoltaic power point converter functionality control circuitry; and maximum photovoltaic inverter input photovoltaic voltage converter output voltage functionality control circuitry.

74. A solar energy power system as described in clause 68 or any other clause, wherein said multimodal converter functionality control circuitry comprises:
maximum photovoltaic inverter current converter functionality control circuitry;
slaved photovoltaic voltage increase and photovoltaic voltage decrease maximum photovoltaic power point converter functionality control circuitry; and
maximum photovoltaic inverter input voltage photovoltaic converter output voltage functionality control circuitry.

75. A solar energy power system as described in clause 68 or any other clause, wherein said multimodal converter functionality control circuitry comprises multimodal converter functionality control circuitry selected from a group consisting of:
alternative mode photovoltaic power converter functionality control circuitry configured to alternatively switch at at least some times between first modality photovoltaic DC-DC power conversion circuitry and second modality photovoltaic DC-DC power conversion circuitry; both photovoltaic load impedance increase converter functionality control circuitry and photovoltaic load impedance decrease converter functionality control circuitry;
photovoltaic boundary condition converter functionality control circuitry;
posterior photovoltaic operating condition converter functionality control circuitry;
posterior photovoltaic element protection converter functionality control circuitry;
substantially power isomorphic photovoltaic converter functionality control circuitry;
photovoltaic disable mode converter functionality control circuitry;
photovoltaic inverter protection converter functionality control circuitry;
photovoltaic inverter coordinated converter functionality control circuitry;
photovoltaic slaved mode converter functionality control circuitry; and
photovoltaic inverter slaved converter functionality control circuitry.

76. A solar energy power system as described in clause 1, 11, or 19 or any other clause, and further comprising a solar power conversion comparator that indicates a solar energy parameter of a first power capability as compared to a second power capability.

77. A solar energy power system as described in clause 76 or any other clause, wherein said solar power conversion comparator comprises a conversion operation switch that switches operation between said first power capability and said second power capability.

78. A solar energy power system as described in clause 77 or any other clause, wherein said first power capability comprises a traditional power conversion capability and wherein said second power capability comprises an improved power conversion capability.

79. A solar energy power system as described in clause 76 or 77 or any other clause, wherein said solar power conversion comparator comprises a solar power conversion comparator selected from a group consisting of:
a solar power output difference comparator;
a solar power efficiency difference comparator;
a solar power cost difference comparator; and
a solar power insolation utilization comparator.

80. A solar energy power system as described in clause 78 or any other clause, wherein said improved power conversion capability comprises an improved power conversion capability selected from a group consisting of:
  alternative mode photovoltaic power converter capability;
  substantially power isomorphic photovoltaic impedance converter capability; and
  multimodal photovoltaic DC-DC power converter capability.
81. A solar energy power system as described in clause 80 or any other clause, wherein said photovoltaic DC-DC power converter comprises a pair of power series pathed semiconductor switches, and wherein said at least one power shunt switch element comprises a pair of power shunt pathed semiconductor switches and wherein said solar power conversion comparator comprises a shunt switch operation disable element.
82. A solar energy power system as described in clause 1 or 19 or any other clause, wherein said converter functionality control circuitry comprises substantially power isomorphic photovoltaic converter functionality control circuitry.
83. A solar energy power system as described in clause 82 or any other clause, wherein said photovoltaic DC-DC power converter comprises a substantially power isomorphic photovoltaic impedance converter.
84. A solar energy power system as described in clause 83 or any other clause, wherein said at least one solar energy source comprises at least one plurality of solar panels, wherein said DC-DC power converter comprises a plurality of series connected DC-DC power converters, each independently responsive to one of said plurality of solar panels, and wherein said plurality of series connected DC-DC power converters each individually comprise:
  individual first modality photovoltaic DC-DC power conversion circuitry responsive to said DC input;
  individual second modality photovoltaic DC-DC power conversion circuitry responsive to said DC input; and
  individual alternative mode photovoltaic power converter functionality control circuitry configured to alternatively switch at at least some times between said first modality photovoltaic DC-DC power conversion circuitry and said second modality photovoltaic DC-DC power conversion circuitry.
85. A solar energy power system as described in clause 84 or any other clause, wherein said individual alternative mode photovoltaic power converter functionality control circuitry comprises static switch alternative mode photovoltaic power conversion control circuitry.
86. A solar energy power system as described in clause 83 or 84 or any other clause, wherein said substantially power isomorphic photovoltaic converter functionality control circuitry comprises substantially power isomorphic photovoltaic converter functionality control circuitry selected from a group consisting of:
  at least about 97% efficient photovoltaic conversion circuitry,
  at least about 97.5% efficient photovoltaic conversion circuitry,
  at least about 98% efficient photovoltaic conversion circuitry,
  at least about 98.5% efficient photovoltaic conversion circuitry,
  at least about 97% up to about 99.2% efficient photovoltaic conversion circuitry,
  at least about 97.5% up to about 99.2% efficient photovoltaic conversion circuitry,
  at least about 98% up to about 99.2% efficient photovoltaic conversion circuitry,
  at least about 98.5% up to about 99.2% efficient photovoltaic conversion circuitry,
  at least about 97% up to about wire transmission loss efficient photovoltaic conversion circuitry,
  at least about 97.5% up to about wire transmission loss efficient photovoltaic conversion circuitry,
  at least about 98% up to about wire transmission loss efficient photovoltaic conversion circuitry, and
  at least about 98.5% up to about wire transmission loss efficient photovoltaic conversion circuitry.
87. A solar energy power system as described in clause 1, 11, or 19 or any other clause, and further comprising maximum photovoltaic power point converter functionality control circuitry to which said at least one photovoltaic DC-DC power converter is responsive.
88. A solar energy power system as described in clause 87 or any other clause, and further comprising power calculation circuitry to which said maximum photovoltaic power point converter functionality control circuitry is responsive.
89. A solar energy power system as described in clause 88 or any other clause, wherein said power calculation circuitry comprises photovoltaic multiplicative resultant circuitry.
90. A solar energy power system as described in clause 87 or any other clause, wherein said converter functionality control circuitry further comprises independent photovoltaic converter maximum voltage output control circuitry that is independent of said maximum photovoltaic power point converter functionality control circuitry.
91. A solar energy power system as described in clause 90 or any other clause, wherein said at least one solar energy source comprises at least one plurality of solar panels, wherein said photovoltaic DC-DC power converter comprises a plurality of individually panel dedicated photovoltaic DC-DC power converters having a plurality of photovoltaic DC power outputs, wherein each of said individually panel dedicated photovoltaic DC-DC power converters is physically integrated with an individual solar panel, and further comprising a plurality of converter output series connections to which said plurality of photovoltaic DC power outputs are serially connected, and wherein said converter functionality control circuitry comprises a plurality of individually panel dedicated maximum photovoltaic power point converter functionality control circuitries.
92. A solar energy power system as described in clause 90 or any other clause, wherein said independent photovoltaic converter maximum voltage output control circuitry comprises insolation variable adaptive photovoltaic converter control circuitry.
93. A solar energy power system as described in clause 1, 11 or 19 or any other clause, wherein said converter functionality control circuitry comprises photovoltaic duty cycle switch control circuitry.
94. A solar energy power system as described in clause 93 or any other clause, wherein said photovoltaic duty cycle switch control circuitry comprises photovoltaic impedance transformation duty cycle switch control circuitry.

95. A solar energy power system as described in clause 93 or any other clause, wherein said photovoltaic duty cycle switch control circuitry comprises photovoltaic duty cycle switch control circuitry selected from a group consisting of:
   threshold determinative switching photovoltaic power conversion control circuitry;
   switch frequency alteration switching photovoltaic power conversion control circuitry;
   burst mode switching photovoltaic power conversion control circuitry; and
   all permutations and combinations of each of the above.
96. A solar energy power system as described in clause 93 or any other clause, wherein said photovoltaic duty cycle switch control circuitry comprises:
   threshold determinative mode activation switching photovoltaic power conversion control circuitry; and
   threshold determinative mode deactivation switching photovoltaic power conversion control circuitry.
97. A solar energy power system as described in clause 93 or any other clause, wherein said photovoltaic duty cycle switch control circuitry comprises photovoltaic duty cycle switch control circuitry selected from a group consisting of:
   solar energy source open circuit cold voltage determinative switching photovoltaic power conversion control circuitry;
   solar energy source maximum power point hot voltage determinative switching photovoltaic power conversion control circuitry;
   maximum voltage determinative switching photovoltaic power conversion control circuitry;
   inverter maximum current determinative switching photovoltaic power conversion control circuitry; and
   all permutations and combinations of each of the above.
98. A solar energy power system as described in clause 93 or any other clause, wherein said photovoltaic duty cycle switch control circuitry comprises maximum photovoltaic power point converter control circuitry.
99. A solar energy power system as described in clause 98 or any other clause, wherein said photovoltaic duty cycle switch control circuitry further comprises photovoltaic inverter maximum voltage determinative duty cycle switch control circuitry.
100. A solar energy power system as described in clause 98, or 99 or any other clause, wherein said photovoltaic duty cycle switch control circuitry further comprises maximum photovoltaic voltage determinative duty cycle switch control circuitry.
101. A solar energy power system as described in clause 98, 99, or 100 or any other clause, wherein said photovoltaic duty cycle switch control circuitry further comprises photovoltaic inverter maximum current determinative duty cycle switch control circuitry.
102. A solar energy power system as described in clause 98, 99, 100, or 101 or any other clause, wherein said photovoltaic duty cycle switch control circuitry further comprises soft transition photovoltaic power conversion control circuitry.
103. A solar energy power system as described in clause 102 or any other clause, wherein said soft transition photovoltaic power conversion control circuitry comprises maximum photovoltaic output voltage-photovoltaic output current proportional duty cycle switch control circuitry.
104. A solar energy power system as described in clause 98, 99, 100, 101, or 103 or any other clause, wherein said photovoltaic duty cycle switch control circuitry further comprises transient opposition mode photovoltaic duty cycle switch control circuitry.
105. A vacillatory method of solar energy power creation comprising the steps of:
   creating a DC photovoltaic output from at least one solar energy source;
   establishing said DC photovoltaic output as a DC photovoltaic input to a photovoltaic DC-DC power converter;
   providing a first modality of photovoltaic DC-DC power conversion;
   providing a second modality of photovoltaic DC-DC power conversion;
   alternatingly switching between said first modality of photovoltaic DC-DC power conversion and said second modality of photovoltaic DC-DC power conversion to accomplish controlling operation of said photovoltaic DC-DC converter;
   converting said DC photovoltaic input utilizing at least one of said first or said second modalities of photovoltaic DC-DC power conversion into a converted DC photovoltaic output;
   establishing said converted DC photovoltaic output as a converted DC photovoltaic input to a DC-AC inverter; and
   inverting said converted DC photovoltaic input into an inverted AC photovoltaic output.
106. A vacillatory method of solar energy power creation as described in clause 105 or any other clause, wherein said step of alternatingly switching between said first modality of photovoltaic DC-DC power conversion and said second modality of photovoltaic DC-DC power conversion comprises the step of disabling a modality of photovoltaic DC-DC power conversion.
107. A vacillatory method of solar energy power creation as described in clause 106 or any other clause, wherein said steps of providing a first modality of photovoltaic DC-DC power conversion and providing a second modality of photovoltaic DC-DC power conversion comprise the step of providing opposing modalities of photovoltaic DC-DC power conversion.
108. A vacillatory method of solar energy power creation as described in clause 107 or any other clause, wherein said step of providing opposing modalities of photovoltaic DC-DC power conversion comprises the steps of:
   providing at least one photovoltaic impedance increase modality of photovoltaic DC-DC power conversion; and
   providing at least one photovoltaic impedance decrease modality of photovoltaic DC-DC power conversion.
109. A vacillatory method of solar energy power creation as described in clause 105 or any other clause, wherein said steps of providing a first modality of photovoltaic DC-DC power conversion and providing a second modality of photovoltaic DC-DC power conversion comprise the step of providing disjunctive modalities of photovoltaic DC-DC power conversion.
110. A vacillatory method of solar energy power creation as described in clause 105 or any other clause, wherein said step of alternatingly switching between said first modality of photovoltaic DC-DC power conversion and said second modality of photovoltaic DC-DC power conversion comprises the step of alternatingly switching between modalities of photovoltaic DC-DC power conversion selected from a group consisting of:
a photovoltaic impedance transformation modality of photovoltaic DC-DC power conversion;
a maximum photovoltaic inverter current modality of photovoltaic DC-DC power conversion;
a maximum photovoltaic power point modality of photovoltaic DC-DC power conversion;
a photovoltaic inverter operating condition modality of photovoltaic DC-DC power conversion;
a combined photovoltaic load impedance increase modality of photovoltaic DC-DC power conversion and photovoltaic load impedance decrease modality of photovoltaic DC-DC power conversion;
a slaved maximum photovoltaic power point modality of photovoltaic DC-DC power conversion;
a slaved photovoltaic inverter operating condition modality of photovoltaic DC-DC power conversion;
a slaved photovoltaic load impedance increase modality of photovoltaic DC-DC power conversion;
a slaved photovoltaic load impedance decrease modality of photovoltaic DC-DC power conversion;
combined slaved photovoltaic load impedance increase modality of photovoltaic DC-DC power conversion and slaved photovoltaic load impedance decrease modality of photovoltaic DC-DC power conversion;
a photovoltaic boundary condition modality of photovoltaic DC-DC power conversion;
a posterior photovoltaic element protection modality of photovoltaic DC-DC power conversion;
a photovoltaic inverter protection modality of photovoltaic DC-DC power conversion;
a photovoltaic inverter coordinated modality of photovoltaic DC-DC power conversion; and
all permutations and combinations of each of the above.

111. A vacillatory method of solar energy power creation as described in clause 105 or any other clause, and further comprising the step of conversion modality responding to at least one photovoltaic power condition.

112. A vacillatory method of solar energy power creation as described in clause 111 or any other clause, wherein said step of conversion modality responding to at least one photovoltaic power condition comprises the step of threshold triggering an alternative modality of photovoltaic DC-DC power conversion.

113. A vacillatory method of solar energy power creation as described in clause 105 or 110 or any other clause, and further comprising the step of interfacing said inverted AC photovoltaic output with an AC power grid.

114. A method of solar energy power conversion comprising the steps of:
creating a DC photovoltaic output from at least one solar energy source;
establishing said DC photovoltaic output as a DC photovoltaic input to a photovoltaic DC-DC power converter;
providing a first modality of photovoltaic DC-DC power conversion;
providing a second modality of photovoltaic DC-DC power conversion;
alternatingly switching between said first modality of photovoltaic DC-DC power conversion and said second modality of photovoltaic DC-DC power conversion to accomplish controlling operation of said photovoltaic DC-DC converter; and
converting said DC photovoltaic input utilizing at least one of said first or said second modalities of photovoltaic DC-DC power conversion into a converted DC photovoltaic output.

115. An efficient method of solar energy power creation comprising the steps of:
creating a DC photovoltaic output from at least one solar energy source;
establishing said DC photovoltaic output as a DC photovoltaic input to a photovoltaic DC-DC converter;
substantially power isomorphically converting said DC photovoltaic input into a converted DC photovoltaic output;
substantially power isomorphically controlling operation of said photovoltaic DC-DC converter while it acts to convert said DC photovoltaic input into said converted DC photovoltaic output;
establishing said converted DC photovoltaic output as a converted DC photovoltaic input to a DC-AC inverter; and
inverting said converted DC photovoltaic input into an inverted AC photovoltaic output.

116. An efficient method of solar energy power creation as described in clause 115 or any other clause, wherein said step of substantially power isomorphically converting said DC photovoltaic input into a converted DC photovoltaic output comprises the step of substantially power isomorphically converting a photovoltaic circuitry impedance.

117. An efficient method of solar energy power creation as described in clause 116 or any other clause, wherein said step of substantially power isomorphically converting a photovoltaic circuitry impedance comprises the step of switchmode converting a photovoltaic circuitry impedance.

118. An efficient method of solar energy power creation as described in clause 117 or any other clause, wherein said step of switchmode converting a photovoltaic circuitry impedance comprises the step of alternatingly switching between a first modality of photovoltaic DC-DC power conversion and a second modality of photovoltaic DC-DC power conversion.

119. An efficient method of solar energy power creation as described in clause 118 or any other clause, wherein said step of substantially power isomorphically converting said DC photovoltaic input comprises the step of static switch converting said DC photovoltaic input.

120. An efficient method of solar energy power creation as described in clause 116 or 118 or any other clause, wherein said step of substantially power isomorphically converting comprises the step of substantially power isomorphically converting selected from a group consisting of:
solar power converting with at least about 97% efficiency,
solar power converting with at least about 97.5% efficiency,
solar power converting with at least about 98% efficiency,
solar power converting with at least about 98.5% efficiency,
solar power converting with at least about 97% up to about 99.2% efficiency, solar power converting with at least about 97.5% up to about 99.2% efficiency,
solar power converting with at least about 98% up to about 99.2% efficiency,
solar power converting with at least about 98.5% up to about 99.2% efficiency,
solar power converting with at least about 97% up to about wire transmission loss efficiency,
solar power converting with at least about 97.5% up to about wire transmission loss efficiency,
solar power converting with at least about 98% up to about wire transmission loss efficiency, and
solar power converting with at least about 98.5% up to about wire transmission loss efficiency.

121. An efficient method of solar energy power creation as described in clause 115, 118, or 120 or any other clause, and further comprising the step of interfacing said inverted AC photovoltaic output with an AC power grid.

122. A method of solar energy power conversion comprising the steps of:
creating a DC photovoltaic output from at least one solar energy source;
establishing said DC photovoltaic output as a DC photovoltaic input to a photovoltaic DC-DC converter;
substantially power isomorphically converting said DC photovoltaic input into a converted DC photovoltaic output; and
substantially power isomorphically controlling operation of said photovoltaic DC-DC converter while it acts to convert said DC photovoltaic input into said converted DC photovoltaic output.

123. A multimodal method of solar energy power creation comprising the steps of:
creating a DC photovoltaic output from at least one solar energy source;
establishing said DC photovoltaic output as a DC photovoltaic input to a photovoltaic DC-DC converter;
multimodally converting said DC photovoltaic input into a converted DC photovoltaic output;
multimodally controlling operation of said photovoltaic DC-DC converter while it acts to convert said DC photovoltaic input into said converted DC photovoltaic output;
establishing said converted DC photovoltaic output as a converted DC photovoltaic input to a DC-AC inverter; and
inverting said converted DC photovoltaic input into an inverted AC photovoltaic output.

124. A multimodal method of solar energy power creation as described in clause 123 or any other clause, wherein said step of multimodally converting said DC photovoltaic input into a converted DC photovoltaic output comprises the step of low energy storage converting said DC photovoltaic input into a converted DC photovoltaic output.

125. A multimodal method of solar energy power creation as described in clause 124 or any other clause, wherein said step of low energy storage converting said DC photovoltaic input into a converted DC photovoltaic output comprises the step of only partially storing energy during the process of converting said DC photovoltaic input into a converted DC photovoltaic output.

126. A multimodal method of solar energy power creation as described in clause 124 or any other clause, wherein said step of low energy storage converting said DC photovoltaic input into a converted DC photovoltaic output comprises the step of providing substantially constant energy storage when unity converting said DC photovoltaic input into a converted DC photovoltaic output.

127. A multimodal method of solar energy power creation as described in clause 124 or any other clause, wherein said step of low energy storage converting said DC photovoltaic input into a converted DC photovoltaic output comprises the step of storing energy proportional to a duty cycle used in converting said DC photovoltaic input into a converted DC photovoltaic output.

128. A multimodal method of solar energy power creation as described in clause 124 or any other clause, wherein said step of low energy storage converting said DC photovoltaic input into a converted DC photovoltaic output comprises the step of storing energy in an inductor proportional to a switch duty cycle used in converting said DC photovoltaic input into a converted DC photovoltaic output.

129. A multimodal method of solar energy power creation as described in clause 124 or any other clause, wherein said step of low energy storage converting said DC photovoltaic input into a converted DC photovoltaic output comprises the step of storing cycle-by-cycle energy proportional to a voltage difference caused by said step of converting said DC photovoltaic input into a converted DC photovoltaic output.

130. A multimodal method of solar energy power creation as described in clause 123 or 124 or any other clause, wherein said step of multimodally converting said DC photovoltaic input into a converted DC photovoltaic output comprises the step of alternatingly switching between a first modality of photovoltaic DC-DC power conversion and a second modality of photovoltaic DC-DC power conversion.

131. A multimodal method of solar energy power creation as described in clause 123 or any other clause, wherein said step of creating a DC photovoltaic output from at least one solar energy source comprises the step of creating a plurality of DC photovoltaic outputs from a plurality of solar panels and a plurality of converted DC photovoltaic outputs, and further comprising the step of serially combining said converted DC photovoltaic outputs to create said converted DC photovoltaic input to said photovoltaic DC-AC inverter.

132. A multimodal method of solar energy power creation as described in clause 131 or any other clause, wherein said step of multimodally converting said DC photovoltaic input into a converted DC photovoltaic output comprises the step of integrally converting said DC photovoltaic input into a converted DC photovoltaic output on at least one solar panel.

133. A multimodal method of solar energy power creation as described in clause 123 or any other clause, wherein said step of multimodally controlling operation of said photovoltaic DC-DC converter comprises the step of controlling a photovoltaic boundary condition of said photovoltaic DC-DC converter.

134. A multimodal method of solar energy power creation as described in clause 133 or any other clause, wherein said step of multimodally controlling operation of said photovoltaic DC-DC converter further comprises the step of independently controlling a photovoltaic operating condition of said photovoltaic DC-DC converter apart from said step of controlling a boundary condition of said photovoltaic DC-DC converter.
135. A multimodal method of solar energy power creation as described in clause 123, 133, or 134 or any other clause, wherein said step of multimodally controlling operation of said photovoltaic DC-DC converter comprises the step of controlling a maximum photovoltaic inverter input voltage output by said photovoltaic DC-DC converter.
136. A multimodal method of solar energy power creation as described in clause 123, 133, or 134 or any other clause, wherein said step of multimodally controlling operation of said photovoltaic DC-DC converter comprises the step of controlling a maximum photovoltaic output voltage proportional to a photovoltaic output current at at least some time during the process of converting said DC photovoltaic input into a converted DC photovoltaic output.
137. A multimodal method of solar energy power creation as described in clause 123 or any other clause, wherein said step of multimodally controlling operation of said photovoltaic DC-DC converter comprises the steps of:
controlling a maximum photovoltaic inverter input current from said photovoltaic DC-DC converter;
slavedly controlling a maximum photovoltaic power point operation through said photovoltaic DC-DC converter; and
controlling a maximum photovoltaic inverter input voltage from said photovoltaic DC-DC converter.
138. A multimodal method of solar energy power creation as described in clause 123 or any other clause, wherein said step of multimodally controlling operation of said photovoltaic DC-DC converter comprises the steps of:
controlling a maximum photovoltaic inverter input current from said photovoltaic DC-DC converter;
slavedly controlling a photovoltaic impedance increase and photovoltaic impedance decrease through said photovoltaic DC-DC converter; and
controlling a maximum photovoltaic inverter input voltage through operation of said photovoltaic DC-DC converter.
139. A multimodal method of solar energy power creation as described in clause 123 or any other clause, wherein said step of multimodally controlling operation of said photovoltaic DC-DC converter comprises a step selected from a group consisting of the steps of:
alternating between a first modality of photovoltaic DC-DC power conversion and a second modality of photovoltaic DC-DC power conversion at at least some times;
both photovoltaic load impedance increasing and photovoltaic load impedance decreasing;
controlling a photovoltaic conversion boundary condition;
controlling a posterior photovoltaic operating condition through control of said photovoltaic DC-DC converter;
protecting a posterior photovoltaic element through control of said photovoltaic DC-DC converter;
substantially power isomorphically controlling operation of said photovoltaic DC-DC converter;
substantially power isomorphic photovoltaic converter functionality control circuitry;
disabling a photovoltaic conversion mode through control of said photovoltaic DC-DC converter;
protecting a photovoltaic inverter through control of said photovoltaic DC-DC converter
controlling said photovoltaic DC-DC converter to coordinate with characteristics of a photovoltaic inverter;
slavedly controlling a photovoltaic conversion modality through said photovoltaic DC-DC converter; and
photovoltaic inverter slavedly controlling a photovoltaic conversion modality through said photovoltaic DC-DC converter.
140. An efficient method of solar energy power creation as described in clause 123, 131, or 139 or any other clause, and further comprising the step of interfacing said inverted AC photovoltaic output with an AC power grid.
141. A method of solar energy power conversion comprising the steps of:
creating a DC photovoltaic output from at least one solar energy source;
establishing said DC photovoltaic output as a DC photovoltaic input to a photovoltaic DC-DC converter;
multimodally converting said DC photovoltaic input into a converted DC photovoltaic output; and
multimodally controlling operation of said photovoltaic DC-DC converter while it acts to convert said DC photovoltaic input into said converted DC photovoltaic output.
142. A method of solar energy power creation as described in clause 105, 115, or 123 or any other clause, wherein said step of creating a DC photovoltaic output from at least one solar energy source comprises the step of creating a DC photovoltaic output from at least one solar cell.
143. A method of solar energy power creation as described in clause 105, 115, or 123 or any other clause, wherein said step of creating a DC photovoltaic output from at least one solar energy source comprises the step of creating a DC photovoltaic output from a plurality of electrically connected solar cells.
144. A method of solar energy power creation as described in clause 105, 115, or 123 or any other clause, wherein said step of creating a DC photovoltaic output from at least one solar energy source comprises the step of creating a DC photovoltaic output from a plurality of adjacent electrically connected solar cells.
145. A method of solar energy power creation as described in clause 105, 115, or 123 or any other clause, wherein said step of creating a DC photovoltaic output from at least one solar energy source comprises the step of creating a DC photovoltaic output from at least one solar panel.
146. A method of solar energy power creation as described in clause 105, 115, or 123 or any other clause, wherein said step of creating a DC photovoltaic output from at least one solar energy source comprises the step of combining outputs from a plurality of electrically connected solar panels.
147. A method of solar energy power creation as described in clause 105, 115, or 123 or any other clause, wherein said step of creating a DC photovoltaic output from at least one solar energy source comprises the step of creating a DC photovoltaic output from at least one string of electrically connected solar panels.
148. A method of solar energy power creation as described in clause 146 or any other clause, wherein said step of converting said DC photovoltaic input into a converted DC photovoltaic output comprises the steps of:
serially interrupting a transmission of said photovoltaic power; and
shunting a transmission of said photovoltaic power.
149. A method of solar energy power creation as described in clause 146 or any other clause, wherein both said steps of serially interrupting a transmission of said photovoltaic power and shunting a transmission of said photovoltaic power can each occur at at least two separate semiconductor switch locations.
150. A method of solar energy power creation as described in clause 149 or any other clause, wherein said step of converting said DC photovoltaic input into a converted DC photovoltaic output comprises the steps of:
capacitively storing parallel energy at at least some time during said step of converting; and
inductively storing series energy at at least some time during said step of converting.
151. A method of solar energy power creation as described in clause 149 or any other clause, wherein said step of controlling operation of said photovoltaic DC-DC converter comprises the step of fractionally switching semiconductor switch elements within said photovoltaic DC-DC converter.
152. A method of solar energy power creation as described in clause 151 or any other clause, wherein said step of controlling operation of said photovoltaic DC-DC converter comprises the step of duty cycle transforming a photovoltaic impedance.
153. A method of solar energy power creation as described in clause 146 through 21.6 wherein said step of converting said DC photovoltaic input comprises the step of serially connecting a plurality of photovoltaic DC-DC power converters, each responsive to one of said plurality of solar panels.
154. A method of solar energy power creation as described in clause 153 or any other clause, wherein said step of converting said DC photovoltaic input further comprises the step of individual dedicated panel converting a DC photovoltaic input from each of said plurality of solar panels.
155. A method of solar energy power creation as described in clause 154 or any other clause, wherein said step of individual dedicated panel converting a DC photovoltaic input from each of said plurality of solar panels comprises the step of individual dedicated maximum photovoltaic power point converting a DC photovoltaic input from each of said plurality of solar panels.
156. A method of solar energy power creation as described in clause 155 or any other clause, wherein said step of converting said DC photovoltaic input comprises the step of physically integrally converting said DC photovoltaic input for individual solar panels.
157. A method of solar energy power creation as described in clause 154 or any other clause, and further comprising the step of serially connecting a plurality of photovoltaic DC-DC power converters to serially connect outputs from said plurality of solar panels.
158. A method of solar energy power creation as described in clause 157 or any other clause, wherein said step of inverting said converted DC photovoltaic input into an inverted AC photovoltaic output comprises the step of high voltage inverting said converted DC photovoltaic input into a high voltage inverted AC photovoltaic output.
159. A method of solar energy power creation as described in clause 158 or any other clause, wherein said step of inverting said converted DC photovoltaic input into an inverted AC photovoltaic output comprises the step of high voltage inverting said converted DC photovoltaic input into a three phase high voltage inverted AC photovoltaic output.
160. A method of solar energy power creation as described in clause 146 or any other clause, wherein said step of combining outputs from a plurality of electrically connected solar panels comprises the step of combining outputs from a plurality of cadmium-telluride solar panels.
161. A method of solar energy power creation as described in clause 146 through 21.6 or any other clause, wherein said step of converting said DC photovoltaic input comprises the step of parallelly connecting a plurality of photovoltaic DC-DC power converters, each responsive to one of said plurality of solar panels.
162. A method of solar energy power creation as described in clause 153 or 157 or any other clause, wherein said step of converting said DC photovoltaic input comprises the step of full photovoltaic temperature voltage operating range converting said DC photovoltaic input.
163. A method of solar energy power creation as described in clause 115 or 123 or any other clause, wherein said step of converting said DC photovoltaic input comprises the step of alternatingly switching between a first modality of photovoltaic DC-DC power conversion and a second modality of photovoltaic DC-DC power conversion.
164. A method of solar energy power creation as described in clause 163 or any other clause, wherein said step of converting said DC photovoltaic input comprises the step of disabling a modality of photovoltaic DC-DC power conversion.
165. A method of solar energy power creation as described in clause 164 or any other clause, wherein said step of converting said DC photovoltaic input comprises the step of providing opposing modalities of photovoltaic DC-DC power conversion.
166. A method of solar energy power creation as described in clause 165 or any other clause, wherein said step of providing opposing modalities of photovoltaic DC-DC power conversion comprises the steps of:
providing at least one photovoltaic impedance increase modality of photovoltaic DC-DC power conversion; and
providing at least one photovoltaic impedance decrease modality of photovoltaic DC-DC power conversion.
167. A method of solar energy power creation as described in clause 163 or any other clause, wherein said first modality of photovoltaic DC-DC power conversion and said second modality of photovoltaic DC-DC power conversion comprise the step of providing disjunctive modalities of photovoltaic DC-DC power conversion.
168. A method of solar energy power creation as described in clause 163 or any other clause, wherein said step of alternatingly switching between said first modality of photovoltaic DC-DC power conversion and said second modality of photovoltaic DC-DC power conversion comprises the step of alternatingly switching between modalities of photovoltaic DC-DC power conversion selected from a group consisting of:
- a photovoltaic impedance transformation modality of photovoltaic DC-DC power conversion;
- a maximum photovoltaic inverter current modality of photovoltaic DC-DC power conversion;
- a maximum photovoltaic power point modality of photovoltaic DC-DC power conversion;
- a photovoltaic inverter operating condition modality of photovoltaic DC-DC power conversion;
- a combined photovoltaic load impedance increase modality of photovoltaic DC-DC power conversion and photovoltaic load impedance decrease modality of photovoltaic DC-DC power conversion;
- a slaved maximum photovoltaic power point modality of photovoltaic DC-DC power conversion;
- a slaved photovoltaic inverter operating condition modality of photovoltaic DC-DC power conversion;
- a slaved photovoltaic load impedance increase modality of photovoltaic DC-DC power conversion;
- a slaved photovoltaic load impedance decrease modality of photovoltaic DC-DC power conversion;
- combined slaved photovoltaic load impedance increase modality of photovoltaic DC-DC power conversion and slaved photovoltaic load impedance decrease modality of photovoltaic DC-DC power conversion;
- a photovoltaic boundary condition modality of photovoltaic DC-DC power conversion;
- a posterior photovoltaic element protection modality of photovoltaic DC-DC power conversion;
- a photovoltaic inverter protection modality of photovoltaic DC-DC power conversion;
- a photovoltaic inverter coordinated modality of photovoltaic DC-DC power conversion; and
- all permutations and combinations of each of the above.

169. A method of solar energy power creation as described in clause 168 or any other clause, and further comprising the step of conversion modality responding to at least one photovoltaic power condition.

170. A method of solar energy power creation as described in clause 169 or any other clause, wherein said step of conversion modality responding to at least one photovoltaic power condition comprises the step of threshold triggering an alternative modality of photovoltaic DC-DC power conversion.

171. A method of solar energy power creation as described in clause 105 or 115 or any other clause, wherein and further comprising the steps of:
- multimodally converting said DC photovoltaic input into a converted DC photovoltaic output; and
- multimodally controlling operation of said photovoltaic DC-DC converter while it acts to convert said DC photovoltaic input into said converted DC photovoltaic output.

172. A method of solar energy power creation as described in clause 171 or any other clause, wherein said step of multimodally controlling operation of said photovoltaic DC-DC converter comprises the step of controlling a photovoltaic boundary condition of said photovoltaic DC-DC converter.

173. A method of solar energy power creation as described in clause 172 or any other clause, wherein said step of multimodally controlling operation of said photovoltaic DC-DC converter further comprises the step of independently controlling a photovoltaic operating condition of a photovoltaic DC-DC converter apart from said step of controlling a boundary condition of said photovoltaic DC-DC converter.

174. A method of solar energy power creation as described in clause 171, 172, or 173 or any other clause, wherein said step of multimodally controlling operation of said photovoltaic DC-DC converter comprises the step of controlling a maximum photovoltaic inverter input voltage output by said photovoltaic DC-DC converter.

175. A method of solar energy power creation as described in clause 171, 172, or 173 or any other clause, wherein said step of multimodally controlling operation of said photovoltaic DC-DC converter comprises the step of controlling a maximum photovoltaic output voltage proportional to a photovoltaic output current at at least some time during the process of converting said DC photovoltaic input into a converted DC photovoltaic output.

176. A method of solar energy power creation as described in clause 171 or any other clause, wherein said step of multimodally controlling operation of said photovoltaic DC-DC converter comprises the steps of:
- controlling a maximum photovoltaic inverter input current from said photovoltaic DC-DC converter;
- slavedly controlling a maximum photovoltaic power point operation through said photovoltaic DC-DC converter; and
- controlling a maximum photovoltaic inverter input voltage from said photovoltaic DC-DC converter.

177. A method of solar energy power creation as described in clause 171 or any other clause, wherein said step of multimodally controlling operation of said photovoltaic DC-DC converter comprises the steps of:
- controlling a maximum photovoltaic inverter input current from said photovoltaic DC-DC converter;
- slavedly controlling a photovoltaic impedance increase and photovoltaic impedance decrease through said photovoltaic DC-DC converter; and
- controlling a maximum photovoltaic inverter input voltage through operation of said photovoltaic DC-DC converter.

178. A method of solar energy power creation as described in clause 171 or any other clause, wherein said step of multimodally controlling operation of said photovoltaic DC-DC converter comprises a step selected from a group consisting of the steps of:
- alternating between a first modality of photovoltaic DC-DC power conversion and a second modality of photovoltaic DC-DC power conversion at at least some times;
- both photovoltaic load impedance increasing and photovoltaic load impedance decreasing;
- controlling a photovoltaic conversion boundary condition;
- controlling a posterior photovoltaic operating condition through control of said photovoltaic DC-DC converter;
- protecting a posterior photovoltaic element through control of said photovoltaic DC-DC converter;
- substantially power isomorphically controlling operation of said photovoltaic DC-DC converter;
- substantially power isomorphic photovoltaic converter functionality control circuitry;
- disabling a photovoltaic conversion mode through control of said photovoltaic DC-DC converter;

protecting a photovoltaic inverter through control of said photovoltaic DC-DC converter
controlling said photovoltaic DC-DC converter to coordinate with characteristics of a photovoltaic inverter;
slavedly controlling a photovoltaic conversion modality through said photovoltaic DC-DC converter; and
photovoltaic inverter slavedly controlling a photovoltaic conversion modality through said photovoltaic DC-DC converter.

179. A method of solar energy power creation as described in clause 105, 115, or 123 or any other clause, and further comprising the step of comparing solar power conversion between a first power capability as compared to a second power capability.

180. A method of solar energy power creation as described in clause 179 or any other clause, wherein said step of comparing solar power conversion between a first power capability as compared to a second power capability comprises the step of switching operation between said first power capability and said second power capability.

181. A method of solar energy power creation as described in clause 180 or any other clause, wherein said step of switching operation between said first power capability and said second power capability comprises the step of switching between the steps of traditionally power converting said DC photovoltaic input and improved power converting said DC photovoltaic input.

182. A method of solar energy power creation as described in clause 179 or 180 or any other clause, wherein said step of comparing solar power conversion comprises a step selected from a group consisting of:
comparing solar power output differences;
comparing solar power efficiency differences;
comparing solar power cost differences; and
comparing solar power insolation utilizations.

183. A method of solar energy power creation as described in clause 181 or any other clause, wherein said step of improved power converting said DC photovoltaic input comprises a step selected from a group consisting of:
alternatingly switching between a first modality of photovoltaic DC-DC power conversion and a second modality of photovoltaic DC-DC power conversion,
substantially power isomorphically converting said DC photovoltaic input into a converted DC photovoltaic output, and
multimodally converting said DC photovoltaic input into a converted DC photovoltaic output.

184. A method of solar energy power creation as described in clause 183 or any other clause, wherein said step of improved power converting said DC photovoltaic input comprises the steps of:
serially interrupting a transmission of said photovoltaic power through circuitry such that it can each occur at at least two separate semiconductor switch locations; and
shunting a transmission of said photovoltaic power through circuitry such that it can each occur at at least two separate semiconductor switch locations.

185. A method of solar energy power creation as described in clause 105 or 123 or any other clause, wherein said step of converting said DC photovoltaic input into a converted DC photovoltaic output comprises the step of substantially power isomorphically converting said DC photovoltaic input into a converted DC photovoltaic output.

186. A method of solar energy power creation as described in clause 185 or any other clause, wherein said step of substantially power isomorphically converting said DC photovoltaic input into a converted DC photovoltaic output comprises the step of substantially power isomorphically converting a photovoltaic circuitry impedance.

187. A method of solar energy power creation as described in clause 186 or any other clause, wherein said step of converting said DC photovoltaic input into a converted DC photovoltaic output comprises the step of alternatingly switching between a first modality of photovoltaic DC-DC power conversion and a second modality of photovoltaic DC-DC power conversion.

188. A method of solar energy power creation as described in clause 187 or any other clause, wherein said step of substantially power isomorphically converting said DC photovoltaic input comprises the step of static switch converting said DC photovoltaic input.

189. A method of solar energy power creation as described in clause 186 or 187 or any other clause, wherein said step of substantially power isomorphically converting comprises the step of substantially power isomorphically converting selected from a group consisting of:
solar power converting with at least about 97% efficiency,
solar power converting with at least about 97.5% efficiency,
solar power converting with at least about 98% efficiency,
solar power converting with at least about 98.5% efficiency,
solar power converting with at least about 97% up to about 99.2% efficiency,
solar power converting with at least about 97.5% up to about 99.2% efficiency,
solar power converting with at least about 98% up to about 99.2% efficiency,
solar power converting with at least about 98.5% up to about 99.2% efficiency,
solar power converting with at least about 97% up to about wire transmission loss efficiency,
solar power converting with at least about 97.5% up to about wire transmission loss efficiency,
solar power converting with at least about 98% up to about wire transmission loss efficiency, and
solar power converting with at least about 98.5% up to about wire transmission loss efficiency.

190. A method of solar energy power creation as described in clause 105, 115, or 123 or any other clause, wherein said step of converting said DC photovoltaic input into a converted DC photovoltaic output comprises the step of maximum photovoltaic power point converting a DC photovoltaic input into a converted DC photovoltaic output.

191. A method of solar energy power creation as described in clause 190 or any other clause, wherein said step of maximum photovoltaic power point converting a DC photovoltaic input into a converted DC photovoltaic output comprises the step of:
calculating a photovoltaic power parameter; and
responding to said photovoltaic power parameter in accomplishing said step of maximum photovoltaic power point converting a DC photovoltaic input into a converted DC photovoltaic output.
192. A method of solar energy power creation as described in clause 191 or any other clause, wherein said step of calculating a photovoltaic power parameter comprises the step of calculating a photovoltaic multiplicative power parameter.
193. A method of solar energy power creation as described in clause 190 or any other clause, wherein said step of converting said DC photovoltaic input into a converted DC photovoltaic output comprises the step of causing a converted DC photovoltaic output voltage, and wherein said step of maximum photovoltaic power point converting a DC photovoltaic input into a converted DC photovoltaic output comprises the step of independently maximum photovoltaic power point converting a DC photovoltaic input into a converted DC photovoltaic output in a manner that is independent of said converted DC photovoltaic output voltage.
194. A method of solar energy power creation as described in clause 193 or any other clause, wherein said step of creating a DC photovoltaic output from at least one solar energy source comprises the step of combining outputs from a plurality of electrically connected solar panels, comprises the step of and wherein said step of converting said DC photovoltaic input comprises the step of physically integrally converting said DC photovoltaic input for individual solar panels.
195. A method of solar energy power creation as described in clause 193 or any other clause, wherein said step of converting a DC photovoltaic input into a converted DC photovoltaic output comprises the step of insolation variably adaptively converting said DC photovoltaic input into said converted DC photovoltaic output.
196. A method of solar energy power creation as described in clause 105, 115, or 123 or any other clause, wherein said step of converting said DC photovoltaic input comprises the step of duty cycle switching a photovoltaic DC-DC converter.
197. A method of solar energy power creation as described in clause 196 or any other clause, wherein said step of duty cycle switching a photovoltaic DC-DC converter comprises the step of impedance transformation duty cycle switching a photovoltaic DC-DC converter.
198. A method of solar energy power creation as described in clause 197 or any other clause, wherein said step of impedance transformation duty cycle switching a photovoltaic DC-DC converter comprises a step selected from a group consisting of:
threshold determinatively duty cycle switching a photovoltaic DC-DC converter;
frequency altered switching a photovoltaic DC-DC converter;
burst mode switching a photovoltaic DC-DC converter; and
all permutations and combinations of each of the above.
199. A method of solar energy power creation as described in clause 196 or any other clause, wherein said step of duty cycle switching a photovoltaic DC-DC converter comprises the steps of:
threshold determinatively activating a switching mode of a photovoltaic DC-DC converter; and
threshold determinatively deactivating a switching mode of a photovoltaic DC-DC converter.
200. A method of solar energy power creation as described in clause 196 or any other clause, wherein said step of duty cycle switching a photovoltaic DC-DC converter comprises a step selected from a group consisting of:
solar energy source open circuit cold voltage determinatively duty cycle switching a photovoltaic DC-DC converter;
solar energy source maximum power point hot voltage determinatively duty cycle switching a photovoltaic DC-DC converter;
maximum photovoltaic voltage determinatively duty cycle switching a photovoltaic DC-DC converter;
photovoltaic inverter maximum current determinatively duty cycle switching a photovoltaic DC-DC converter; and
all permutations and combinations of each of the above.
201. A method of solar energy power creation as described in clause 196 or any other clause, wherein said step of duty cycle switching a photovoltaic DC-DC converter comprises the step of maximum photovoltaic power point converting a DC photovoltaic input into a converted DC photovoltaic output.
202. A method of solar energy power creation as described in clause 201 or any other clause, wherein said step of duty cycle switching a photovoltaic DC-DC converter comprises the step of photovoltaic inverter maximum voltage determinatively duty cycle switching a photovoltaic DC-DC converter.
203. A method of solar energy power creation as described in clause 201 or 202 or any other clause, wherein said step of maximum photovoltaic power point converting a DC photovoltaic input into a converted DC photovoltaic output comprises the step of maximum photovoltaic power point duty cycle switching a photovoltaic DC-DC converter.
204. A method of solar energy power creation as described in clause 201 through 203 or any other clause, wherein said step of duty cycle switching a photovoltaic DC-DC converter comprises the step of photovoltaic inverter maximum current determinatively duty cycle switching a photovoltaic DC-DC converter.
205. A method of solar energy power creation as described in clause 201 through 204 or any other clause, wherein said step of duty cycle switching a photovoltaic DC-DC converter comprises the step of softly transitioning a photovoltaic DC-DC converter.
206. A method of solar energy power creation as described in clause 205 or any other clause, wherein said step of softly transitioning a photovoltaic DC-DC converter comprises the step of establishing a maximum photovoltaic output voltage-photovoltaic output current proportional duty cycle.
207. A method of solar energy power creation as described in clause 201 through 206 or any other clause, wherein said step of duty cycle switching a photovoltaic DC-DC converter comprises the step of transiently establishing opposing photovoltaic duty cycle switching modes in a photovoltaic DC-DC converter.
208. Methods substantially as described hereinbefore and with reference to any of the accompanying examples
209. Apparatuses substantially as described hereinbefore and with reference to any of the accompanying examples.

As can be easily understood from the foregoing, the basic concepts of the present invention may be embodied in a variety of ways. It involves both solar power generation techniques as well as devices to accomplish the appropriate power generation. In this application, the power generation techniques are disclosed as part of the results shown to be achieved by the various circuits and devices described and as steps which are inherent to utilization. They are simply the natural result of utilizing the devices and circuits as intended and described. In addition, while some circuits are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the devices and circuits described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "converter" should be understood to encompass disclosure of the act of "converting"—whether explicitly discussed or not—and, conversely, were there effectively disclosure of the act of "converting", such a disclosure should be understood to encompass disclosure of a "converter" and even a "means for converting." Such changes and alternative terms are to be understood to be explicitly included in the description.

Any patents, publications, or other references mentioned in this application for patent or its list of references are hereby incorporated by reference. Any priority case(s) claimed at any time by this or any subsequent application are hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any list of references or other information disclosure statement filed with or included in the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the power source devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein. In addition and as to computerized aspects and each aspect amenable to programming or other programmable electronic automation, the applicant(s) should be understood to have support to claim and make a statement of invention to at least: xiv) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. Both the examiner and any person otherwise interested in existing or later potential coverage, or considering if there has at any time been any possibility of an indication of disclaimer or surrender of potential coverage, should be aware that in the absence of explicit statements, no such surrender or disclaimer is intended or should be considered as existing in this or any subsequent application. Limitations such as arose in Hakim v. Cannon Avent Group, PLC, 479 F.3d 1313 (Fed. Cir 2007), or the like are expressly not intended in this or any subsequent related matter.

In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A coordinated photovoltaic electrical energy power system comprising:
   at least one photovoltaic DC-DC power converter responsive to an overcurrent condition and having a photovoltaic DC converter output;
   a coordinated converter functionality control circuit configured and arranged to reactively alter converter switching in a manner that does not negate an ability to convert but retains the ability to yet again convert and does not prevent resumption of converter switching to again convert when appropriate, and to achieve photovoltaic disable mode converter functionality control of said at least one photovoltaic DC-DC power converter that deactivates said photovoltaic DC-DC power converter from converting DC photovoltaic input to DC photovoltaic output upon said overcurrent condition;
   a load responsive to said photovoltaic DC converter output; and
   a photovoltaic power output of said photovoltaic load,
   wherein said coordinated converter functionality control circuit that reactively alters converter switching to achieve photovoltaic disable mode converter functionality control of said at least one photovoltaic DC-DC power converter comprises a coordinated converter functionality control circuit that reactively alters converter switching to achieve dynamically reactive mode of conversion switching control so that as one condition changes, nearly instantly a desired different conversion control mode can be appropriately caused, and wherein said dynamically reactive converter switching control is a dynamically reactive building code compliant converter mode of conversion switching control of said at least one photovoltaic DC-DC power converter that switches a mode of conversion for building code compliance.

2. A coordinated photovoltaic electrical energy power system as described in claim 1 wherein said coordinated converter functionality control circuit that reactively alters converter switching to achieve dynamically reactive code compliant control of said at least one photovoltaic DC-DC power converter comprises a coordinated converter functionality control circuit that reactively alters converter switching to dynamically stay within code.

3. A coordinated photovoltaic electrical energy power system as described in claim 2 wherein said coordinated converter functionality control circuit that reactively alters converter switching to dynamically stay within code comprises a nearly instantaneous coordinated converter functionality control circuit that reactively alters converter switching to achieve dynamically reactive code compliant control of said at least one photovoltaic DC-DC power converter.

4. A coordinated photovoltaic electrical energy power system as described in claim 3 wherein said nearly instantaneous coordinated converter functionality control circuit that reactively alters converter switching to achieve dynamically reactive code compliant control of said at least one photovoltaic DC-DC power converter comprises a no communication delay coordinated converter functionality control circuit that reactively alters converter switching to achieve photovoltaic disable mode converter functionality control of said at least one photovoltaic DC-DC power converter.

5. A coordinated photovoltaic electrical energy power system as described in claim 4 wherein said no communication delay coordinated converter functionality control circuit that reactively alters converter switching to achieve photovoltaic disable mode converter functionality control of said at least one photovoltaic DC-DC power converter comprises a coordinated converter functionality control circuit that reactively alters converter switching to achieve photovoltaic disable mode converter functionality control of said at least one photovoltaic DC-DC power converter nearly instantaneously when one condition changes for said photovoltaic electrical energy power system.

6. A coordinated photovoltaic electrical energy power system as described in claim 1 wherein said coordinated converter functionality control circuit that reactively alters converter switching to achieve dynamically reactive code compliant control of said at least one photovoltaic DC-DC power converter comprises a coordinated converter functionality control circuit that reactively alters converter switching to achieve dynamically reactive code compliant control of said at least one photovoltaic DC-DC power converter in response to variations in an operational power producing condition for said photovoltaic electrical energy power system.

7. A coordinated photovoltaic electrical energy power system as described in claim 6 wherein said coordinated converter functionality control circuit that reactively alters converter switching to achieve dynamically reactive code compliant control of said at least one photovoltaic DC-DC power converter in response to variations in an operational power producing condition for said photovoltaic electrical energy power system comprises a comprises a coordinated converter functionality control circuit that reactively alters converter switching to achieve photovoltaic disable mode converter functionality control of said at least one photovoltaic DC-DC power converter in response to variations in an operational power producing condition for said photovoltaic electrical energy power system selected from a group consisting of: a coordinated converter functionality control circuit that reactively alters converter switching to achieve photovoltaic disable mode converter functionality control of said at least one photovoltaic DC-DC power converter in response to variations in a voltage of said photovoltaic electrical energy power system, and a coordinated converter functionality control circuit that reactively alters converter switching to achieve photovoltaic disable mode converter functionality control of said at least one photovoltaic DC-DC power converter in response to variations in a current of said photovoltaic electrical energy power system.

8. A coordinated photovoltaic electrical energy power conversion system comprising:
at least one photovoltaic DC-DC power converter responsive to said DC photovoltaic output and having a photovoltaic DC converter output; and
a coordinated converter functionality control circuit configured and arranged to reactively alter converter switching in a manner that does not negate an ability to convert but retains the ability to yet again convert and does not prevent resumption of converter switching to again convert when appropriate, and to achieve dynamically reactive mode of conversion switching control so that as one condition changes, nearly instantly a desired different conversion control mode can be appropriately caused, and wherein said dynamically reactive converter switching control is a dynamically reactive building code compliant converter mode of conversion switching control of said at least one photovoltaic DC-DC power converter that switches a mode of conversion for building code compliance.

9. A coordinated photovoltaic electrical energy power system comprising:
at least one photovoltaic DC-DC power converter responsive to an overcurrent condition and having a photovoltaic DC converter output;
a coordinated converter functionality control circuit configured and arranged to reactively alter converter switching in a manner that does not negate an ability to convert but retains the ability to yet again convert and does not prevent resumption of converter switching to again convert when appropriate, and to achieve photovoltaic disable mode converter functionality control of said at least one photovoltaic DC-DC power converter that deactivates said photovoltaic DC-DC power converter from converting DC photovoltaic input to DC photovoltaic output upon said overcurrent condition;
a load responsive to said photovoltaic DC converter output; and
a photovoltaic power output of said photovoltaic load,
wherein said coordinated converter functionality control circuit that reactively alters converter switching to achieve photovoltaic disable mode converter functionality control of said at least one photovoltaic DC-DC power converter comprises a coordinated converter functionality control circuit that reactively alters converter switching of said at least one photovoltaic DC-DC power converter to achieve slaved control of said at least one photovoltaic DC-DC power converter, wherein said slaved control of said at least one photovoltaic DC-DC power converter comprises maximum power point slaved to building code compliance control, such that a converter maximum power point operation of said at least one photovoltaic DC-DC power converter is established for said at least one photovoltaic DC-DC power converter as subservient to said at least one photovoltaic DC-DC power converter building code compliance control.

10. A coordinated photovoltaic electrical energy power system as described in claim 8 wherein said coordinated converter functionality control circuit that reactively alters converter switching to achieve dynamically reactive code compliant control of said at least one photovoltaic DC-DC power converter comprises a coordinated converter functionality control circuit that reactively alters converter switching to dynamically stay within code.

11. A coordinated photovoltaic electrical energy power system as described in claim 8 wherein said coordinated converter functionality control circuit that reactively alters converter switching to achieve dynamically reactive code compliant control of said at least one photovoltaic DC-DC power converter comprises a nearly instantaneous coordinated converter functionality control circuit that reactively alters converter switching to achieve dynamically reactive code compliant control of said at least one photovoltaic DC-DC power converter.

12. A coordinated photovoltaic electrical energy power system as described in claim 11 wherein said nearly instantaneous coordinated converter functionality control circuit comprises a no communication delay coordinated converter functionality control circuit.

13. A coordinated photovoltaic electrical energy power system as described in claim 11 wherein said nearly instantaneous coordinated converter functionality control circuit reactively alters converter switching to achieve photovoltaic disable mode converter functionality control of said at least one photovoltaic DC-DC power converter.

14. A coordinated photovoltaic electrical energy power system as described in claim 13 wherein said nearly instantaneous coordinated converter functionality control circuit comprises a no communication delay coordinated converter functionality control circuit that reactively alters converter switching to achieve said photovoltaic disable mode converter functionality control of said at least one photovoltaic DC-DC power converter.

15. A coordinated photovoltaic electrical energy power system as described in claim 11 wherein said nearly instantaneous coordinated converter functionality control circuit comprises a no communication delay coordinated converter functionality control circuit that reactively alters converter switching to achieve photovoltaic disable mode converter functionality control of said at least one photovoltaic DC-DC power converter nearly instantaneously when one condition changes for said photovoltaic electrical energy power system.

16. A coordinated photovoltaic electrical energy power system as described in claim 8 wherein said coordinated converter functionality control circuit that reactively alters converter switching to achieve dynamically reactive code compliant control of said at least one photovoltaic DC-DC power converter comprises a coordinated converter functionality control circuit that reactively alters converter switching to achieve dynamically reactive code compliant control of said at least one photovoltaic DC-DC power converter in response to variations in an operational power producing condition for said photovoltaic electrical energy power system.

* * * * *